United States Patent
Wu et al.

(10) Patent No.: US 12,227,606 B2
(45) Date of Patent: Feb. 18, 2025

(54) PHOTOCURABLE RESIN COMPOSITION, PHOTOCURABLE RESIN ARTICLE, AND METHODS OF FABRICATING THE ARTICLE

(71) Applicant: THE REGENTS OF THE UNIVERSITY OF CALIFORNIA, Oakland, CA (US)

(72) Inventors: Benjamin M. Wu, San Marino, CA (US); Giovanny F. Acosta-Vélez, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 756 days.

(21) Appl. No.: 17/234,304

(22) Filed: Apr. 19, 2021

(65) Prior Publication Data

US 2021/0238335 A1     Aug. 5, 2021

Related U.S. Application Data

(63) Continuation-in-part of application No. PCT/US2019/056862, filed on Oct. 18, 2019.

(60) Provisional application No. 62/747,694, filed on Oct. 19, 2018.

(51) Int. Cl.
     *C08F 283/06*     (2006.01)
     *B33Y 80/00*     (2015.01)
     *C09D 151/08*     (2006.01)

(52) U.S. Cl.
     CPC ............ *C08F 283/06* (2013.01); *B33Y 80/00* (2014.12); *C09D 151/08* (2013.01)

(58) Field of Classification Search
     CPC .............. C08F 283/06; C08F 222/1065; C08F 290/067; C08F 220/346; C08F 2/50; C08F 20/286; C08F 222/103; C08F 222/1063; B33Y 80/00; B33Y 10/00; B33Y 70/00; C09D 4/06; A61C 7/08; A61C 7/12; C08G 18/6715; C08G 18/672; C08L 75/16

See application file for complete search history.

(56) References Cited

U.S. PATENT DOCUMENTS

| | | |
|---|---|---|
| 2004/0187714 A1 | 9/2004 | Napadensky |
| 2011/0195237 A1 | 8/2011 | Patel |
| 2014/0079367 A1 | 3/2014 | Wu |
| 2014/0131908 A1 | 5/2014 | Sun |
| 2016/0184067 A1 | 6/2016 | Parker |
| 2017/0100209 A1 | 4/2017 | Wen |
| 2018/0100074 A1 | 4/2018 | Chopra |
| 2018/0312444 A1* | 11/2018 | Fekety ................ C04B 38/0009 |

FOREIGN PATENT DOCUMENTS

| | | |
|---|---|---|
| CN | 104345562 A | 2/2015 |
| EP | 3040046 A1 | 7/2016 |
| WO | 2017155692 A1 | 9/2017 |
| WO | 2018071920 A1 | 4/2018 |
| WO | 2018119026 A1 | 6/2018 |
| WO | 2018167616 A1 | 9/2018 |

OTHER PUBLICATIONS

Chia, H. N.; Wu, B. M. Improved resolution of 3D printed scaffolds by shrinking. J. Biomed. Mater. Res. A. 2014, 103, 1415.
Chinese Office Action (with English translation) issued in App. No. CN201980084824.2, dated Apr. 7, 2022, 14 pages.
International Search Report and Written Opinion issued in App. No. PCT/US19/56862, mailing date Jan. 2, 2020, 9 pages.
Lombardo, L., et al., "Stress relaxation properties of four orthodontic aligner materials: A 24-hour in vitro study", The Angle Orthodontist, vol. 87, No. 1 (2017), pp. 11-18.
Wang, J., et al., "Stereolithographic (SLA) 3D printing of oral modified-release dosage forms", International Journal of Pharmaceutics, vol. 503, No. 1-2 (2016), pp. 207-212.
Zhang, N., et al., "Preparation and characterization of thermoplastic materials for invisible orthodontics", Dental Materials Journal, vol. 30, No. 6 (2011), pp. 954-959.
Extended European Search Report for Application No. 19874454.2, Dated Sep. 22, 2022, 7 Pages.

* cited by examiner

*Primary Examiner* — Jessica M Roswell
(74) *Attorney, Agent, or Firm* — Riverside Law LLP

(57) ABSTRACT

The present invention relates in part to a photocurable resin composition comprising a first compound formed from the reaction of a diisocyanate and an isocyanate reactive compound comprising a double bond, a second compound comprising one or more double bonds susceptible to polymerization, and a photoinitiator. The invention also relates in part to a method of making the photocurable resin composition. The invention also relates in part to a method of fabricating an article comprising the steps of providing a photocurable resin composition comprising a first compound formed from the reaction of a diisocyanate and an isocyanate reactive compound comprising a double bond, a second compound comprising one or more double bonds susceptible to polymerization, and a photoinitiator; 3D printing the photocurable resin to form an article; and curing the article. The invention also relates in part to a 3D printed resin article.

22 Claims, 48 Drawing Sheets

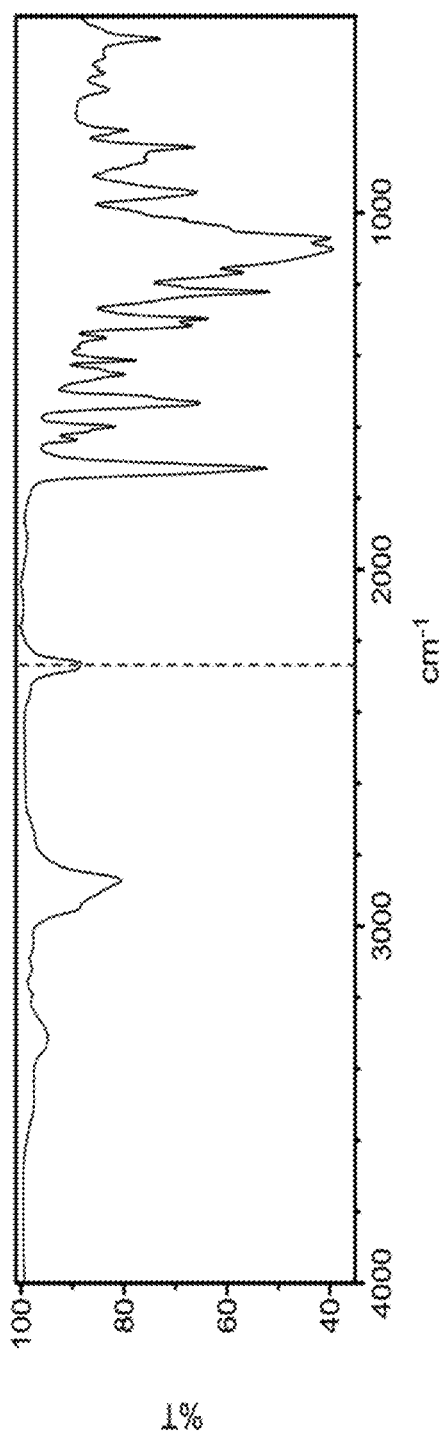
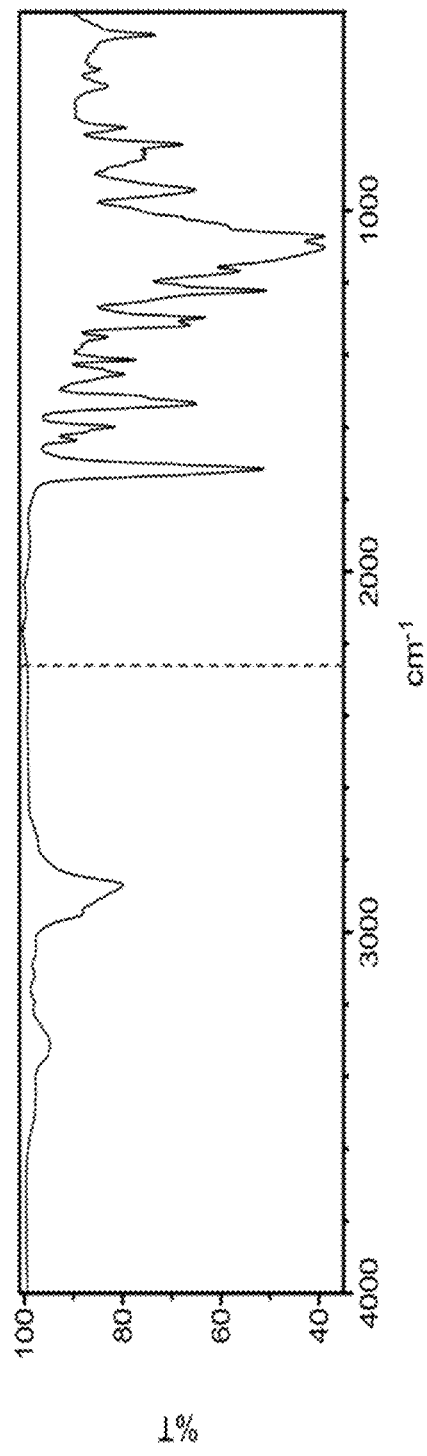
Figure 4

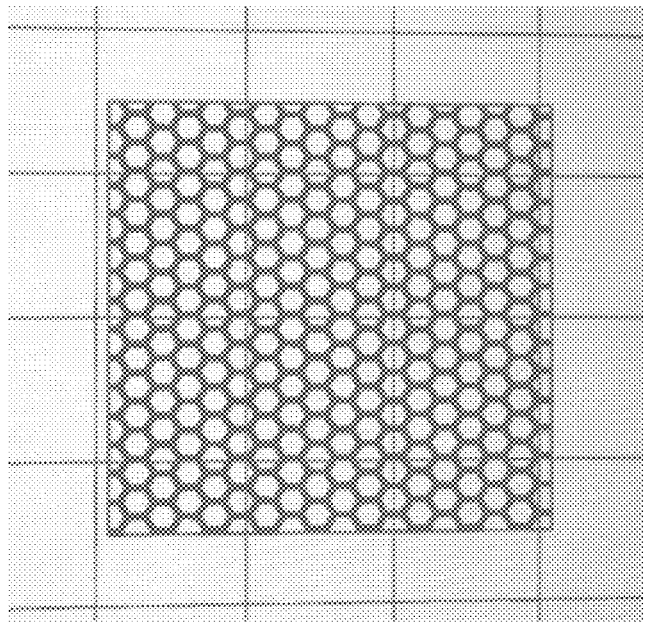
Figure 6B
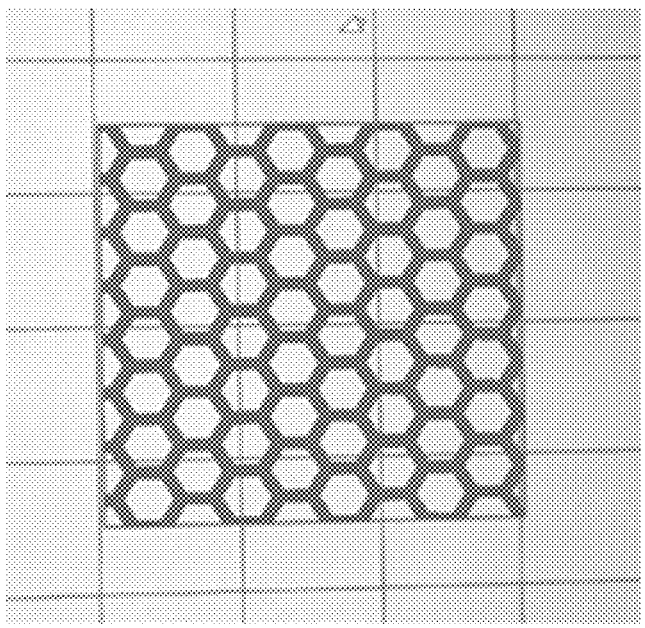
Figure 6A
Figure 6

Figure 7D
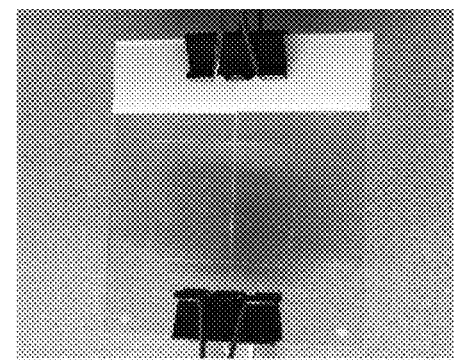
Figure 7C
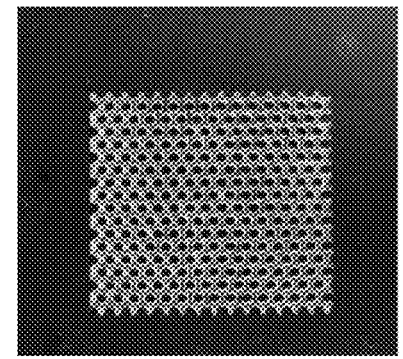
Figure 7B
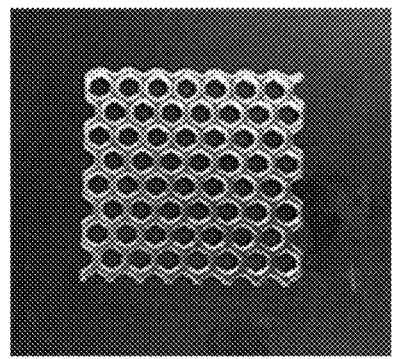
Figure 7A
Figure 7

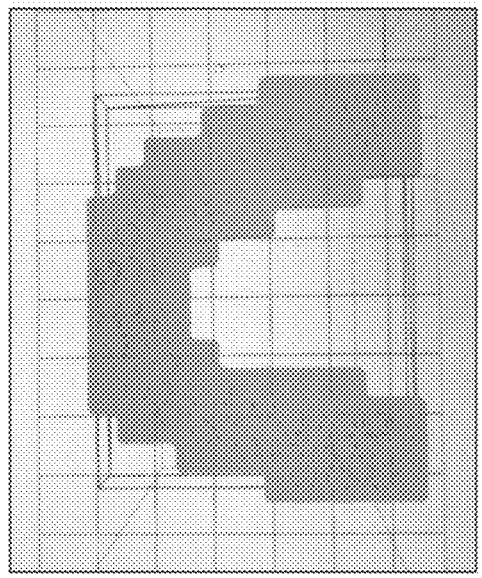
Figure 10A
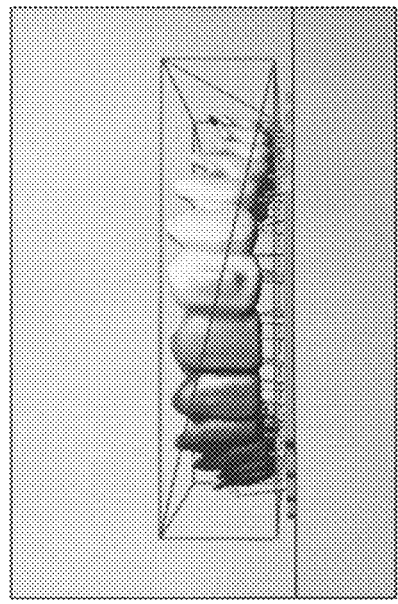
Figure 10B
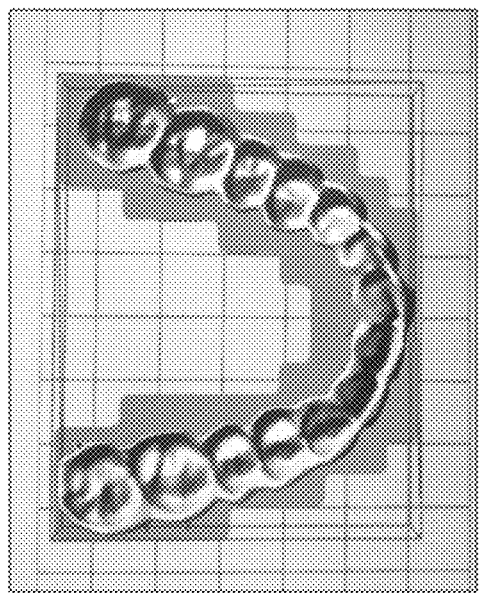
Figure 10C
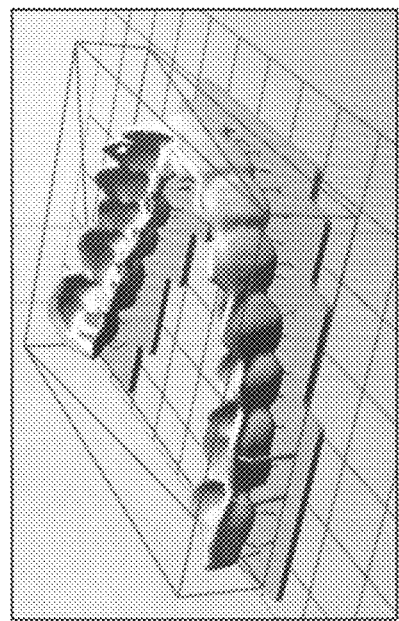
Figure 10D
Figure 10

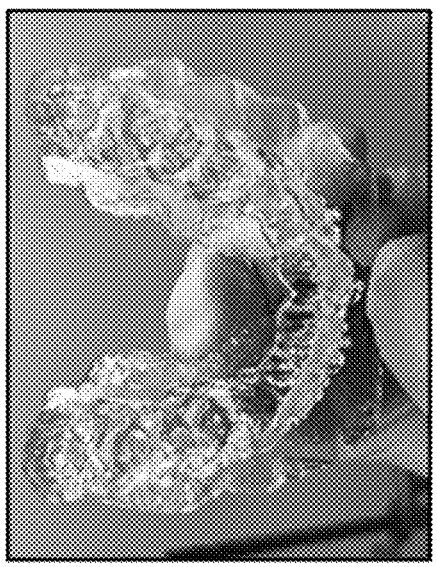
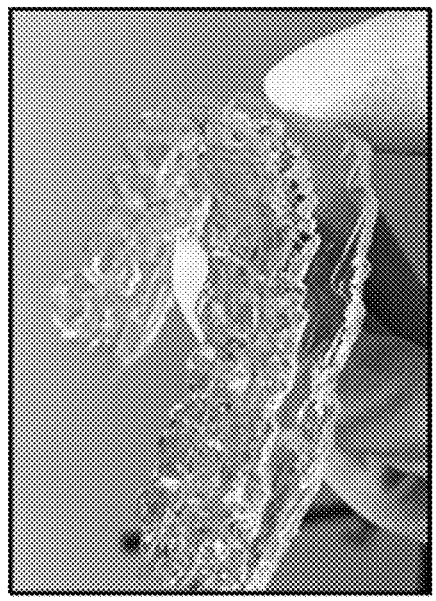
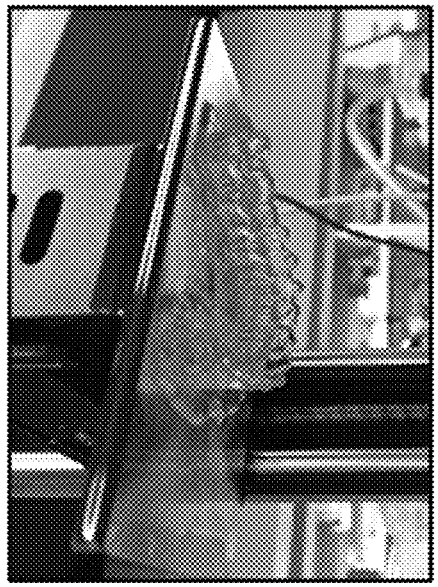
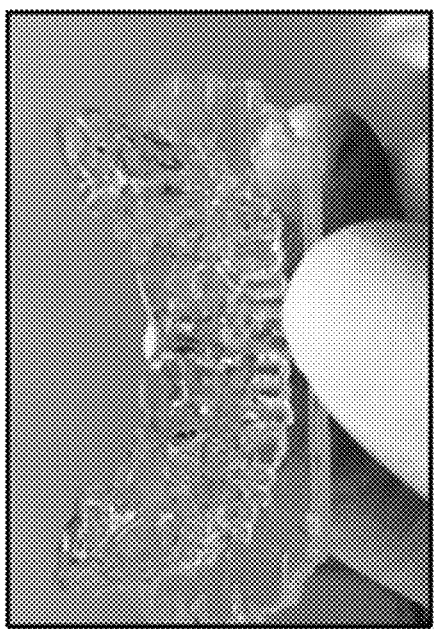
Figure 11

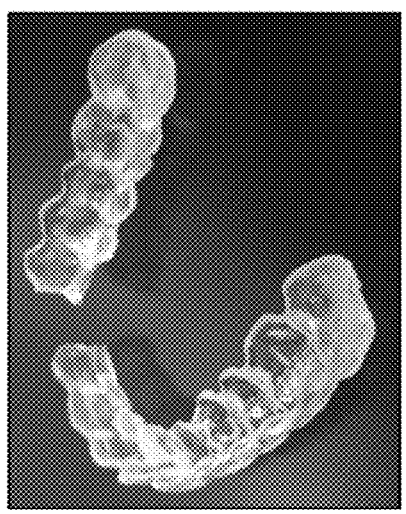
Figure 12C
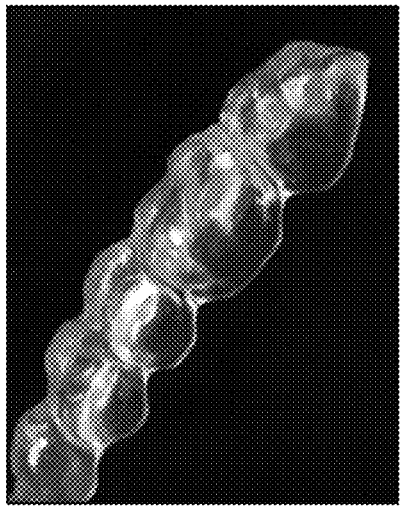
Figure 12F
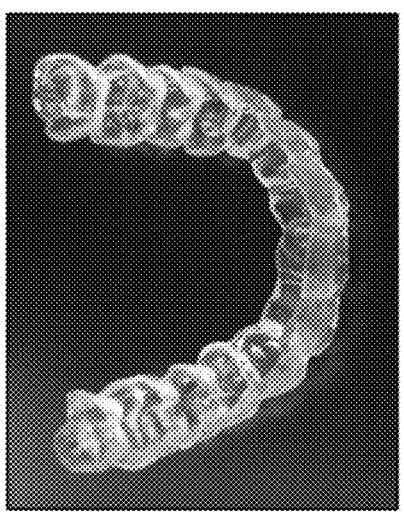
Figure 12B
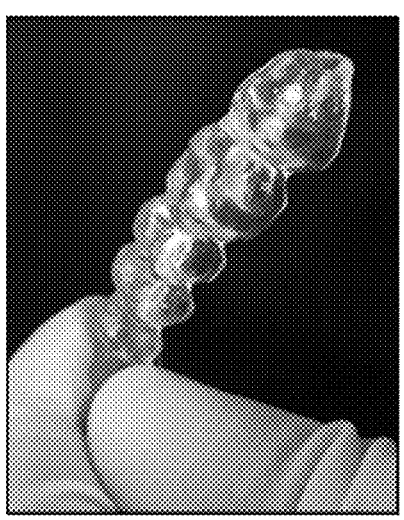
Figure 12E
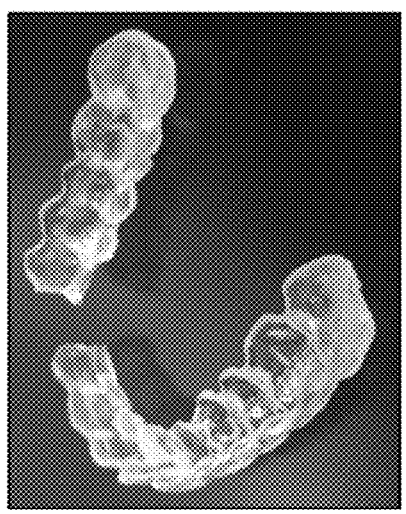
Figure 12A
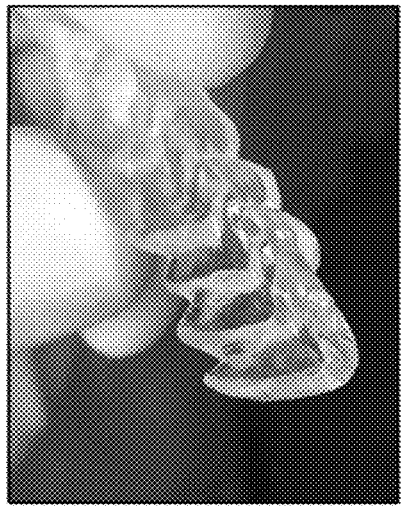
Figure 12D
Figure 12

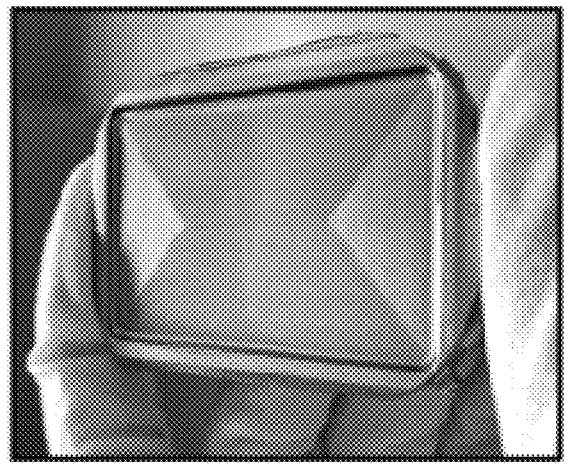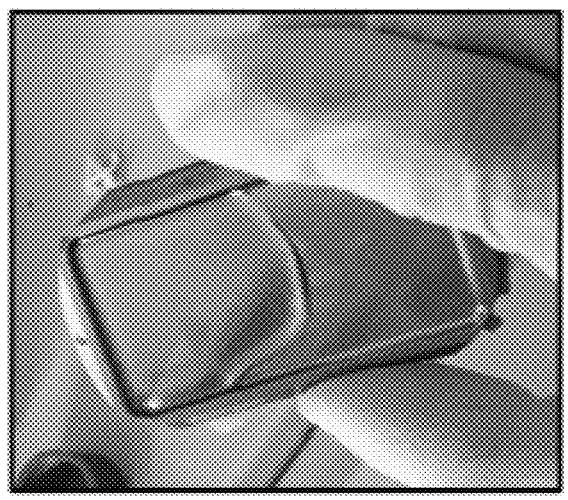
Figure 13A
Figure 13

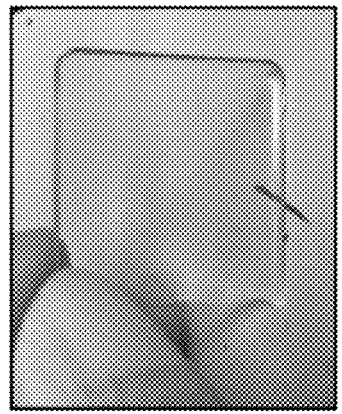
Figure 13D
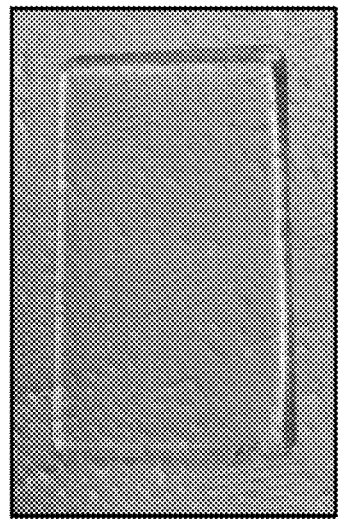
Figure 13C
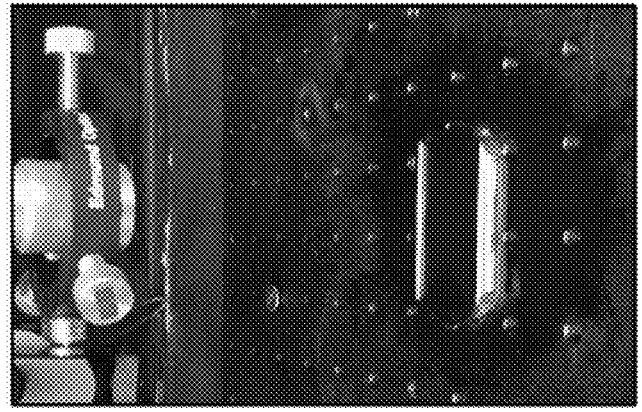
Figure 13B
Figure 13 (continued)

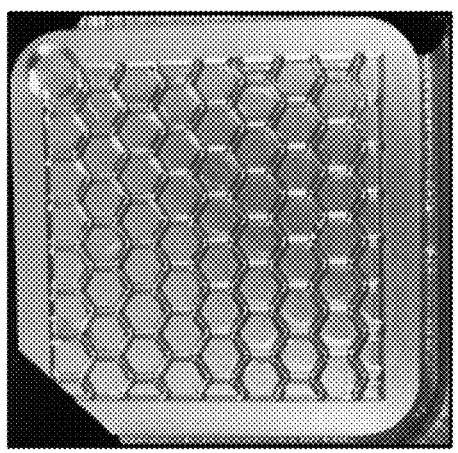
Figure 15C
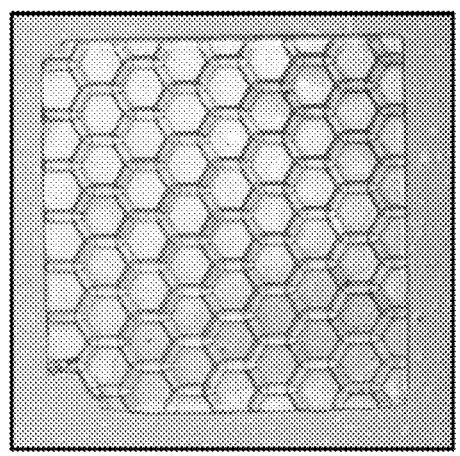
Figure 15F
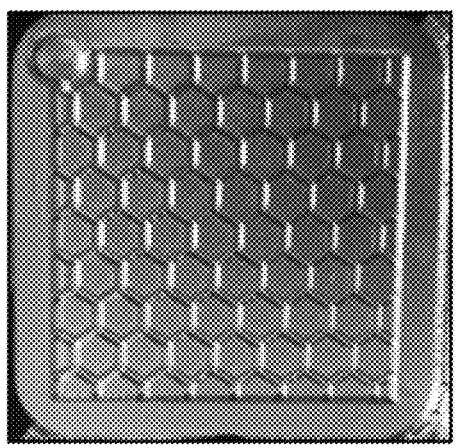
Figure 15B
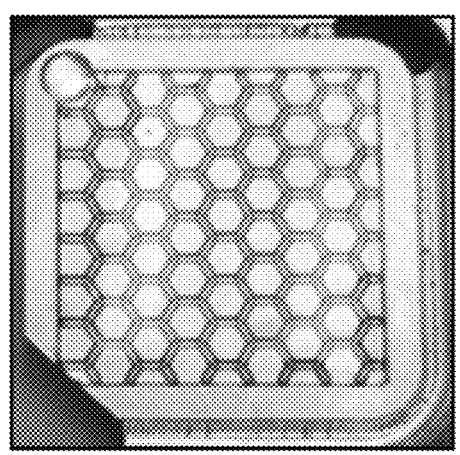
Figure 15E
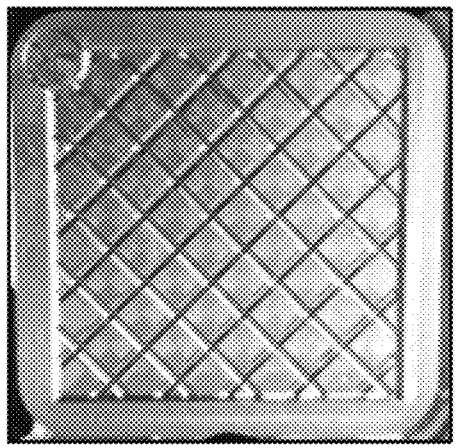
Figure 15A
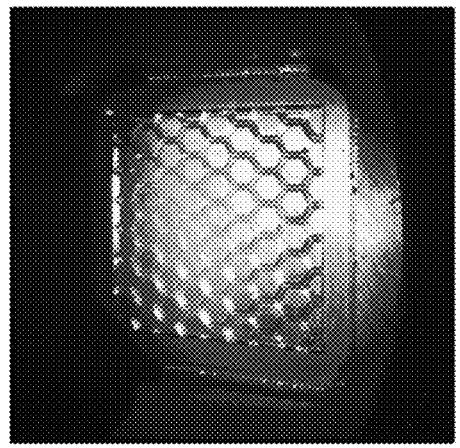
Figure 15D
Figure 15

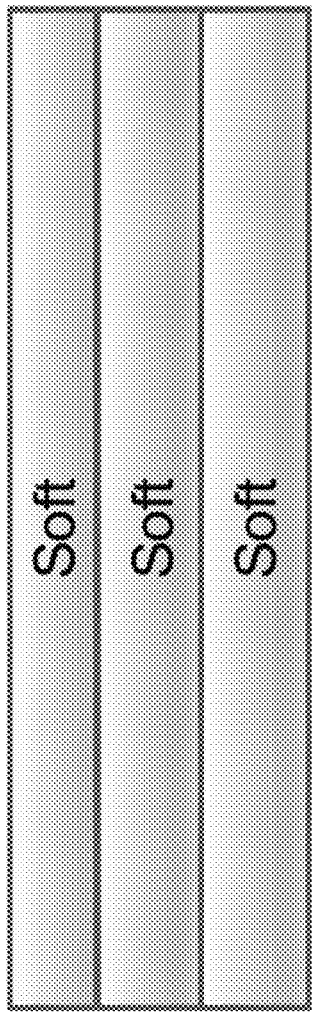
Figure 17A
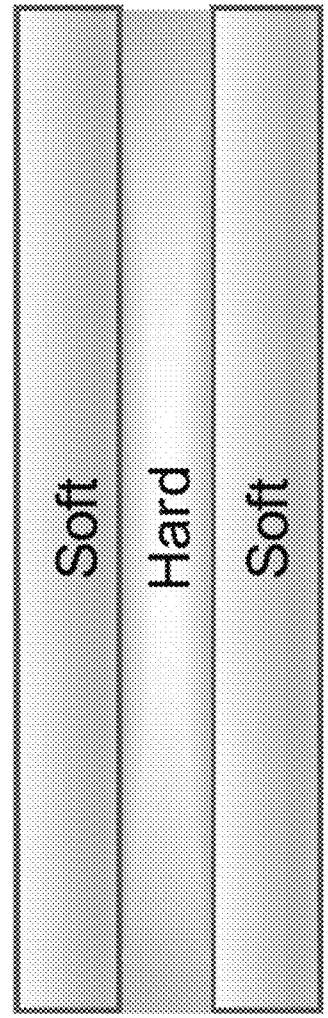
Figure 17B
Figure 17

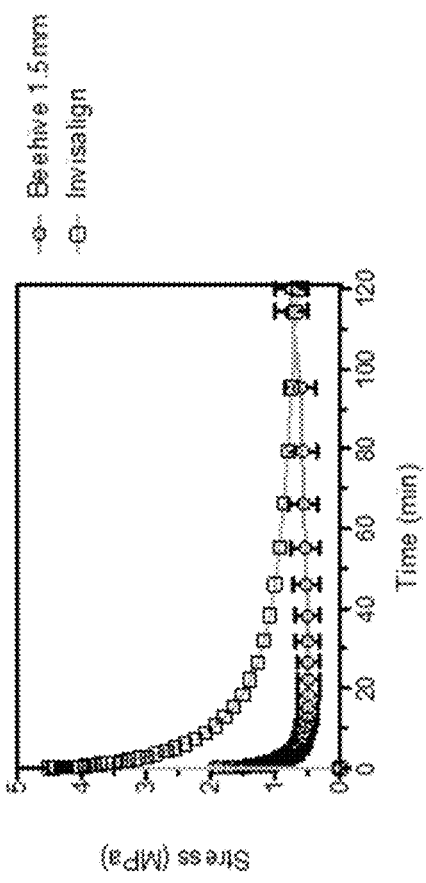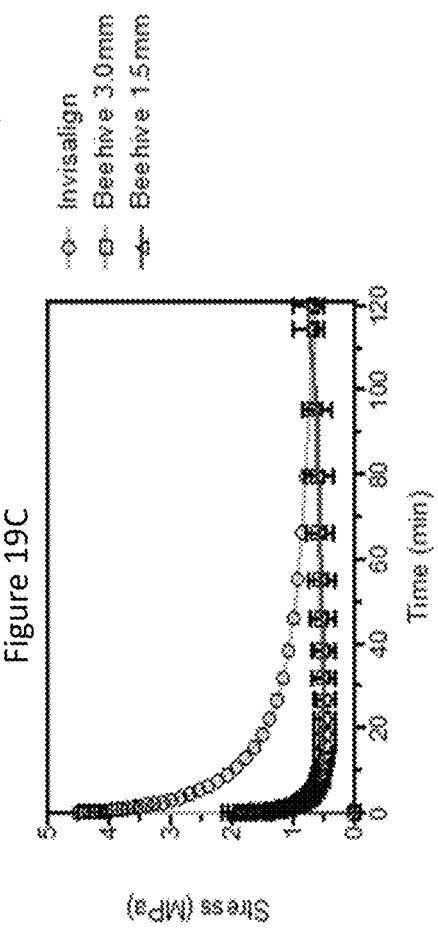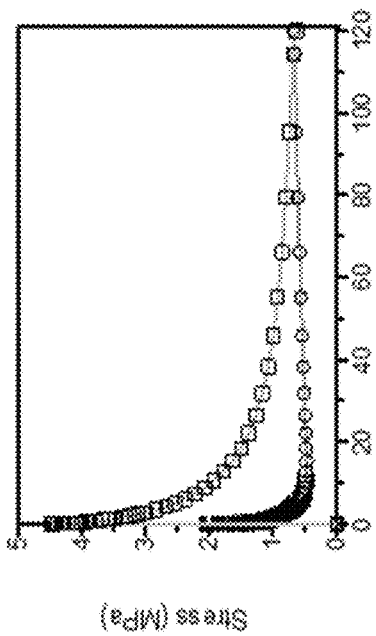
Figure 19

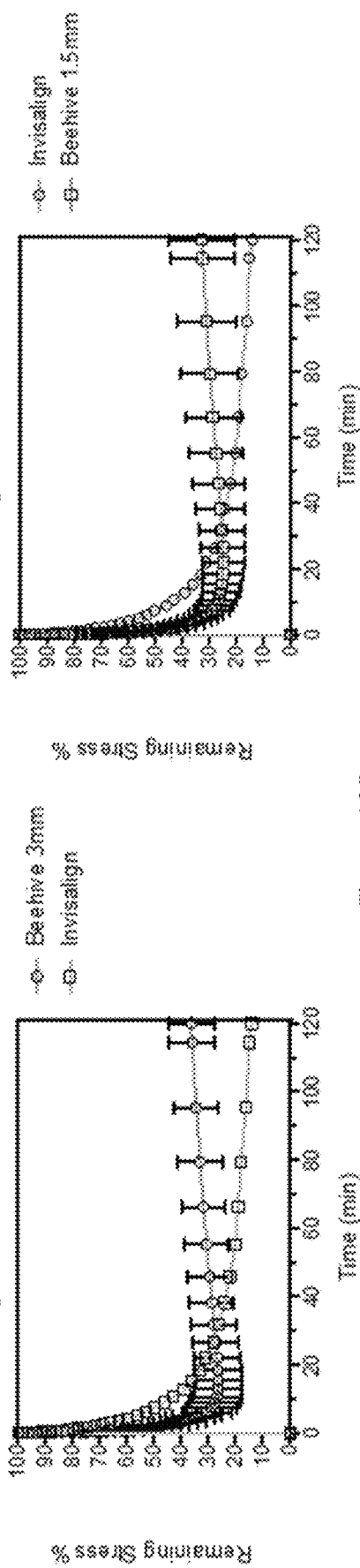
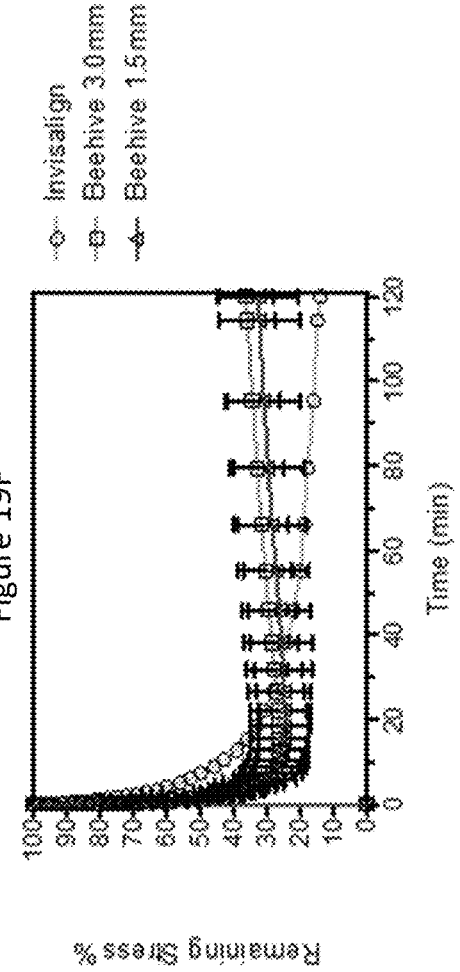
Figure 19 (continued)

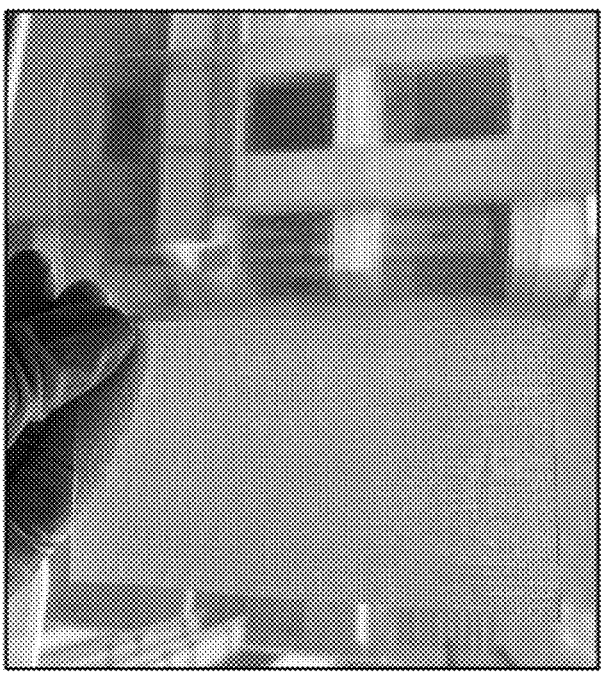
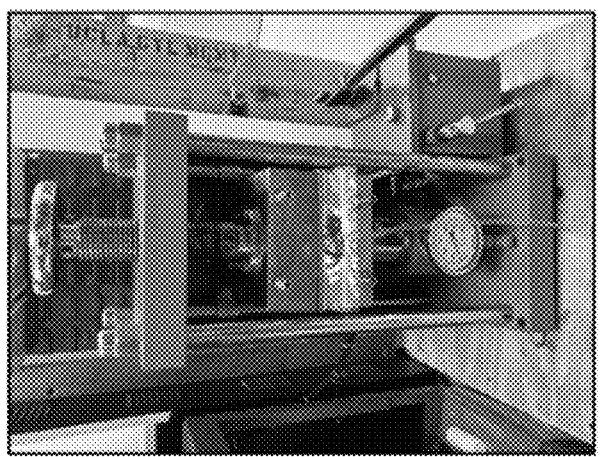
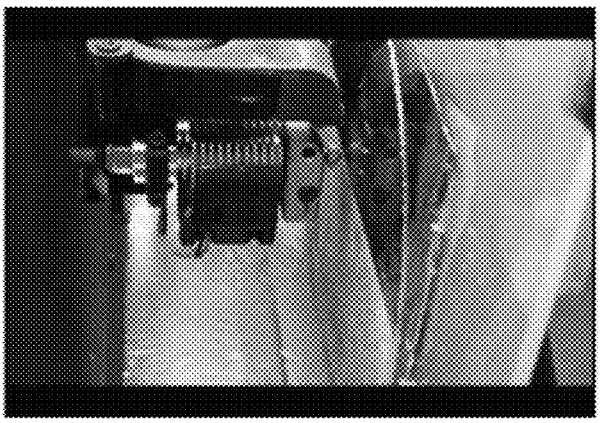
Figure 40

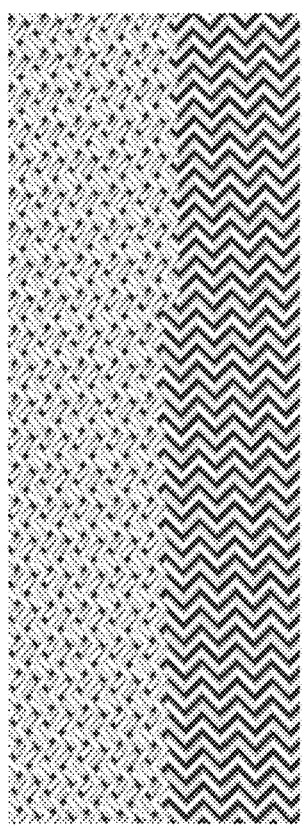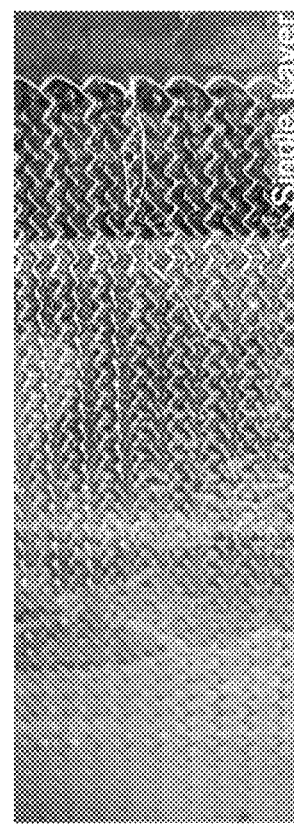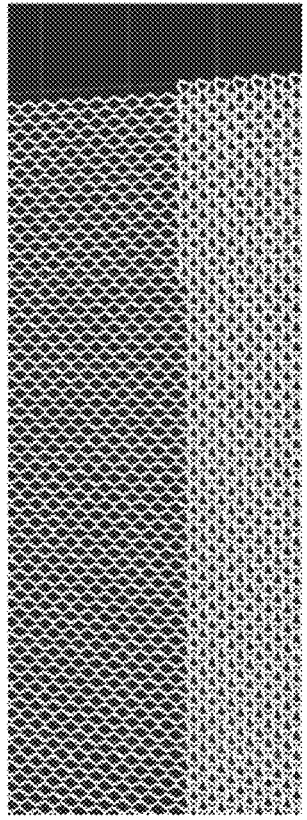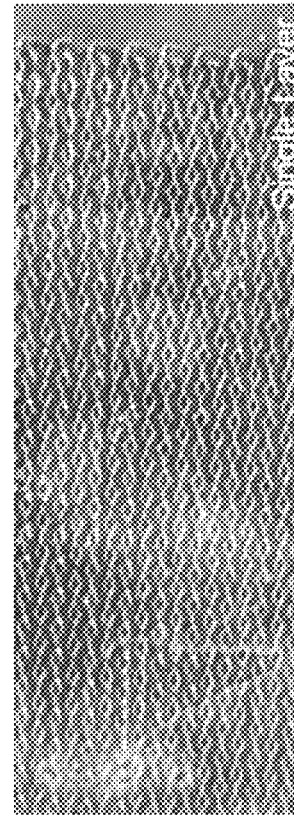
Figure 46

PHOTOCURABLE RESIN COMPOSITION, PHOTOCURABLE RESIN ARTICLE, AND METHODS OF FABRICATING THE ARTICLE

CROSS-REFERENCE TO RELATED APPLICATIONS

The present application is a continuation-in-part application claiming benefit to PCT International Application PCT/US2019/056862, filed Oct. 18, 2019, which claims priority to U.S. Provisional Application No. 62/747,694, filed Oct. 19, 2018, the disclosure of which are hereby incorporated by reference herein in their entireties.

BACKGROUND OF THE INVENTION

Dental malocclusion affects approximately 60% to 75% (or 4.6 to 5.7 billion) of the global population. Consequently, there is a tremendous global demand for orthodontic treatments to correct malocclusion. Approximately, 15% of these cases are treated with orthodontic clear aligners (690 to 855 million patients per year), representing a market size of $1.5 billion. This market segment has an expected growth of 12.16% compounded annually from 2018-2021 and is likely to reach $2.7 billion by 2021. Aligners are manufactured through the following procedure: 1) a dental impression of the patient is taken with a 3D scanner; 2) the dental impression is digitalized and converted into an STL file, compatible with stereolithography CAD software; 3) an orthodontic treatment plan is created by software, where 3D models of the patient's teeth representing the different stages of treatment are obtained, ranging from the current state of the teeth up to the perfect smile; 4) the models are 3D printed by stereolithography; 5) a sheet of a thermoplastic material is heated up and vacuumed onto the 3D printed models, resulting in aligners resembling the designed treatment plan; 6) the aligners are trimmed with a milling machine and polished afterwards; 7) the aligners are packaged and sent to the orthodontists or directly to the patient.

Current orthodontic dental aligner use is restricted to mild/moderate orthodontic cases, partially due to mechanical property limitations, intrinsic of the thermoplastic materials utilized in the production of aligners. Unlike traditional metal braces that exert a constant force to induce teeth movement (Zhang et al., 2011, Dent. Mater. J., 30: 954-959; Lombardo et al., 2017, Angle. Orthod., 87: 11-18), the force exerted by clear orthodontic aligners decreases significantly (15% to 45%), over the first 8 hours of application before any tooth movement is achieved. This is caused by a phenomenon known as stress relaxation, commonly seen within thermoplastic materials. Studies have linked the mechanical degradation of these materials to their restricted case application and to an unsatisfactory clinical efficiency when compared to fixed orthodontic treatments. Moreover, 70% to 80% of orthodontists report that their patients required midcourse correction, case refinement, or conversion to fixed appliances before the end of treatment.

Furthermore, thickness and mechanical strength are properties homogenous within clear orthodontic aligners, since they are made by heat pressing a piece of plastic sheet onto a preformed mold resembling the shape of the desired aligner. However, in an ideal orthodontic treatment, each tooth to be moved would require a different amount of force in order to be relocated to its natural position. In order to achieve this, an aligner would have to feature different localized strengths to manipulate each individual tooth with the required forced for its relocation. This is not achieved by current thermoplastic aligners due to the homogeneity of the material.

There is a need in the art for photocurable materials that will re-gain stress within the corresponding plastic after an initial stress relaxation period and that will also allow for the fabrication process and the method of making orthodontic aligners to involve a one-step system. The present invention satisfies this unmet need.

SUMMARY OF THE INVENTION

In one aspect, the present invention relates to a photocurable resin comprising 75-85 weight percent of a urethane (meth)acrylate, 10-25 weight percent of a di(meth)acrylate, and less than 5 weight percent of a photoinitiator. In one embodiment, the urethane (meth)acrylate comprises a diisocyanate and a hydroxy (meth)acrylate. In one embodiment, the diisocyanate is selected from the group consisting of: 2,4-toluene diisocyanate, 2,5-toluene diisocyanate, 2,6-toluene diisocyanate, and 4,4'-methylenebis(phenyl isocyanate); and the hydroxy (meth)acrylate is selected from the group consisting of: poly(ethylene glycol) methacrylate, poly(ethylene glycol) acrylate, poly(propylene glycol) methacrylate, poly(propylene glycol) acrylate, 2-hydroxyethyl acrylate, 2-hydroxyethyl methacrylate, 2-hydroxypropyl acrylate, and 2-hydroxypropyl methacrylate. In one embodiment, the di(meth)acrylate is selected from the group consisting of: triethylene glycol dimethacrylate, di(ethylene glycol)dimethacrylate, propylene glycol dimethacrylate, and di(propylene glycol) dimethacrylate. In one embodiment, the photoinitiator is selected from the group consisting of: diphenyl(2,4,6-trimethylbenzoyl) phosphine oxide; 2,4,6-trimethylbenzoylethoxyphenylphosphine oxide; and bis(2,4,6-trimethylbenzoyl)-phenyl-phosphine oxide. In one embodiment, the composition further comprises a stabilizer selected from the group consisting of: bis(2,2,6,6-tetramethyl-1-octyloxy-4-piperidyl) sebacate; bis(1,2,2,6,6-pentamethyl-4-piperidyl) sebacate; methyl 1,2,2,6,6-pentamethyl-4-piperidyl sebacate; dimethyl sebacate; and bis(2,2,6,6-tetramethyl-4-piperidyl) sebacate.

In one embodiment, the composition further comprises a second photocurable resin composition comprising a second urethane (meth)acrylate, a second di(meth)acrylate, a triacrylate, and a second photoinitiator. In one embodiment, the second urethane (meth)acrylate of the second photocurable resin comprises a diisocyanate and a hydroxy (meth)acrylate; wherein the diisocyanate is selected from the group consisting of: 2,4-toluene diisocyanate, 2,5-toluene diisocyanate, 2,6-toluene diisocyanate, 4,4'-methylenebis(phenyl isocyanate), and combinations thereof; and wherein the hydroxy (meth)acrylate is selected from the group consisting of: poly(ethylene glycol) methacrylate, poly(ethylene glycol) acrylate, poly(propylene glycol) methacrylate, poly(propylene glycol) acrylate, 2-hydroxyethyl acrylate, 2-hydroxyethyl methacrylate, 2-hydroxypropyl acrylate, 2-hydroxypropyl methacrylate, and combinations thereof. In one embodiment, the second di(meth)acrylate of the second photocurable resin is selected from the group consisting of: triethylene glycol dimethacrylate, di(ethylene glycol)dimethacrylate, propylene glycol dimethacrylate, and di(propylene glycol) dimethacrylate. In one embodiment, the triacrylate is 1,1-trimethylolpropane triacrylate. In one embodiment, the second photoinitiator of the second photocurable resin is selected from the group consisting of: diphenyl(2,4,6-trimethylbenzoyl) phosphine oxide; 2,4,6- trimethylbenzoylethoxyphenylphosphine oxide; and bis(2,4,6-trimethylbenzoyl)-phenyl-phosphine oxide.

The present invention also relates in part to a method of fabricating an article comprising the steps of: providing a photocurable resin comprising 75-85 weight percent of a urethane (meth)acrylate, 10-25 weight percent of a di(meth)acrylate, and less than 5 weight percent of a photoinitiator; 3D printing the photocurable resin to form an article; and curing the article. In one embodiment, the step of providing a photocurable resin comprises the step of providing a second photocurable resin comprising a second urethane (meth)acrylate, a second di(meth)acrylate, a triacrylate, and a second photoinitiator; and the step of 3D printing the photocurable resin comprises the step of 3D printing the second photocurable resin.

The present invention further relates in part to a 3D printed resin article wherein the article comprises an inner microarchitecture comprising a photocured resin and a solid coating comprising a second photocured resin; wherein the solid coating encapsulates the inner microarchitecture. In one embodiment, the microarchitecture comprises pores having an inner diameter of 0.5 mm to 5 mm. In one embodiment, the microarchitecture comprises a photocured resin having a thickness of 0.1 mm to 3 mm. In one embodiment, the article, when tested with a preload of 0.01 N, has an initial stress of between 0.45 MPa and 1.6 MPa. In one embodiment, the article, when tested with a preload of 0.01 N, has a stress relaxation after 2 hours of between 50% and 65%. In one embodiment, the article is a tooth aligner.

The present invention also relates to an article comprising an inner microarchitecture resin and a first solid coating resin, wherein the first solid coating resin covers at least a portion of a surface of the inner microarchitecture; wherein the inner microarchitecture resin comprises at least one resin selected from the group consisting of a photocured resin, a thermally cured resin, a thermoformed resin, a printed resin, a meshwork resin, and a laser-edged resin; wherein the first solid coating resin comprises at least one resin selected from the group consisting of a photocured resin, a thermally cured resin, a thermoformed resin, a printed resin, and a laser-edged resin; wherein the composition of the inner architecture resin is different from the composition of the first solid coating resin.

In one embodiment, the inner microarchitecture resin comprises pores having an inner diameter of about 0.1 mm to about 5 mm. In one embodiment, the inner microarchitecture resin has a thickness between 0.1 mm and 3 mm. In one embodiment, the pores are uniformly spaced. In one embodiment, the pores are arranged in a honeycomb geometry.

In one embodiment, the article, when tested with a preload of at least 0.01 N, has an initial stress of between 0.45 MPa and 50 MPa. In one embodiment, the article, when tested with a preload of at least 0.01 N, has a stress relaxation after 2 hours of between 10% and 95%.

In one embodiment, when one or both of the inner microarchitecture resin and the first solid coating resin comprises a thermoformed resin, then said thermoformed resin comprises at least one selected from the group consisting of polyethylene terephthalate and polyurethane. In one embodiment, when one or both of the inner microarchitecture resin and the first solid coating resin comprises a photocured resin, then said photocured resin comprises at least one selected from the group consisting of a diacrylate compound, a triacrylate compound, a (meth)acrylate compound, a dimethacrylate compound, an isocyanate reactive compound comprising an acrylate or methacrylate, a diisocyanate compound, a urethane (meth)acrylate, and a photoinitiator.

In one embodiment, when one or both of the inner microarchitecture resin and the first solid coating resin comprises a photocured resin, then said photocured resin comprises at least one selected from the group consisting of: a) a diisocyanate compound selected from the group consisting of: 2,4-toluene diisocyanate, 2,5-toluene diisocyanate, 2,6-toluene diisocyanate, 4,4'-methylenebis(phenyl isocyanate), hexamethylene-1,6-diisocyanate, 1,1'-methylenebis(4-isocyanato) cyclohexane; and any combination thereof, b) a (meth)acrylate compound selected from the group consisting of: poly(ethylene glycol) methacrylate, poly(ethylene glycol) acrylate, poly(propylene glycol) methacrylate, poly(propylene glycol) acrylate, 2-hydroxyethyl acrylate, 2-hydroxyethyl methacrylate, 2-hydroxypropyl acrylate, 2-hydroxypropyl methacrylate, and any combination thereof, c) a di(meth)acrylate selected from the group consisting of: triethylene glycol dimethacrylate, di(ethylene glycol)dimethacrylate, propylene glycol dimethacrylate, di(propylene glycol) dimethacrylate, and any combination thereof, d) a tri(meth)acrylate selected from the group consisting of 1,1-trimethylolpropane triacrylate, pentaerythritol tri(meth)acrylate, trimethylol propane tri(meth)acrylate, and any combination thereof, and e) a photoinitiator selected from the group consisting of: diphenyl(2,4,6-trimethylbenzoyl) phosphine oxide, 2,4,6-trimethylbenzoylethoxyphenylphosphine oxide, bis(2,4,6-trimethylbenzoyl)-phenyl-phosphine oxide, 1-hydroxycyclohexyl-phenyl-ketone, 2-hydroxy-2-methyl-1-phenyl-1-propanone, and any combination thereof.

In one embodiment, when one or both of the inner microarchitecture resin and the first solid coating resin comprises a photocured resin, then said photocured resin comprises at least one selected from the group consisting of: a) a diol compound selected from the group consisting of: polycarbonate diol, polycaprolactone diol, poly(ethylene glycol), polypropylene glycol diol, poly(dimethylsiloxane), hydroxy terminated, and any combination thereof, b) a (meth)acrylate compound selected from the group consisting of: methyl methacrylate, isobornyl acrylate, 3,3,4,4,5,5,6,6,7,7,8,8,9,9,10,10,10-Heptadecafluorodecyl methacrylate, Poly(propylene glycol) methyl ether acrylate, vinyltrimethoxysilane, pentaerythritol triacrylate and any combination thereof, and c) a tri(meth)acrylate, tetra(meth)acrylate, penta(meth)acrylate, or hexa(meth)acrylate compound.

In one embodiment, the inner architecture resin, the first solid coating resin, or both resins comprise: 70-90 weight percent of a urethane (meth)acrylate; and 5-40 weight percent of a di(meth)acrylate. In one embodiment, the photocured resin further comprises a stabilizer selected from the group consisting of: bis(2,2,6,6-tetramethyl-1-octyloxy-4-piperidyl) sebacate, bis(1,2,2,6,6-pentamethyl-4-piperidyl) sebacate, methyl 1,2,2,6,6-pentamethyl-4-piperidyl sebacate, dimethyl sebacate, bis(2,2,6,6-tetramethyl-4-piperidyl) sebacate, and any combination thereof.

In one embodiment, the first solid coating resin encapsules the inner microarchitecture resin. In one embodiment, the article further comprises a second solid coating resin; wherein the second solid coating resin covers at least a portion of a surface of the inner microarchitecture resin that is not covered by the first solid coating resin; wherein the second solid coating resin comprises at least one selected from the group consisting of a photocured resin, a thermoformed resin, a printed resin, a meshwork resin, and a laser-edged resin; and wherein the composition of the second solid coating resin is different than the composition of the first solid coating resin. In one embodiment, the first solid coating resin and the second solid coating resin encapsule the inner microarchitecture resin. In one embodiment, the microarchitecture comprises at least one selected a segmented structure, foam structure, a square lattice, triangular lattice, rectangular lattice, diamond lattice, circular lattice, oval lattice, and hexagonal lattice. In one embodiment, the article is a tooth aligner.

The present invention also relates to a method of fabricating a device, the method comprising the steps of: a) generating an inner microarchitecture comprising at least one selected from the group consisting of a photocured resin, thermally cured resin, and thermoplastic; b) placing a coating resin on at least a portion of a surface of the inner microarchitecture; and c) curing the coating resin to generate a first solid coating comprising at least one selected from the group consisting of a photocured resin, thermally cured resin, and thermoplastic, wherein the first solid coating covers at least a portion of a surface of the inner microarchitecture. In one embodiment, the generation of the inner microarchitecture comprises at least one selected from the group consisting of 3D printing, photocuring, thermoforming, and laser-edging. In one embodiment, the generation of the first solid coating comprises at least one selected from the group consisting of 3D printing, photocuring, and thermoforming. In one embodiment, the method further comprises: d) placing a second coating resin on at least a portion of a surface of the inner microarchitecture that is not covered by the first solid coating; and e) curing the second coating resin to generate a second solid coating comprising at least one selected from the group consisting of a photocured resin, thermally cured resin, and thermoplastic, wherein the second solid coating covers at least a portion of a surface of the inner microarchitecture that is not covered by the first solid coating. The present invention also relates to a 3D printed article produced by the method of claim 19.

BRIEF DESCRIPTION OF THE DRAWINGS

The following detailed description of various embodiments of the invention will be better understood when read in conjunction with the appended drawings. For the purpose of illustrating the invention, there are shown in the drawings illustrative embodiments. It should be understood, however, that the invention is not limited to the precise arrangements and instrumentalities of the embodiments shown in the drawings.

FIG. 4, comprising FIG. 4A and FIG. 4B, depicts the characterization of MDI-PEGMA using Fourier Transform Infrared Spectroscopy (FT-IR) analysis. FIG. 4A depicts an FTIR analysis spectrum of MDI-PEGMA resin with free isocyanates groups. FIG. 4B depicts an FT-IR analysis spectrum of MDI-PEGMA resin where isocyanates groups have been reacted.

FIG. 6, comprising FIG. 6A and FIG. 6B, depicts beehive microarchitectures. FIG. 6A depicts a 3.0 mm inner diameter beehive microarchitecture. FIG. 6B depicts a 1.5 mm inner diameter beehive microarchitecture.

FIG. 7, comprising FIG. 7A, FIG. 7B, FIG. 7C, and FIG. 7D, depicts the printed parts and post-curing process. FIG. 7A depicts a 3.0 mm inner diameter beehive. FIG. 7B depicts a 1.5 mm inner diameter beehive. FIG. 7C depicts a square structure placed between glass slides prepared for post-curing under UV light. FIG. 7D depicts a UV light exposure to printed piece for strength enhancement.

FIG. 8A, FIG. 8B, and FIG. 8C, depicts an assembly of plastic sheets for preparation of microarchitecture plastic sheets. FIG. 8A depicts a square piece with thin layer of Bioink 2 on top. FIG. 8B depicts a 3.0 mm beehive structure merge with bottom squared layer. FIG. 8C depicts an addition of extra Bioink 2 to merge the top and bottom parts with the microarchitecture upon light exposure.

FIG. 10, comprising FIG. 10A, FIG. 10B, FIG. 10C, and FIG. 10D, depicts 3D model of aligner and support material. FIG. 10A depicts atop view of a 3D model of aligner with support material. FIG. 10B depicts a bottom view of a 3D model of aligner with support material. FIG. 10C depicts a side view of a 3D model of aligner with support material. FIG. 10D depicts a front view of a 3D model of aligner with support material.

FIG. 11, comprising FIG. 11A, FIG. 11B, FIG. 11C, and FIG. 11D, depicts a 3D printed aligner with support material. FIG. 11A depicts a 3D printed aligner with support material attached to the 3D printer platform. FIG. 11B depicts a top view of a 3D printed aligner with support material. FIG. 11C depicts a front view of a 3D printed aligner with support material. FIG. 11D depicts a side view of a 3D printed aligner with support material.

FIG. 12, comprising FIG. 12A, FIG. 12B, FIG. 12C, FIG. 12D, FIG. 12E, and FIG. 12F, depicts a 3D printed aligner with removed support material. FIG. 12A depicts a side view of a 3D printed aligner with removed support material. FIG. 12B depicts a top view of a 3D printed aligner with removed support material and cross-sectional view of aligner. FIG. 12C depicts a cross-section position of a 3D printed aligner with removed support material. FIG. 12D depicts a cross-sectional view of 3D printed aligner with removed support material. FIG. 12E depicts a top view of a 3D printed aligner with removed support material. FIG. 12F depicts an enlarged top view of a 3D printed aligner with removed support material.

FIG. 13, comprising FIG. 13A, FIG. 13B, FIG. 13C, and FIG. 13D, depicts polymerization of Bioinks for mechanical properties analysis. FIG. 13A depicts a deposition of Bioink onto metal mold. FIG. 13B depicts a Bioink material exposed to 415 nm light for 1 min. FIG. 13C depicts a photopolymerized Bioink plastic sheet removed from metal mold. FIG. 13D depicts the transparency of the photopolymerized Bioink plastic that can be noticed when placed on a white surface with a black line drawn. The line can be observed clearly on front and behind the material.

FIG. 15, comprising FIG. 15A, FIG. 15B, FIG. 15C, FIG. 15D, FIG. 15E, and FIG. 15F, depicts a preparation of microarchitecture plastic sheets. FIG. 15A depicts a Pattern B metal mold for preparation of microarchitecture plastic sheets. FIG. 15B depicts a Pattern A metal mold for preparation of microarchitecture plastic sheets. FIG. 15C depicts a Bioink 2 dispensed onto Pattern A mold. A red die was added to the formulation for visualization purposes within the final product. FIG. 15D depicts a photopolymerization of Bioink 2 in Pattern A mold. FIG. 15E depicts an addition of a layer of Bioink 1 on one side of the meshwork. This layer was polymerized, the piece was turned around and a second layer was dispensed and polymerized to completely embed the Bioink 2 meshwork within two Bioink 1 layers. FIG. 15F depicts a photopolymerized plastic sheet of Bioink 1 with an embedded Pattern A microarchitecture composed of Bioink 2.

FIG. 17, comprising FIG. 17A and FIG. 17B, depicts layering patterns. FIG. 17A depicts a photopolymerized plastic sheet with Pattern C, composed of three layers of Bioink 1. FIG. 17B depicts a photopolymerized plastic sheet with Pattern D, composed of one layer of Bioink 2 sandwiched between two layers of Bioink 1.

FIG. 19, comprising FIG. 19A, FIG. 19B, FIG. 19C, FIG. 19D, FIG. 19E, and FIG. 19F, depicts DMA results. FIG. 19A depicts a stress of 3.0 mm beehive compared to Invisalign. FIG. 19B depicts a stress of 1.5 mm beehive compared to Invisalign. FIG. 19C depicts a stress comparison between microarchitecture structures and Invisalign. FIG. 19D depicts a remaining stress percent of 3.0 mm beehive compared to Invisalign. FIG. 19E depicts a remaining stress percent of 1.5 mm beehive compared to Invisalign. FIG. 19F depicts a remaining stress percent comparison between microarchitecture structures and Invisalign.

FIG. 40 depicts an exemplary manufacturing process of an advanced thermoplastic sheet. A thermoplastic material is 3D printed onto a central plastic layer and the resulting part is processed via hot press machinery in order to fuse the thermoplastics together into a clear sheet.

FIG. 46 depicts 3D printed examples of angled lines and wave patterned lines.

DETAILED DESCRIPTION

Figure 1:
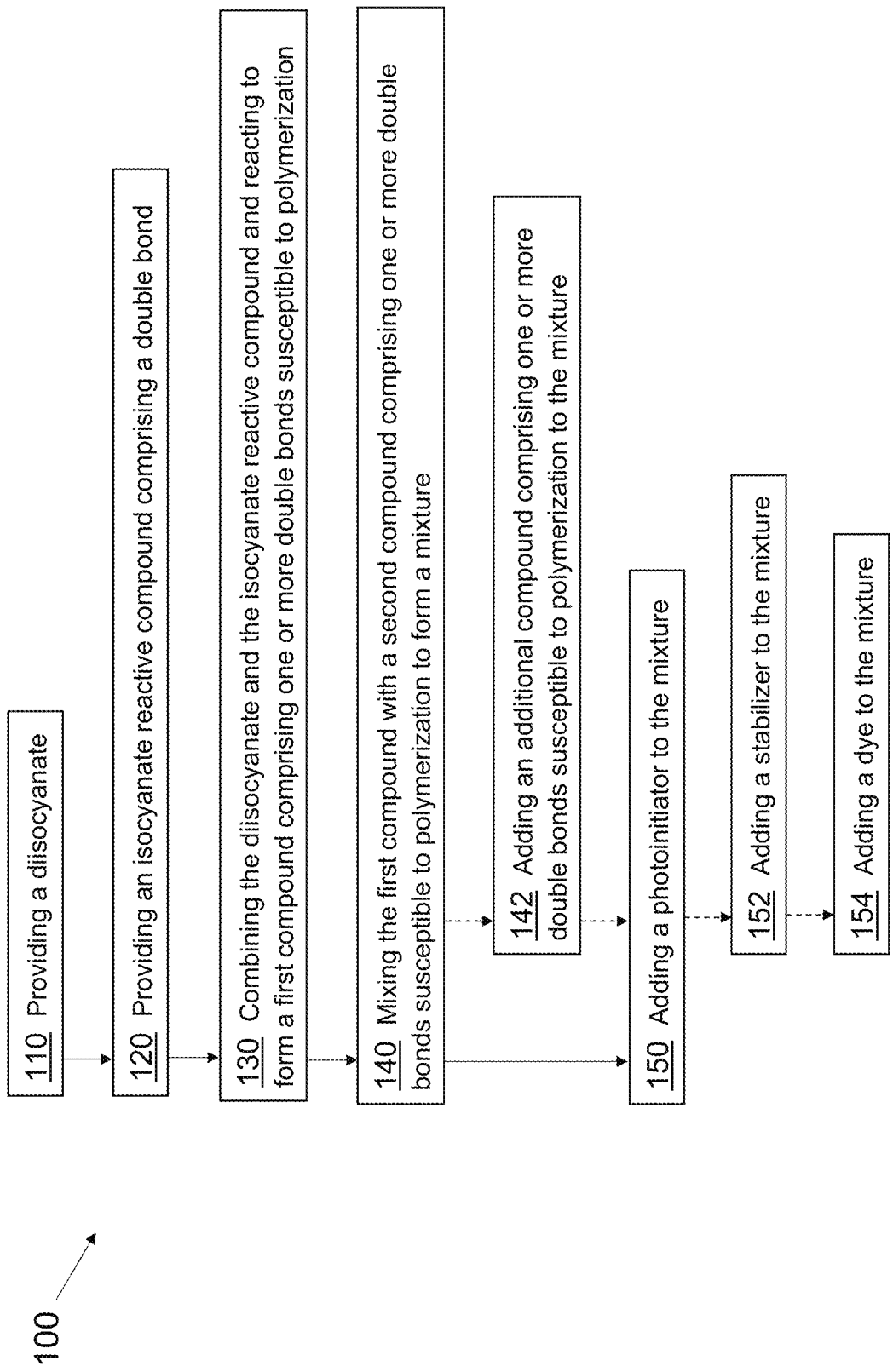
FIG. 1 is a flowchart of an exemplary method for making a photocurable resin composition.

It is to be understood that the Figures and descriptions of the present invention have been simplified to illustrate elements that are relevant for a clear understanding of the present invention, while eliminating, for the purpose of clarity, many other elements found in photocurable resin compositions as well as methods of making and using such materials. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of 20% or 10%, more preferably 5%, even more preferably 1%, and still more preferably 0.1% from the specified value, as such variations are appropriate to perform the disclosed methods.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

In one aspect, the invention relates to a photocurable resin composition. In a second aspect, the present invention relates to method of making a photocurable resin composition. In another aspect, the present invention relates to a method of fabricating an article comprising the photocurable resin. In a fourth aspect, the present invention relates to a method of assembling a 3D printed photocured resin to form an article.

Photocurable Resin Composition

In one aspect, the present invention relates to a photocurable resin composition. In one embodiment, the photocurable resin composition comprises a first compound comprising one or more double bonds susceptible to polymerization. In one embodiment, the first compound comprises the reaction product of one or more diisocyanates with one or more isocyanate reactive compounds comprising a double bond. Exemplary diisocyanates include, but are not limited to, 2,2,4-trimethylhexamethylene-1,6-diisocyanate; hexamethylene-1,6-diisocyanate (FIDI); cyclohexyl-1,4-diisocyanate; 4,4'methylene-bis(cyclohexyl isocyanate); 1,1'-methylenebis(4-isocyanato) cyclohexane; isophorone diisocyanate; 4,4'-methylene diphenyl diisocyanate (MDI); 1,4-tetramethylene diisocyanate; meta- and para-tetramethylxylene diisocyanate; 1,4-phenylene diisocyanate; 2,4' and 4,4'-diphenylmethane diisocyanate; 3-methylhexane-1,6-diisocyanate; 3-ethyl-1,6-hexanediisocyanate; 5-methyl-1,9-nonanediisocyanate; 5-ethyl-1,10-decanediisocyanate; 10-hexyl-1,2,4-tetracosane-diisocyanate; 2,3-dimethyl-1,6-hexanediisocyanate; 2,4-dimethyl-1,8-octanediisocyanate; 2,4,6-trimethyl-1,7-heptanediisocyanate; 2,3-dimethyl-5-ethyl-1,8-octanediisocyanate; 2-methyl-4,6,8,10-tetrapropyl-1,12-dodecanediisocyanate; 1,6-hexane diisocyanate (HDI); 1,8-octamethylene diisocyanate, tetramethylxylene diisocyanate (TMXDI); 4,4'-dicyclohexylmethane diisocyanate (HMDI); 3,3'-dimethyl-4,4'-biphenylene diisocyanate; 3,3'-dimethyldiphenylmethane-4,4'-diisocyanate; 4-bromo-6-methyl-1,3-phenylene diisocyanate; 2,4-toluene diisocyanate; 2,5-toluene diisocyanate; 2,6-toluene diisocyanate; 1,5-naphthalene diisocyanate; and combinations thereof.

In one embodiment, the isocyanate reactive compound comprising a double bond comprises a hydroxy acrylate or hydroxy methacrylate (i.e. a hydroxy (meth)acrylate). Exemplary hydroxy (meth)acrylates, but are not limited to, 2-hydroxyethyl (meth)acrylate; 2-hydroxypropyl (meth) acrylate; 3-hydroxypropyl (meth)acrylate; 4-hydroxybutyl (meth)acrylate; 8-hydroxyoctyl (meth)acrylate; 12-hydroxydodecanyl (meth)acrylate; 2-hydroxy-3-chloropropyl (meth)acrylate; 2-hydroxy-3-acryloxypropyl (meth)acrylate; 2-hydroxy-B-methacryloxypropyl (meth)acrylate; 2-hydroxy-3-allyloxypropyl (meth)acrylate; 2-hydroxy-3-cinnamylpropyl (meth)acrylate; 2-hydroxy-3-phenoxypropyl (meth)acrylate; 2-hydroxy-3-(o-chlorophenoxy) propyl (meth)acrylate; 2-hydroxy-3-(p-chlorophenoxy) propyl (meth)acrylate; 2-hydroxy-3-(2,4-dichlorophenoxy) propyl (meth)acrylate; 2-hydroxy-3-acetoxypropyl acrylate 2-hydroxy-3-propionoxypropyl (meth)acrylate; 2-hydroxy-3-chloroacetoxypropyl acrylate 2-hydroxy-3-dichloroacetoxypropyl (meth)acrylate; 2-hydroxy-3-trichloroacetoxypropyl (meth)acrylate; 2-hydroxy-3-benzoxypropyl acrylate 2-hydroxy-3-(o-chlorobenzoxy) propyl (meth)acrylate; 2-hydroxy-3-(p-chlorobenzoxy) propyl (meth)acrylate; 2-hydroxy-3-(2,4-dichlorobenzoxy) propyl (meth)acrylate; 2-hydroxy-3-(3,4-dichlorobenzoxy) propyl (meth)acrylate; 2-hydroxy-3-(2,4,6-trichlorophenoxy) propyl (meth)acrylate; 2-hydroxy-3-(2,4,5-trichlorophenoxy) propyl (meth) acrylate; 2-hydroxy-3-(o-chlorophenoxyacetoxy) propyl (meth)acrylate; poly(propylene glycol) (meth)acrylate; poly (ethylene glycol) (meth)acrylate; and combinations thereof.

A person having ordinary skill in the art would appreciate that the term "(meth)acrylate" in any instance encompasses the respective acrylate and methacrylate compounds.

In one embodiment, the isocyanate reactive compound comprising a double bond comprises an unsaturated carboxylic acid. Exemplary unsaturated carboxylic acids include, but are not limited to, maleic acid, fumaric acid, citraconic acid, mesaconic acid, itanconic acid, glutaconic acid, muconic acid, aconitic acid, crotonic acid, alpha-linolenic acid, stearidonic acid, eicosapentaenoic acid, docosahexaenoic acid, linoleic acid, gamma-linolenic acid, dihomogamma-linolenic acid, arachidonic acid, docosatetraenoic acid, palmitoleic acid, vaccenic acid, paullinic acid, oleic acid, elaidic acid, gondoic acid, erucic acid, nervonic acid, mead acid, and combinations thereof.

In one embodiment, the isocyanate reactive compound comprising a double bond comprises an unsaturated anhydride. Exemplary unsaturated anhydrides include, but are not limited to, maleic anhydride, fumaric anhydride, citraconic anhydride, itaconic anhydride, chloromaleic anhydride, methoxymaleic anhydride, ethylmaleic anhydride, and combinations thereof.

In one embodiment, the molar ratio of the isocyanate reactive compound comprising a double bond to diisocyanate is between 1:1 and 20:1. In one embodiment, the molar ratio of the isocyanate reactive compound comprising a double bond to diisocyanate is between 1:1 and 18:1. In one embodiment, the molar ratio of the isocyanate reactive compound comprising a double bond to diisocyanate is between 1:1 and 16:1. In one embodiment, the molar ratio of the isocyanate reactive compound comprising a double bond to diisocyanate is between 1:1 and 14:1. In one embodiment, the molar ratio of the isocyanate reactive compound comprising a double bond to diisocyanate is between 1:1 and 12:1. In one embodiment, the molar ratio of the isocyanate reactive compound comprising a double bond to diisocyanate is between 1:1 and 10:1. In one embodiment, the molar ratio of the isocyanate reactive compound comprising a double bond to diisocyanate is between 1:1 and 8:1. In one embodiment, the molar ratio of the isocyanate reactive compound comprising a double bond to diisocyanate is between 1:1 and 6:1. In one embodiment, the molar ratio of the isocyanate reactive compound comprising a double bond to diisocyanate is between 1:1 and 4:1. In one embodiment, the molar ratio the isocyanate reactive compound comprising a double bond to diisocyanate is between 2:1 and 3:1.

In one embodiment, the photocurable resin composition comprises a second compound comprising one or more double bonds susceptible to polymerization. In one embodiment, the second compound comprises a diacrylate or dimethacrylate (i.e. a di(meth)acrylate). Exemplary di(meth)acrylates include, but are not limited to, triethylene glycol di(meth)acrylate (TEG DMA), di(ethylene glycol)di(meth)acrylate, ethylene glycol di(meth)acrylate, propylene glycol di(meth)acrylate, di(propylene glycol)di(meth)acrylate, butane glycol di(meth)acrylate, glycerol di(meth)acrylate, bisphenol A di(meth)acrylate, 1,4-phenylene di(meth)acrylate, butanediol di(meth)acrylate, hexanediol dimethacrylate, and combinations thereof.

In one embodiment, the second compound comprises a triacrylate or a trimethacrylate (i.e. a tri(meth)acrylate). Exemplary tri(meth)acrylates include, but are not limited to, 1,1,1-trimethylolpropane tri(meth)acrylate; ethoxylated or propoxylated 1,1,1-trimethylolpropanetri(meth)acrylate; ethoxylated or propoxylated glycerol tri(meth)acrylate; pentaerythritol monohydroxy tri(meth)acrylate; ethoxylated tri methylolpropane tri(meth)acrylate; ethoxylated (9) trimethylol propane tri(meth)acrylate; pentaerythritol tri(meth) acrylate, propoxylated (3) glyceryl tri(meth)acrylate; propoxylated (3) trimethylol propane tri(meth)acrylate; tris (2-hydroxylethyl) isocyanurate tri(meth)acrylate; and combinations thereof.

In one embodiment, the second compound comprises an unsaturated carboxylic acid. Exemplary unsaturated carboxylic acids are described elsewhere herein. In one embodiment, the second compound comprises an unsaturated anhydride. Exemplary unsaturated anhydrides are described elsewhere herein.

In one embodiment, the photocurable resin composition comprises additional compounds comprising one or more double bonds susceptible to polymerization. Exemplary additional compounds comprise unsaturated carboxylic acids, unsaturated acid anhydrides, di(meth)acrylates, tri (meth)acrylates, and combinations thereof. Exemplary unsaturated carboxylic acids, unsaturated acid anhydrides, di(meth)acrylates, and tri(meth)acrylates are described elsewhere herein.

In one embodiment, the photocurable resin composition comprises one or more photoinitiators. Exemplary photoinitiators include, but are not limited to, 1-hydroxy-cyclohexylphenyl-ketone; diphenyl(2,4,6-trimethylbenzoyl) phosphine oxide; 2,4,6-trimethylbenzoylethoxyphenylphosphine oxide; bis(2,4,6-trimethylbenzoyl)-phenyl-phosphine oxide and other acyl phosphines; phenylbis(2,4,6-trimethylbenzoyl)phosphine oxide (BAPO); 2-methyl-1-(4-methylthio) phenyl-2-(4-morpholinyl)-1-propanone; 1-(4-(2-hydroxyethoxy)phenyl)-2-hydroxy-2-methylpropan-1-one; 2-benzyl 2-dimethylamino 1-(4-morpholinophenyl)-butanone-1; 2-hydroxy-1-(4-(4-(2-hydroxy-2-methylpropionyl)-benzyl)-phenyl)-2-methylpropan-1-one; 2-dimethylamino-2-(4-methylbenzyl)-1-(4-morpholin-4-yl-phenyl)-butan-1-one; titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; benzil; 2,3-boranedione (camphorquinone); 9-fluorene; 2-methylanthraquinone; diacetyl; benzanthrone; thioxanthene-9-one; benzoin isobutyl ether; 2-hydroxy-2,2-dimethyl-acetophenone; 2,4,5,7-tetrabromofluorescein (Eosin Y); 4,5-dibromo-2,7-dintrofluorescein disodium salt; riboflavin; fluorescein; $n^5$-2,4-cyclopentadien-1-yl) ((1,2,3, 4,5,6-n)-(1-methyl ethyl)benzene)-iron (+)-hexafluorophosphate (-1); 2-benzyl-2-n-dimethylamino-1-(4-morpholinophenyl)-1-butanone; bis(2,6-dimethoxy benzoyl)-2,4,4 trimethylpentyl phosphine oxide (DMBAPO); 2-hydroxy-2-methyl-1-phenylpropan-1-one (HMMP); 4-(2-hydroxyethoxy) phenyl-(2-hydroxy propyl)ketone; 2,2-dimethoxy-2-phenylacetophenone (BDK); 2-methyl-1-(4-(methylthio) phenyl)-2-morpholino propan-1-one (MMMP); 2-hydroxy-2-methyl-1-phenyl-propan-1-one (HMPP); 5,7-diiodo-3-butoxy-6-fluorene; 2,4,5,7-tetraiodo-3-hydroxy-6-fluorene; 2,4,5,7-tetraiodo-9-cyano-3-hydroxy-6-fluorene; and combinations thereof.

In one embodiment, the photocurable resin composition comprises one or more stabilizers. Exemplary stabilizers include, but are not limited to, butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, polyethylene glycols, polyvinylpyridine, polyninylpyrolidone, butanethiol, pentanethiol, hexanethiol, heptanethiol, octanethiol, decanethiol, dodecanethiol, 1,2-ethanedithiol, 1,3-propanedithiol, 1,4-butanedithiol, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid, bis(2,2,6,6-tetramethyl-1-octyloxy-4-piperidyl) sebacate; bis(1,2,2,6,6-pentamethyl-4-piperidyl) sebacate; methyl 1,2,2,6,6- pentamethyl-4-piperidyl sebacate; dimethyl sebacate, bis(2, 2,6,6-tetramethyl-4-piperidyl) sebacate, and combinations thereof.

In one embodiment, the photocurable resin composition comprises one or more dyes. Exemplary dyes include, but are not limited to, chromium-cobalt-aluminum oxide; ferric ammonium citrate; pyrogallol; logwood extract; 1,4-bis[(2-hydroxy-ethyl)amino]-9,10-anthracenedione bis(2-propenoic)ester copolymers; 1,4-bis[(2-methylphenyl)amino]-9, 10-anthracenedione; 1,4-bis[4-(2-methacryloxyethyl) phenylamino]anthraquinone copolymers; carbazole violet; chlorophyllin-copper complex; chromium oxide greens; C.I. Vat Orange 1; 2-[[2,5-diethoxy-4-[(4-methylphenyl)thiol] phenyl]azo]-1,3,5-benzenetriol; 7,16-dichloro-6,15-dihydro-5,9,14,18-anthrazinetetrone; Reactive Black 5; Reactive Blue 21; Reactive Orange 78; Reactive Yellow 15; Reactive Blue No. 19; Reactive Blue No. 4; C.I. Reactive Red 11; C.I. Reactive Yellow 86; C.I. Reactive Blue 163; C.I. Reactive Red 180; 4-[(2,4-dimethylphenyl)azo]-2,4-dihydro-5-methyl-2-phenyl-3H-pyrazol-3-one; 6-ethoxy-2-(6-ethoxy-3-oxobenzo[b]thien-2(3H)-ylidene) benzo[b] thiophen-3(2H)-one; phthalocyanine green; iron oxides; titanium dioxide; and combinations thereof.

In one embodiment, the photocurable resin composition comprises a first photocurable resin composition and a second photocurable resin composition. In one embodiment, the first photocurable resin composition comprises between 100 wt % and 50 wt % of the compound formed from the reaction of one or more diisocyanates with one or more isocyanate reactive compounds comprising a double bond. In one embodiment, the first photocurable resin composition comprises between 100 wt % and 60 wt % of the compound formed from the reaction of one or more diisocyanates with one or more isocyanate reactive compounds comprising a double bond. In one embodiment, the first photocurable resin composition comprises between 100 wt % and 70 wt % of the compound formed from the reaction of one or more diisocyanates with one or more isocyanate reactive compounds comprising a double bond. In one embodiment, the first photocurable resin composition comprises between 90 wt % and 70 wt % of the compound formed from the reaction of one or more diisocyanates with one or more isocyanate reactive compounds comprising a double bond. In one embodiment, the first photocurable resin composition comprises between 85 wt % and 75 wt % of the compound formed from the reaction of one or more diisocyanates with one or more isocyanate reactive compounds comprising a double bond. In one embodiment, the first photocurable resin comprises a compound formed from reaction of one or more diisocyanates with one or more hydroxy (meth)acrylates. Exemplary hydroxy (meth)acrylates are described elsewhere herein. In one embodiment, the compound formed from the reaction of one or more diisocyanates with one or more hydroxy (meth)acrylates comprises a urethane (meth) acrylate.

In one embodiment, the first photocurable resin composition comprises between 5 wt % and 50 wt % of the second compound comprising one or more double bonds. In one embodiment, the first photocurable resin composition comprises between 5 wt % and 45 wt % of the second compound comprising one or more double bonds. In one embodiment, the first photocurable resin composition comprises between 5 wt % and 40 wt % of the second compound comprising one or more double bonds. In one embodiment, the first photocurable resin composition comprises between 5 wt % and 35 wt % of the second compound comprising one or more double bonds. In one embodiment, the first photocurable resin composition comprises between 5 wt % and 30 wt % of the second compound comprising one or more double bonds. In one embodiment, the first photocurable resin composition comprises between 5 wt % and 25 wt % of the second compound comprising one or more double bonds. In one embodiment, the first photocurable resin composition comprises between 10 wt % and 25 wt % of the second compound comprising one or more double bonds. In one embodiment, the first photocurable resin composition comprises a second compound comprising a di(meth)acrylate. Exemplary di(meth)acrylates are described elsewhere herein.

In one embodiment, the first photocurable resin composition comprises less than 30 wt % photoinitiator. In one embodiment, the first photocurable resin composition comprises less than 25 wt % photoinitiator. In one embodiment, the first photocurable resin composition comprises less than 20 wt % photoinitiator. In one embodiment, the first photocurable resin composition comprises less than 15 wt % photoinitiator. In one embodiment, the first photocurable resin composition comprises less than 10 wt % photoinitiator. In one embodiment, the first photocurable resin composition comprises less than 5 wt % photoinitiator.

In one embodiment, the first photocurable resin composition comprises less than 30 wt % stabilizer. In one embodiment, the first photocurable resin composition comprises less than 25 wt % stabilizer. In one embodiment, the first photocurable resin composition comprises less than 20 wt % stabilizer. In one embodiment, the first photocurable resin composition comprises less than 15 wt % stabilizer. In one embodiment, the first photocurable resin composition comprises less than 10 wt % stabilizer. In one embodiment, the first photocurable resin composition comprises less than 5 wt % stabilizer.

In one embodiment, the second photocurable resin composition comprises between 10 wt % and 60 wt % of the compound formed from the reaction of one or more diisocyanates with one or more isocyanate reactive compounds comprising a double bond. In one embodiment, the second photocurable resin composition comprises between 20 wt % and 60 wt % of the compound formed from the reaction of one or more diisocyanates with one or more isocyanate reactive compounds comprising a double bond. In one embodiment, the second photocurable resin composition comprises between 30 wt % and 60 wt % of the compound formed from the reaction of one or more diisocyanates with one or more isocyanate reactive compounds comprising a double bond. In one embodiment, the second photocurable resin composition comprises between 40 wt % and 60 wt % of the compound formed from the reaction of one or more diisocyanates with one or more isocyanate reactive compounds comprising a double bond. In one embodiment, the second photocurable resin composition comprises between 45 wt % and 55 wt % of the compound formed from the reaction of one or more diisocyanates with one or more isocyanate reactive compounds comprising a double bond. In one embodiment, the second photocurable resin comprises a compound formed from reaction of one or more diisocyanates with one or more hydroxy (meth)acrylates. Exemplary hydroxy (meth)acrylates are described elsewhere herein. In one embodiment, the compound formed from the reaction of one or more diisocyanates with one or more hydroxy (meth)acrylates comprises a urethane (meth)acrylate.

In one embodiment, the second photocurable resin composition comprises between 5 wt % and 50 wt % of the second compound comprising one or more double bonds. In one embodiment, the second photocurable resin composition comprises between 5 wt % and 45 wt % of the second compound comprising one or more double bonds. In one embodiment, the second photocurable resin composition comprises between 5 wt % and 40 wt % of the second compound comprising one or more double bonds. In one embodiment, the second photocurable resin composition comprises between 5 wt % and 35 wt % of the second compound comprising one or more double bonds. In one embodiment, the second photocurable resin composition comprises between 5 wt % and 30 wt % of the second compound comprising one or more double bonds. In one embodiment, the second photocurable resin composition comprises between 5 wt % and 25 wt % of the second compound comprising one or more double bonds. In one embodiment, the second photocurable resin composition comprises between 10 wt % and 25 wt % of the second compound comprising one or more double bonds. In one embodiment, the second photocurable resin composition comprises between 12 wt % and 22 wt % of the second compound comprising one or more double bonds. In one embodiment, the second photocurable resin composition comprises a second compound comprising a di(meth)acrylate. Exemplary di(meth)acrylates are described elsewhere herein.

In one embodiment, the second photocurable resin composition comprises an additional compound comprising one or more double bonds. In one embodiment, the second photocurable resin composition comprises between 5 wt % and 50 wt % of the additional compound comprising one or more double bonds. In one embodiment, the second photocurable resin composition comprises between 10 wt % and 50 wt % of the additional compound comprising one or more double bonds. In one embodiment, the second photocurable resin composition comprises between 15 wt % and 50 wt % of the additional compound comprising one or more double bonds. In one embodiment, the second photocurable resin composition comprises between 20 wt % and 50 wt % of the additional compound comprising one or more double bonds. In one embodiment, the second photocurable resin composition comprises between 25 wt % and 50 wt % of the additional compound comprising one or more double bonds. In one embodiment, the second photocurable resin composition comprises between 25 wt % and 45 wt % of the additional compound comprising one or more double bonds. In one embodiment, the second photocurable resin composition comprises between 25 wt % and 40 wt % of the additional compound comprising one or more double bonds. In one embodiment, the second photocurable resin composition comprises between 25 wt % and 35 wt % of the additional compound comprising one or more double bonds. In one embodiment, the second photocurable resin composition comprises an additional compound comprising a tri(meth)acrylate. Exemplary tri(meth)acrylates are described elsewhere herein.

In one embodiment, the second photocurable resin composition comprises less than 30 wt % photoinitiator. In one embodiment, the second photocurable resin composition comprises less than 25 wt % photoinitiator. In one embodiment, the second photocurable resin composition comprises less than 20 wt % photoinitiator. In one embodiment, the second photocurable resin composition comprises less than 15 wt % photoinitiator. In one embodiment, the second photocurable resin composition comprises less than 10 wt % photoinitiator. In one embodiment, the second photocurable resin composition comprises less than 5 wt % photoinitiator.

In one embodiment, the second photocurable resin composition comprises less than 30 wt % stabilizer. In one embodiment, the second photocurable resin composition comprises less than 25 wt % stabilizer. In one embodiment, the second photocurable resin composition comprises less than 20 wt % stabilizer. In one embodiment, the second photocurable resin composition comprises less than 15 wt % stabilizer. In one embodiment, the second photocurable resin composition comprises less than 10 wt % stabilizer. In one embodiment, the second photocurable resin composition comprises less than 5 wt % stabilizer.

Method of Making a Photocurable Resin Composition

In one aspect, the present invention relates to a method of making a photocurable resin composition. Exemplary process 100 is shown in FIG. 1. In step 110, a diisocyanate is provided. In step 120, an isocyanate reactive compound comprising a double bond is provided. In step 130, the diisocyanate and isocyanate reactive compound are combined and react to form a first compound comprising one or more double bonds susceptible to polymerization. In step 140, the first compound is mixed with a second compound comprising one or more double bonds susceptible to polymerization to form a mixture. In step 150, a photoinitiator is added to the mixture.

In step 110, the diisocyanate may be any diisocyanate known to those of skill in the art. Exemplary diisocyanates are described elsewhere herein. In one embodiment, the diisocyanate is a solid. In one embodiment, the diisocyanate is mixed with a solvent. In one embodiment, the diisocyanate is mixed with an organic solvent. Exemplary organic solvents include, but are not limited to, pentane, hexane, diethyl ether, tetrahydrofuran, acetone, benzene, toluene, methanol, ethanol, isopropanol, ethyl acetate, DMF, dichloromethane, chloroform, and combinations thereof. In one embodiment, the diisocyanate is heated. In one embodiment, the diisocyanate is heated such that it melts. In one embodiment, the diisocyanate is heated between 10° C. and 100° C. In one embodiment, the diisocyanate is heated between 10° C. and 90° C. In one embodiment, the diisocyanate is heated between 10° C. and 80° C. In one embodiment, the diisocyanate is heated between 10° C. and 70° C. In one embodiment, the diisocyanate is heated between 20° C. and 70° C. In one embodiment, the diisocyanate is heated between 30° C. and 70° C. In one embodiment, the diisocyanate is heated between 40° C. and 70° C. In one embodiment, the diisocyanate is heated between 50° C. and 70° C. In one embodiment, the diisocyanate is heated between 55° C. and 65° C.

In step 120, the isocyanate reactive compound comprising a double bond may be any isocyanate reactive compound comprising a double bond known to those of skill in the art. Exemplary isocyanate reactive compounds are described elsewhere herein. In one embodiment, the isocyanate reactive compound is mixed with a solvent. In one embodiment, the isocyanate reactive compound is mixed with an organic solvent. Exemplary organic solvents are described elsewhere herein.

In step 130, the diisocyanate and the isocyanate reactive compound comprising a double bond can be combined using any method known to those of skill in the art. In one embodiment, the isocyanate reactive compound is added dropwise to the diisocyanate. In one embodiment, the isocyanate reactive compound is added all at once to the diisocyanate. In one embodiment, the diisocyanate is stirred while the isocyanate reactive compound is added. In one embodiment, the diisocyanate and the isocyanate reactive compound react at room temperature. In one embodiment, the diisocyanate and the isocyanate reactive compound react at an elevated temperature. In one embodiment, the reaction occurs at a temperature between 10° C. and 100° C. In one embodiment, the reaction occurs at a temperature between 10° C. and 90° C. In one embodiment, the reaction occurs at a temperature between 10° C. and 80° C. In one embodiment, the reaction occurs at a temperature between 10° C. and 70° C. In one embodiment, the reaction occurs at a temperature between 20° C. and 70° C. In one embodiment, the reaction occurs at a temperature between 30° C. and 70° C. In one embodiment, the reaction occurs at a temperature between 40° C. and 70° C. In one embodiment, the reaction occurs at a temperature between 50° C. and 70° C. In one embodiment, the reaction occurs at a temperature between 55° C. and 65° C. In one embodiment, solvent that is present during the reaction between the diisocyanate and the isocyanate reactive compound is removed. The solvent can be removed using any method known to a person of skill in the art. In one embodiment, the solvent is removed using filtration. In one embodiment, the solvent is removed by rotary evaporation.

In step 140, the second compound comprising one or more double bonds susceptible to polymerization may be any compound comprising one or more double bonds susceptible to polymerization known to those of skill in the art. Exemplary compounds comprising one or more double bonds susceptible to polymerization are described elsewhere herein. In one embodiment, the second compound is mixed with a solvent. In one embodiment, the second compound is mixed with an organic solvent. Exemplary organic solvents are described elsewhere herein.

In some embodiments, the step of mixing the first compound with a second compound comprising one or more double bonds susceptible to polymerization to form a mixture further comprises step 142, wherein an additional compound comprising one or more double bonds susceptible to polymerization is added to the mixture. The additional compound comprising one or more double bonds susceptible to polymerization may be any compound comprising one or more double bonds susceptible to polymerization known to those of skill in the art. Exemplary additional compounds are described elsewhere herein. In one embodiment, the additional compound is mixed with a solvent. In one embodiment, the additional compound is mixed with an organic solvent. Exemplary organic solvents are described elsewhere herein.

In step 150, the photoinitiator may be any photoinitiator known to those of skill in the art. Exemplary photoinitiators are described elsewhere herein. In one embodiment, the photoinitiator is mixed with a solvent. In one embodiment, the photoinitiator is mixed with an organic solvent. Exemplary organic solvents are described elsewhere herein.

In some embodiments, the step of adding a photoinitiator to the mixture further comprises step 152, wherein a stabilizer is added to the mixture. The stabilizer may be any stabilizer known to those of skill in the art. Exemplary stabilizers are described elsewhere herein. In one embodiment, the stabilizer is mixed with a solvent. In one embodiment, the stabilizer is mixed with an organic solvent. Exemplary organic solvents are described elsewhere herein.

In some embodiments, the step of adding a photoinitiator to the mixture further comprises step 154, wherein a dye is added to the mixture. The dye may be any dye known to those of skill in the art. Exemplary dyes are described elsewhere herein. In one embodiment, the dye is mixed with a solvent. In one embodiment, the dye is mixed with an organic solvent. Exemplary organic solvents are described elsewhere herein. In one embodiment, the dye is mixed with an aqueous solvent. Exemplary aqueous solvents include, but are not limited to water, distilled water, deionized water, salt water, and combinations thereof.

Method of 3D Printing a Photocurable Resin Composition

In one aspect, the present invention relates to a method of 3D printing a photocurable resin composition. The 3D printing technology may be any known to a person of skill in the art. Exemplary 3D printing technologies include, but are not limited to, continuous liquid interface production (CLIP), stereolithography, digital light processing, fused deposition modeling, selective laser sintering, selective laser melting, laminated object manufacturing, digital beam melting, carbon printing, and material jetting (such as Polyjet 3D printing). In one embodiment, the photocurable resin is printed using stereolithography. In one embodiment the stereolithography printer is a bottom-up system comprising a scanning laser. In one embodiment, the stereolithography printer is a top-down system comprising digital light projection. In one embodiment, the photocurable resin is printed using material jetting.

In one embodiment, the 3D printer uses STL format software. In one embodiment, the 3D printer uses ML format software. In one embodiment, the 3D printer prints an impression taken using a 3D scanner that is then digitized and converted to an STL or ML file.

In one embodiment, the printing speed is between 1 mm/hr and 100 mm/hr. In one embodiment, the printing speed is between 1 mm/hr and 90 mm/hr. In one embodiment, the printing speed is between 1 mm/hr and 80 mm/hr. In one embodiment, the printing speed is between 1 mm/hr and 70 mm/hr. In one embodiment, the printing speed is between 1 mm/hr and 60 mm/hr. In one embodiment, the printing speed is between 1 mm/hr and 50 mm/hr. In one embodiment, the printing speed is between 1 mm/hr and 40 mm/hr. In one embodiment, the printing speed is between 1 mm/hr and 30 mm/hr. In one embodiment, the printing speed is between 10 mm/hr and 30 mm/hr. In one embodiment, the printing speed is between 12 mm/hr and 25 mm/hr.

In one embodiment, the photocurable resin is printed/deposited onto a support. The support may be any support known to a person of skill in the art. In one embodiment, the photocurable resin is printed to form a support structure before the desired photocurable resin structure is printed onto a support structure. In one embodiment, the desired printed photocurable resin structure is held to the support structure using support pillars. In one embodiment, the support structure is attached to a 3D printing platform.

In one embodiment, the photocurable resin is irradiated during the printing process. In one embodiment, the photocurable resin is irradiated with UV light. In one embodiment, the photocurable resin is irradiated with visible light. In one embodiment, the photocurable resin is irradiated with light between 380 nm and 750 nm. In one embodiment, the photocurable resin is irradiated with light between 380 nm and 700 nm. In one embodiment, the photocurable resin is irradiated with light between 380 nm and 650 nm. In one embodiment, the photocurable resin is irradiated with light between 380 nm and 600 nm. In one embodiment, the photocurable resin is irradiated with light between 380 nm and 550 nm. In one embodiment, the photocurable resin is irradiated with light between 380 nm and 500 nm. In one embodiment, the photocurable resin is irradiated with light between 380 nm and 450 nm. In one embodiment, the photocurable resin is irradiated with light between 395 nm and 415 nm. In one embodiment, the irradiation is provided from a laser. In one embodiment, the photocurable resin composition is continuously irradiated during printing. In one embodiment, the photocurable resin composition is non-continuously irradiated during printing. In one embodiment, the irradiation photopolymerizes the photocurable composition. In one embodiment, the irradiation cures the photocurable composition.

In one embodiment, the photocurable composition forms thin layers as the composition is irradiated. In one embodiment, the layers are between 5 µm and 500 µm in height. In one embodiment, the layers are between 5 µm and 450 µm in height. In one embodiment, the layers are between 5 µm and 400 µm in height. In one embodiment, the layers are between 5 µm and 350 µm in height. In one embodiment, the layers are between 5 µm and 300 µm in height. In one embodiment, the layers are between 5 µm and 250 µm in height. In one embodiment, the layers are between 5 µm and 200 µm in height. In one embodiment, the layers are between 5 µm and 150 µm in height. In one embodiment, the layers are between 5 µm and 100 µm in height. In one embodiment, the layers are between 40 µm and 100 µm in height. In one embodiment, the layers are between 40 µm and 60 µm in height.

In one embodiment, the length of irradiation of each layer of photocurable resin depends on the desired height of the resin layer. In one embodiment, a layer of between 40 µm and 60 µm high is irradiated for 1 second to 1 minute. In one embodiment, a layer of between 40 µm and 60 µm high is irradiated for 1 second to 50 seconds. In one embodiment, a layer of between 40 µm and 60 µm high is irradiated for 1 second to 40 seconds. In one embodiment, a layer of between 40 µm and 60 µm high is irradiated for 1 second to 30 seconds. In one embodiment, a layer of between 40 µm and 60 µm high is irradiated for 1 second to 20 seconds. In one embodiment, a layer of between 40 µm and 60 µm high is irradiated for 5 seconds to 15 seconds.

In one embodiment, the photocurable resin is printed to form a solid structure. In one embodiment, the photocurable resin is printed to form a solid coating. In one embodiment, both a solid structure and a solid coating are printed. In one embodiment, the photocurable resin used to print the solid coating has a different composition than the photocurable resin used to print the solid structure. In one embodiment, the photocurable resin used to print the solid structure comprises a mixture of two or more photocurable resins with different compositions. In one embodiment, the photocurable resin used to print the solid coating comprises a mixture of two or more photocurable resins with different compositions. In one embodiment, the photocurable resin used to print the solid structure comprises a gradient of two or more photocurable resins with different compositions. In one embodiment, the photocurable resin used to print the solid coating comprises a gradient of two or more photocurable resins with different compositions. In one embodiment, the solid coating and solid structure are 3D printed separately and then assembled after printing. In one embodiment, the solid structure is printed to form an inner structure and then the solid coating is printed in the form of a coating/covering over one or more sides of the inner structure.

In one embodiment, the photocurable resin composition is printed to form a structure comprising a specific microarchitecture. In one embodiment, the microarchitecture is continuous throughout the 3D printed structure. In one embodiment, the microarchitecture is discontinuous throughout the 3D printed structure. In one embodiment, the microarchitecture comprises areas of a specific microarchitecture that are connected to areas lacking a specific microarchitecture. In one embodiment, the microarchitecture comprises pores or openings. In one embodiment, the microarchitecture comprises a meshwork structure. In one embodiment, a both solid coating and a microarchitecture are printed. The solid coating is described elsewhere herein. In one embodiment, the photocurable resin used to print the microarchitecture has a different composition than the photocurable resin used to print the solid coating. In one embodiment, the photocurable resin used to print the microarchitecture comprises a mixture of two or more photocurable resins with different compositions. In one embodiment, the photocurable resin used to print the microarchitecture comprises a gradient of two or more photocurable resins with different compositions. In one embodiment, the solid coating and microarchitecture are 3D printed separately and then assembled after printing. In one embodiment, the microarchitecture is printed to form an inner structure and then the solid coating is printed in the form of a coating/covering over one or more sides of the inner structure.

The microarchitecture may be created during the 3D printing process. In one embodiment, the microarchitecture may be created by chemical means, by physical means, by biological means, and combinations thereof. In one embodiment, the microarchitecture is formed during the 3D printing process. In one embodiment, solid portions of the microarchitecture are formed by irradiating certain areas of the photocurable resin. In one embodiment, pores or openings in the microarchitecture are formed by not irradiating certain areas of the photocurable resin. In one embodiment, the microarchitecture is created by chemical means. In one embodiment, the chemical means comprise voxel level printing. In one embodiment, the chemical means comprise sub-voxel level printing. In one embodiment, the microarchitecture can be created by physical means. Exemplary physical means include, but are not limited to, mechanical means, optical means, thermal means, electrical means, electromagnetic manipulation, and combinations thereof. In one embodiment, the microarchitecture can be created by biological means. Exemplary biological means include, but are not limited to, biochemical reactions, enzymatic reactions, living biological cells, synthetic biological cells, viruses, vesicles, and combinations thereof. In one embodiment, the biological means respond to external stimuli. In one embodiment, the biological means respond to local stimuli.

In one embodiment, an inner structure is printed and a solid coating over one or more sides of the inner structure is printed at the same time. In one embodiment, the inner structure comprises a microarchitecture. In one embodiment, the inner structure comprises a solid structure. In one embodiment, the inner structure comprises a mixture of microarchitecture areas and solid areas. In one embodiment, the inner structure and the solid coating are printed using stereolithography. In one embodiment, the inner structure and the solid coating comprise different photocurable resin compositions. In one embodiment, the different photocurable resin compositions are placed in the same 3D printing bath. In one embodiment, the different photocurable resins comprise different photoinitiators that polymerize the photocurable resins at different wavelengths. In one embodiment, the different photocurable resins comprise different photoinitiators that cure the photocurable resins at different wavelengths. In one embodiment, the different photocurable resin compositions are placed in separate 3D printing baths. In one embodiment, a layer of inner structure is 3D printed from one bath of photocurable resin and then a layer of coating is 3D printed from a second, separate bath.

In one embodiment, the inner structure and the solid coating are printed using material jetting. In one embodiment, the inner structure and solid coating can be printed as described elsewhere herein using material jetting. In one embodiment, the inner structure and solid coating can be printed using material jetting at the same time using one or more print heads. In one embodiment, material jetting deposits small droplets of one or more photocurable resins which are then polymerized and/or cured immediately after they are deposited. In one embodiment, material jetting deposits small droplets of one or more photocurable resins which are then polymerized and/or cured as they are deposited.

In one embodiment, the inner structure and the solid coating are printed using carbon printing. In one embodiment, the inner structure and solid coating can be printed as described elsewhere herein using carbon printing. In one embodiment, the photocurable resin can be printed using carbon printing from one bath of a first photocurable resin. In one embodiment, the photocurable resin can be printed using carbon printing from one bath of a first photocurable resin wherein the bath comprises one or more print heads. In one embodiment, the one or more print heads dispense one or more additional photocurable resins into the bath. In one embodiment, the additional photocurable resin(s) have a different composition than the first photocurable resin but are miscible with the first photocurable resin. In one embodiment, the one or more print heads dispense different amounts of the one or more additional photocurable resins into the bath throughout the printing process such that a gradient of first photocurable resin to additional photocurable resin(s) is formed throughout the resulting 3D printed article.

In one embodiment, the photocurable resin is printed using 3D printing to form an article comprising a microarchitecture, a solid coating structure, or a combination of the two structures. In one embodiment, the photocurable resin is printed using 3D printing to form an article comprising a solid structure, a solid coating structure, or a combination of the two structures. In one embodiment, the article is washed with a solvent to remove excess resin after printing is complete. The solvent can be any solvent known to a person of skill in the art. Exemplary solvents include, but are not limited to, water, distilled water, deionized water, hexanes, diethyl ether, acetone, methanol, ethanol, isopropanol, dichloromethane, toluene, THF, benzene, ethyl acetate, and combinations thereof.

In one embodiment, the 3D printed article is removed from the support by cutting the support pillars. In one embodiment, the surface of the 3D printed article is smoothed after the support pillars are cut. In one embodiment, the surface of the 3D printed article is smoothed by sanding. In one embodiment, the surface of the 3D printed article is smoothed using a dental drill. In one embodiment, the dental drill comprises a rubber point. In one embodiment, the dental drill comprises one or more disc attachments. In one embodiment, the support is dissolved. In one embodiment, the support is dissolved in an acidic solution. Exemplary acids include, but are not limited to, hydrochloric acid, sulfuric acid, acetic acid, nitric acid, citric acid, phosphoric acid, carbonic acid, boric acid, and combinations thereof. In one embodiment, the support is dissolved in a basic solution comprising a base. Exemplary bases include, but are not limited to, sodium hydroxide, potassium hydroxide, sodium bicarbonate, lithium hydroxide, calcium hydroxide, ammonia, and combinations thereof. In one embodiment, the basic solution comprises between 0.1 wt % and 50 wt % sodium hydroxide. In one embodiment, the basic solution comprises between 0.1 wt % and 40 wt % sodium hydroxide. In one embodiment, the basic solution comprises between 0.1 wt % and 30 wt % sodium hydroxide. In one embodiment, the basic solution comprises between 0.1 wt % and 20 wt % sodium hydroxide. In one embodiment, the basic solution comprises between 0.1 wt % and 10 wt % sodium hydroxide. In one embodiment, the basic solution comprises between 1 wt % and 5 wt % sodium hydroxide. In one embodiment, the basic solution further comprises a silicate. In one embodiment, the basic solution comprises between 0.1 wt % and 50 wt % sodium silicate. In one embodiment, the basic solution comprises between 0.1 wt % and 40 wt % sodium silicate. In one embodiment, the basic solution comprises between 0.1 wt % and 30 wt % sodium silicate. In one embodiment, the basic solution comprises between 0.1 wt % and 20 wt % sodium silicate. In one embodiment, the basic solution comprises between 0.1 wt % and 10 wt % sodium silicate. In one embodiment, the basic solution comprises between 0.1 wt % and 3 wt % sodium silicate.

In one embodiment, the 3D printed article is post-cured. In one embodiment, the 3D printed article is post-cured for 10 seconds to 60 minutes. In one embodiment, the 3D printed article is post-cured for 10 seconds to 50 minutes. In one embodiment, the 3D printed article is post-cured for 10 seconds to 40 minutes. In one embodiment, the 3D printed article is post-cured for 10 seconds to 30 minutes. In one embodiment, the 3D printed article is post-cured for 10 seconds to 20 minutes. In one embodiment, the 3D printed article is post-cured for 10 seconds to 10 minutes. In one embodiment, the 3D printed article is post-cured for 30 seconds to 2 minutes. In one embodiment, the 3D printed article is post-cured by irradiation with UV light. In one embodiment, the 3D printed article is post-cured by irradiation with visible light. In one embodiment, the 3D printed article is post-cured by irradiation with UV light and visible light. In one embodiment, the wavelength of light used for post-curing is determined by the absorption capacity of the photoinitiator used.

Method of Assembling a 3D Printed Photocured Resin to Form an Article

In some embodiments, 3D printed and photocured resin structures are assembled after printing to form an article. In one embodiment, the solid coating structure is connected to the microarchitecture after 3D printing such that it covers the microarchitecture on one or more sides to form the desired 3D printed article. In one embodiment, the solid coating structure is connected to the solid structure after 3D printing such that it covers the solid structure on one or more sides to form the desired 3D printed article. In one embodiment, the desired 3D printed article comprises an inner structure comprising a specific microarchitecture or comprising a solid structure covered on one or more sides by the solid coating.

In one embodiment, the solid coating structure is held to the inner structure using additional photocurable resin. In one embodiment, the additional photocurable resin is applied to the solid coating structure and then the inner structure is placed on top to form a two-layered article. In one embodiment, the two-layered article is irradiated to adhere the inner structure to the solid coating. In one embodiment, the two-layered article is irradiated between 10 seconds and 60 minutes. In one embodiment, the two-layered article is irradiated between 10 seconds and 50 minutes. In one embodiment, the two-layered article is irradiated between 10 seconds and 40 minutes. In one embodiment, the two-layered article is irradiated between 10 seconds and 30 minutes. In one embodiment, the two-layered article is irradiated between 10 seconds and 20 minutes. In one embodiment, the two-layered article is irradiated between 10 seconds and 10 minutes. In one embodiment, the two-layered article is irradiated between 10 seconds and 1 minute. In one embodiment, the two-layered article is irradiated with UV light. In one embodiment, the two-layered article is irradiated with visible light. In one embodiment, the two-layered article is irradiated with UV light. In one embodiment, the two-layered article is irradiated with both UV light and visible light. The wavelengths of UV and/or visible light that can be used to irradiate the two-layered article may be any wavelength disclosed elsewhere herein.

In one embodiment, a side of the inner structure not covered by a solid coating is covered with a second layer of solid coating structure, forming a three-layered article. In one embodiment, the second layer of solid coating structure is held to the inner structure using additional photocurable resin. In one embodiment, the inner structure comprises a microarchitecture and the pores in the microarchitecture are filled with additional photocurable resin and then the second solid coating structure is placed on top of the microarchitecture, forming a three-layered article. In one embodiment, the three-layered article is irradiated to adhere the inner structure to the second solid coating structure. In one embodiment, the irradiation further strengthens the adherence of the first solid coating structure to the inner structure. In one embodiment, the three-layered article is irradiated between 10 seconds and 60 minutes. In one embodiment, the three-layered article is irradiated between 10 seconds and 50 minutes. In one embodiment, the three-layered article is irradiated between 10 seconds and 40 minutes. In one embodiment, the three-layered article is irradiated between 10 seconds and 30 minutes. In one embodiment, the three-layered article is irradiated between 10 seconds and 20 minutes. In one embodiment, the three-layered article is irradiated between 10 seconds and 10 minutes. In one embodiment, the three-layered article is irradiated between 30 seconds and 2 minutes.

In one embodiment, the three-layered article is irradiated with UV light. In one embodiment, the three-layered article is irradiated with visible light. In one embodiment, the three-layered article is irradiated with UV light. In one embodiment, the three-layered article is irradiated with both UV light and visible light. The wavelengths of UV and/or visible light that can be used to irradiate the three-layered article may be any wavelength disclosed elsewhere herein.

3D Printed Resin Article

In one aspect, the present invention relates to a 3D printed article. The 3D printed article may comprise any shape known to a person of skill in the art. In one embodiment, the 3D printed article is a medical device. In one embodiment, the 3D printed article is a dental article. In one embodiment, the 3D printed article is a tooth aligner. In one embodiment, the 3D printed article is transparent. In one embodiment, the 3D printed article is colored.

In one embodiment, the 3D printed article comprises more than one photocurable resin composition that has been irradiated/photocured. Exemplary photocurable resin compositions are described elsewhere herein. In one embodiment, the article comprises an inner layer comprising a first resin composition. In one embodiment, the inner layer has a thickness of 0.1 mm to 1.5 mm. In one embodiment, the inner layer has a thickness of 0.1 mm to 1.4 mm. In one embodiment, the inner layer has a thickness of 0.1 mm to 1.3 mm. In one embodiment, the inner layer has a thickness of 0.1 mm to 1.2 mm. In one embodiment, the inner layer has a thickness of 0.1 mm to 1.1 mm. In one embodiment, the inner layer has a thickness of 0.1 mm to 1.0 mm. In one embodiment, the inner layer has a thickness of 0.1 mm to 0.9 mm. In one embodiment, the inner layer has a thickness of 0.1 mm to 0.8 mm. In one embodiment, the inner layer has a thickness of 0.2 mm to 0.8 mm. In one embodiment, the inner layer has a thickness of 0.3 mm to 0.8 mm.

In one embodiment, the inner layer comprising the first resin composition comprises a microarchitecture. In one embodiment, the inner layer comprises areas of microarchitecture and areas lacking microarchitecture. In one embodiment, the microarchitecture comprises pores or openings. In one embodiment, the pores are uniform in size. In one embodiment, the pores are various sizes. In one embodiment, the pores comprise an inner diameter of 0.1 mm to 50 mm. In one embodiment, the pores comprise an inner diameter of 0.1 mm to 45 mm. In one embodiment, the pores comprise an inner diameter of 0.1 mm to 40 mm. In one embodiment, the pores comprise an inner diameter of 0.1 mm to 35 mm. In one embodiment, the pores comprise an inner diameter of 0.1 mm to 30 mm. In one embodiment, the pores comprise an inner diameter of 0.1 mm to 25 mm. In one embodiment, the pores comprise an inner diameter of 0.1 mm to 20 mm. In one embodiment, the pores comprise an inner diameter of 0.1 mm to 15 mm. In one embodiment, the pores comprise an inner diameter of 0.1 mm to 10 mm. In one embodiment, the pores comprise an inner diameter of 0.1 mm to 5 mm. In one embodiment, the pores are not uniformly spaced. In one embodiment, the pores are uniformly spaced. In one embodiment, the microarchitecture comprises a honeycomb/beehive structure. In one embodiment, the microarchitecture comprises a meshwork structure.

In one embodiment, the microarchitecture comprises photocured resin having a thickness, between pores, of 0.1 mm and 50 mm. In one embodiment, the microarchitecture comprises photocured resin having a thickness, between pores, of 0.1 mm and 45 mm. In one embodiment, the microarchitecture comprises photocured resin having a thickness, between pores, of 0.1 mm and 40 mm. In one embodiment, the microarchitecture comprises photocured resin having a thickness, between pores, of 0.1 mm and 35 mm. In one embodiment, the microarchitecture comprises photocured resin having a thickness, between pores, of 0.1 mm and 30 mm. In one embodiment, the microarchitecture comprises photocured resin having a thickness, between pores, of 0.1 mm and 25 mm. In one embodiment, the microarchitecture comprises photocured resin having a thickness, between pores, of 0.1 mm and 20 mm. In one embodiment, the microarchitecture comprises photocured resin having a thickness, between pores, of 0.1 mm and 15 mm. In one embodiment, the microarchitecture comprises photocured resin having a thickness, between pores, of 0.1 mm and 10 mm. In one embodiment, the microarchitecture comprises photocured resin having a thickness, between pores, of 0.1 mm and 3 mm.

In one embodiment, the inner layer is covered with a second photocurable resin that has been irradiated/photocured. In one embodiment, the second photocured resin covers both sides of the inner layer. In one embodiment, the second photocured resin covers one side of the inner layer. In one embodiment, the photocured resin covering comprises a solid coating that does not have any pores or openings. In one embodiment, the photocured resin covering has a thickness of 0.01 mm to 1 mm. In one embodiment, the photocured resin covering has a thickness of 0.01 mm to 0.9 mm. In one embodiment, the photocured resin covering has a thickness of 0.01 mm to 0.8 mm. In one embodiment, the photocured resin covering has a thickness of 0.01 mm to 0.7 mm. In one embodiment, the photocured resin covering has a thickness of 0.01 mm to 0.6 mm. In one embodiment, the photocured resin covering has a thickness of 0.01 mm to 0.5 mm. In one embodiment, the photocured resin covering has a thickness of 0.01 mm to 0.4 mm.

In one embodiment, the photocured resin covering is the same resin that is used for the inner layer. In one embodiment, the photocured resin covering is a different resin than the first photocured resin used for the inner layer. In one embodiment, the photocured resin covering comprises a gradient of photocurable resin compositions. In one embodiment, the inner layer comprises a gradient of photocurable resin compositions. In one embodiment, the photocured resin covering has a different mechanical strength than the photocured resin used to form the inner layer. In one embodiment, the photocured resin used to cover the inner layer has a lower mechanical strength than the photocured resin used to form the inner layer. In one embodiment, the photocured resin used to cover the inner layer has a higher mechanical strength than the photocured resin used to form the inner layer. In one embodiment, the inner layer has varied localized mechanical strengths at different locations of the article. In one embodiment, the covering has varied localized mechanical strengths at different locations of the article.

In one embodiment, the 3D printed article, when tested with a preload of 0.01 N, has an initial stress of between 0.1 MPa and 50 MPa. In one embodiment, the 3D printed article, when tested with a preload of 0.01 N, has an initial stress of between 0.1 MPa and 45 MPa. In one embodiment, the 3D printed article, when tested with a preload of 0.01 N, has an initial stress of between 0.1 MPa and 40 MPa. In one embodiment, the 3D printed article, when tested with a preload of 0.01 N, has an initial stress of between 0.1 MPa and 35 MPa. In one embodiment, the 3D printed article, when tested with a preload of 0.01 N, has an initial stress of between 0.1 MPa and 30 MPa. In one embodiment, the 3D printed article, when tested with a preload of 0.01 N, has an initial stress of between 0.1 MPa and 25 MPa. In one embodiment, the 3D printed article, when tested with a preload of 0.01 N, has an initial stress of between 0.1 MPa and 20 MPa. In one embodiment, the 3D printed article, when tested with a preload of 0.01 N, has an initial stress of between 0.1 MPa and 15 MPa. In one embodiment, the 3D printed article, when tested with a preload of 0.01 N, has an initial stress of between 0.45 MPa and 10 MPa.

In one embodiment, the article, when tested with a preload of 0.01 N, shows a stress relaxation after 2 hours of between 5% and 95%. In one embodiment, the article, when tested with a preload of 0.01 N, shows a stress relaxation after 2 hours of between 10% and 95%. In one embodiment, the article, when tested with a preload of 0.01 N, shows a stress relaxation after 2 hours of between 15% and 95%. In one embodiment, the article, when tested with a preload of 0.01 N, shows a stress relaxation after 2 hours of between 20% and 95%. In one embodiment, the article, when tested with a preload of 0.01 N, shows a stress relaxation after 2 hours of between 25% and 95%. In one embodiment, the article, when tested with a preload of 0.01 N, shows a stress relaxation after 2 hours of between 30% and 95%. In one embodiment, the article, when tested with a preload of 0.01 N, shows a stress relaxation after 2 hours of between 35% and 95%. In one embodiment, the article, when tested with a preload of 0.01 N, shows a stress relaxation after 2 hours of between 40% and 95%. In one embodiment, the article, when tested with a preload of 0.01 N, shows a stress relaxation after 2 hours of between 45% and 95%. In one embodiment, the article, when tested with a preload of 0.01 N, shows a stress relaxation after 2 hours of between 45% and 90%. In one embodiment, the article, when tested with a preload of 0.01 N, shows a stress relaxation after 2 hours of between 45% and 85%. In some embodiments, the article is tested with a preload greater than 0.01 N.

In one embodiment, either or both of the inner microarchitecture and the solid coating comprises a thermoformed polymer, a printed polymer, a laser-cut polymer, a die-cut polymer, or a weaved polymer. In one embodiment, the microarchitecture comprises a segmented structure, a foam structure, or a lattice structure such as a square lattice, a triangular lattice, a rectangular lattice, a diamond lattice, a circular lattice, an oval lattice, and a hexagonal lattice.

In one embodiment, the article, when tested with a preload of at least 0.01 N, has an initial stress of between 0.45 MPa and 50 MPa. In one embodiment, the article, when tested with a preload of at least 0.01 N, has a stress relaxation after 2 hours of between 10% and 65% (equal to a remaining stress of between 35% and 90% of the initial stress).

In one embodiment, the thermoplastic comprises at least one selected from the group consisting of polyethylene terephthalate, poly cyclohexylenedimethylene terephthalate, polyamide, polyolefin, polysiloxane, chlorinated polyethylene, polyphenylene sulfone, epoxy, polystyrene, polyester, and polyurethane. In one embodiment, the photocured resin comprises at least one selected from the group consisting of a diacrylate compound, a triacrylate compound, a (meth)acrylate compound, a dimethacrylate compound, a diol compound, an isocyanate reactive compound comprising an acrylate or methacrylate, a diisocyanate compound, a urethane (meth)acrylate, and a photoinitiator.

In one embodiment, the article comprises at least one selected from the group consisting of:
  a) a diisocyanate compound selected from the group consisting of: 2,4-toluene diisocyanate, 2,5-toluene diisocyanate, 2,6-toluene diisocyanate, 4,4'-methylenebis(phenyl isocyanate), 4,4'-Methylene diphenyl diisocyanate, 1,6-Hexamethylene diisocyanate and Methylene bis(4-cyclohexylisocyanate), and any combination thereof;
  b) a diol compound selected from the group consisting of: Polycarbonate diol, Polycaprolactone diol, Poly(ethylene glycol), polypropylene glycol diol, Poly(dimethylsiloxane), hydroxy terminated, and any combination thereof;
  c) an acrylate and a (meth)acrylate compound selected from the group consisting of: poly(ethylene glycol) methacrylate, poly(ethylene glycol) acrylate, poly(propylene glycol) methacrylate, poly(propylene glycol) acrylate, 2-hydroxyethyl acrylate, 2-hydroxyethyl methacrylate, 2-hydroxypropyl acrylate, 2-hydroxypropyl methacrylate, methyl methacrylate, isobornyl acrylate, 3,3,4,4,5,5,6,6,7,7,8,8,9,9,10,10,10-Heptadecafluorodecyl methacrylate, Poly(propylene glycol) methyl ether acrylate, vinyltrimethoxysilane, pentaerythritol triacrylate and any combination thereof;
  d) a di(meth)acrylate selected from the group consisting of: triethylene glycol dimethacrylate, di(ethylene glycol)dimethacrylate, propylene glycol dimethacrylate, di(propylene glycol) dimethacrylate, tri(propylene glycol) diacrylate, and any combination thereof;

e) 1,1-trimethylolpropane triacrylate, trimethylolpropane triacrylate, pentaerythritol triacrylate, Pentaerythritol tetraacrylate, dipentaerythritol penta-/hexa-acrylate, and any combination thereof, and f) a photoinitiator selected from the group consisting of: diphenyl(2,4,6-trimethylbenzoyl) phosphine oxide, 2,4,6-trimethylbenzoylethoxyphenylphosphine oxide, bis(2,4,6-trimethylbenzoyl)-phenyl-phosphine oxide, (1-hydroxycyclohexyl) phenylmethanone, 2-hydroxy-2-methylpropiophenone, and any combination thereof.

In one embodiment, the photocured resin comprises a tetra(meth)acrylate, a penta(meth)acrylate, or a hexa(meth)acrylate.

In one embodiment, the article comprises 60-85 weight percent of a urethane (meth)acrylate, 10-40 weight percent of a di(meth)acrylate, and less than 5 weight percent of a photoinitiator.

In one embodiment, an article is fabricated by generating an inner microarchitecture comprising at least one selected from the group consisting of a photocured resin, thermally cured resin, and thermoplastic; placing a coating resin on at least a portion of a surface of the inner microarchitecture; and curing the coating resin to generate a solid coating comprising at least one selected from the group consisting of a photocured resin, thermally cured resin, and thermoplastic, wherein the solid coating covers at least a portion of a surface of the inner microarchitecture.

In one embodiment, the method further comprises the steps of placing a second coating resin on at least a portion of a surface of the inner microarchitecture that is not covered by the first solid coating; and curing the second coating resin to generate a second solid coating comprising at least one selected from the group consisting of a photocured resin, thermally cured resin, thermoformed polymer, printed polymer, laser-cut polymer, die-cut polymer, and weaved polymer, wherein the second solid coating covers at least a portion of a surface of the inner microarchitecture that is not covered by the first solid coating. Alternatively, the inner microarchitecture can be made with an initial resin top and bottom, and then have a second solid layer on top and bottom. The second solid layer can cover the first initial layer, making it a system of at least 3 layers (microarchitecture, first filler, second layer) where the second layer may or may not contact directly the inner microarchitecture and each layer can comprised of same or different materials.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Example 1: Synthesis of Photocurable Bioinks

Materials and Methods
Synthesis of Photocurable MDI-PEGMA
MDI-PEGMA was synthesized using 4,4'-methylenebis(phenyl isocyanate) (MDI) (10.00 g, 40.00 mmol) which was added into a round bottom flask with inert atmosphere, stir bar, and heated to 60° C. Upon melting of the MDI reagent, poly(ethylene glycol) methacrylate (PEGMA) (32.55 mL, 100.00 mmol) was added dropwise and allowed to react for 8 hr at 60° C. Afterwards, the reaction was allowed to run overnight at room temperature. The compound synthesized (MDI-PEGMA) was collected using a positive displacement pipette and characterized by proton nuclear magnetic resonance spectroscopy ($^1$H NMR) on a Bruker AV300 broad band FT NMR Spectrometer (Billerica, Mass., USA) and by Fourier Transform Infrared Spectroscopy (FT-IR) on a PerkinElmer Spectrum Two FT-IR Spectrometer (Waltham, Mass., USA).

Figure 2:
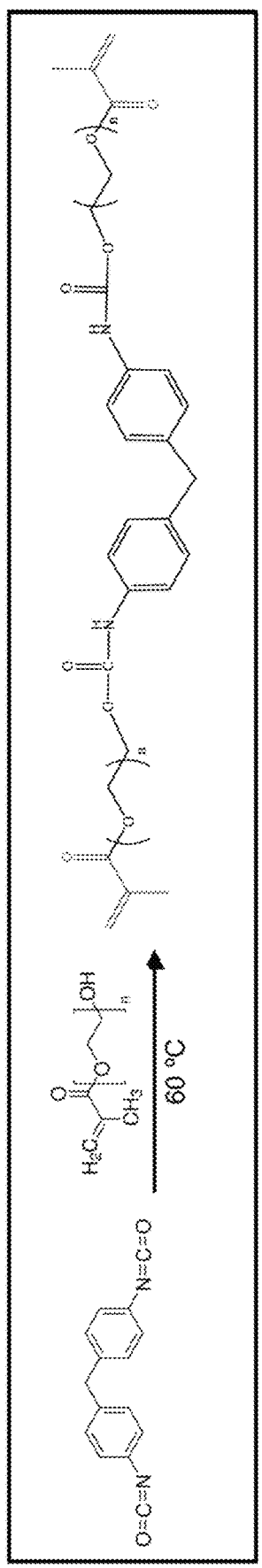
FIG. 2 depicts the synthesis of MDI-PEGMA from 4,4'-methylenebis(phenyl isocyanate) (MDI) and poly(ethylene glycol) methacrylate (PEGMA). The methacrylate groups susceptible to photo-reactivity are indicated in red.
Figure 3:
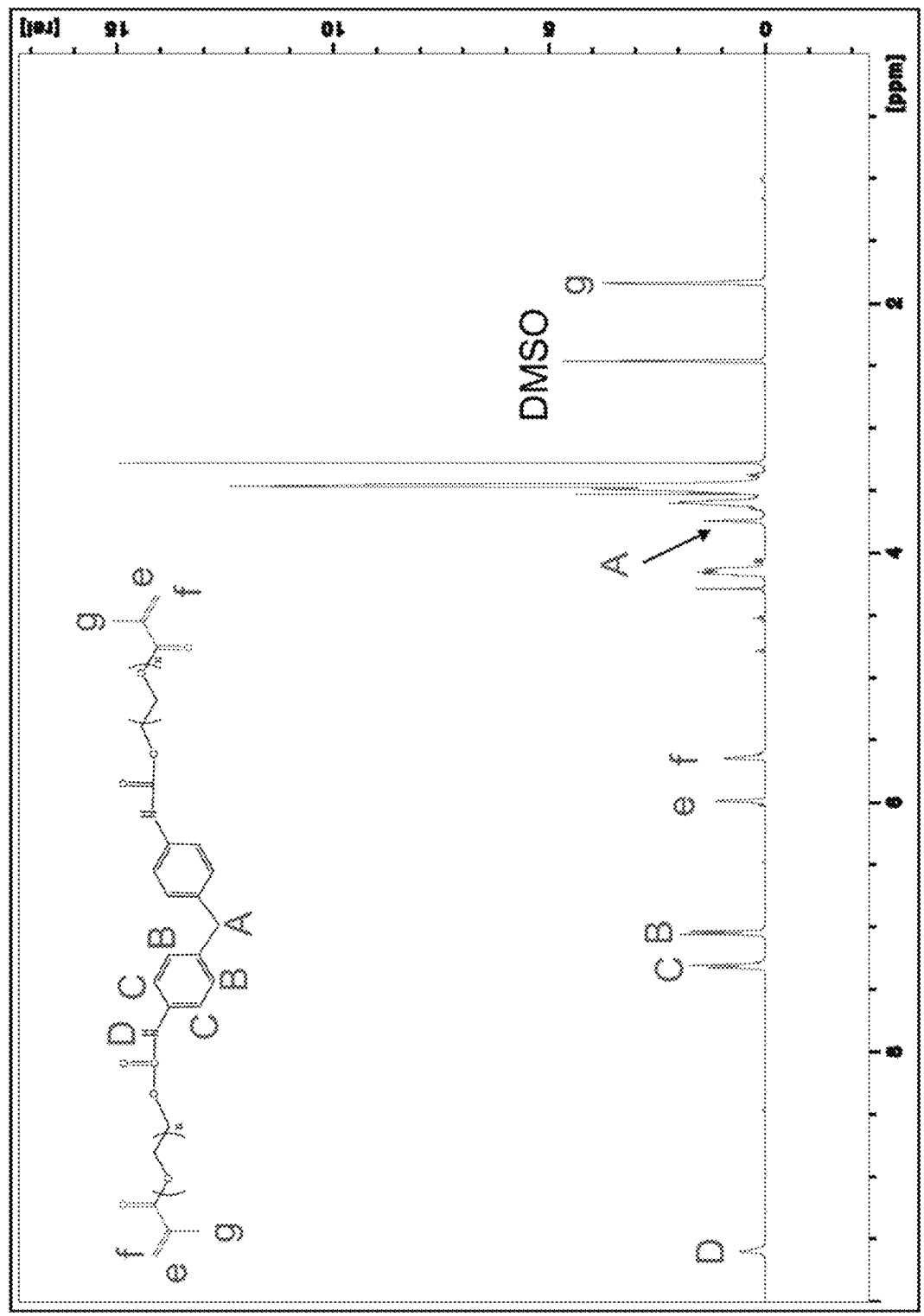
FIG. 3 depicts a $^1$H NMR spectrum of MDI-PEGMA in DMSO.

Characterization of MDI-PEGMA
The photocurable resins (aka Bioinks) comprise a urethane containing compound which is synthesized in a reaction between diisocyanate groups and the hydroxyl groups of a hydroxy (meth)acrylate. FIG. 2 shows a reaction scheme depicting how the synthesis performed. MDI was utilized as the diisocyanate agent and PEGMA was chosen as the hydroxyl group containing reagent, due to its acrylate group which adds photo-reactivity to the final product, MDI-PEGMA. The product was tested via $^1$H NMR to confirm the reaction between isocyanates and hydroxyl groups (FIG. 3). The appearance of an aromatic peak at δ 7.32 ppm (C) representing four aromatics protons confirms the reaction of MDI with PEGMA. FTIR analysis was done to confirm the complete reaction of isocyanates (FIGS. 4A and 4B). The absence of a peak in the 2000-2400 cm-1 region indicates the disappearance of isocyanate groups and further confirms its reaction with the hydroxyl group in PEGMA.

Synthesis of Photocurable Bioinks
Synthesis of Bioinks Comprising MDI-PEGMA: Bioinks 1 and 2

Upon synthesis of the urethane containing compounds, the photoinitiator diphenyl(2,4,6-trimethylbenzoyl) phosphine oxide and the stabilizer bis(2,2,6,6-tetramethyl-4-piperidyl) sebacate were added to MDI-PEGMA at a final concentration of 2% and 1%, respectively. Additionally, the compounds triethylene glycol dimethacrylate and trimethylolpropane triacrylate were incorporated at different ratios for the formation of a Bioink resulting in a softer material (Bioink 1) and the formation of a stronger plastic (Bioink 2). All chemicals were purchased from Sigma-Aldrich.

Two Bioinks were created using MDI-PEGMA as the resin's main component. The first one (Bioink 1), designed to have a low mechanical strength, contained 80% MDI-PEGMA, 17% triethylene glycol dimethacrylate, 2% diphenyl(2,4,6-trimethylbenzoyl) phosphine oxide as photoinitiator, and 1% bis(2,2,6,6-tetramethyl-4-piperidyl) sebacate as stabilizer.

A stronger Bioink (Bioink 2) was designed including 50% MDI-PEGMA, 17% triethylene glycol dimethacrylate, 30% trimethylolpropane triacrylate, 2% diphenyl(2,4,6-trimethylbenzoyl) phosphine oxide as photoinitiator, and 1% bis(2,2,6,6-tetramethyl-4-piperidyl) sebacate as stabilizer.

Synthesis of Bioink 3
A stronger resin (Bioink 3) was synthesized utilizing tolylene-2,4-diisocyanate (TDI) as diisocyanate and a combination of poly(ethylene glycol) methacrylate and 2-hydroxyethyl acrylate as hydroxyl groups for the formation of an acrylated urethane containing compound. Tolylene-2,4-diisocyanate (25.00 g, 143.5 mmol) was added into a round bottom flask with inert atmosphere, stir bar, and heated to 60° C. Subsequently, poly(ethylene glycol) methacrylate (PEGMA) (23.38 mL, 71.8 mmol) and 2-hydroxyethyl acrylate (32.97 mL, 287.1 mmol) were added dropwise and allowed to react for 4 hr at 60° C. Afterwards, the reaction was allowed to run overnight at room temperature. 77% of the final photocurable Bioink 3 resin contained the product of this reaction. The rest of the Bioink 3 resin was made out of triethylene glycol dimethacrylate (20%), diphenyl(2,4,6- trimethylbenzoyl) phosphine oxide as photoinitiator (2%), and bis(2,2,6,6-tetramethyl-4-piperidyl) sebacate as stabilizer (1%).

Bioink Polymerization and Mechanical Properties

To test the polymerization capacity of these Bioinks, 1.50 mL were pipetted onto a metal mold resembling a flat sheet (53 mm length, 29 mm width) fabricated through computer numerical control (CNC) milling machinery. The resins were then exposed to blue light (415 nm) (Polylight® PL500, Rofin Forensic) at an intensity of 25 mW/cm$^2$ for 1 s, 10 s, and 1 min in order to confirm its polymerization capacity. The plastic sheet obtained after 1 min of light exposure was cut down to 10 mm in length and 2.5 mm of width, having a thickness of 0.8 mm. The pieces obtained were tested through DMA analysis with a pre-load of 0.01 N for a period of 120 min and their initial stress and stress relaxation was assessed. This test was performed with Bioink 1, Bioink 2, and samples of the material utilized in Invisalign aligners (SmartTrack).

Material Microarchitecture Design for Reduced Stress Relaxation

Utilizing CNC machinery, two metal molds were fabricated containing meshwork patterns (Pattern A and Pattern B). The patterns in the molds were filled with 160 μL of Bioink 2 (stronger material) and exposed to light to induce its polymerization. Furthermore, 320 μL of Bioink 1 were added on top of the mesh, still located in the metal mold, and photopolymerized. Subsequently, the piece was turned over and 320 μL of Bioink 1 were added and polymerized on the other side of the mesh. The product, a plastic sheet containing an internal scaffold composed of a stronger material, was cut to the dimensions specified in the previous section and tested by DMA analysis with a preload of 0.01 N for a period of 120 min.

Additionally, plastic sheets were made by photopolymerizing layer by layer combinations of Bioink 1 and Bioink 2, in order to test the effect of layering materials over stress relaxation and compare it with meshwork embedded materials. Two layering combinations were assessed for this analysis. In the first one, 600 μL of Bioink 1 were pipetted onto the metal mold used in section 2 and photopolymerized. This layer was followed by the addition of two more layers of Bioink 1 for a total thickness of 0.8 mm and a plastic sheet composed of three layers of Bioink 1 stacked together. To fabricate the second sample, 600 μL of Bioink 1 were pipetted onto the metal mold utilized in section 2 and polymerized. Subsequently, 600 μL of Bioink 2 were added and polymerized on top of the polymerized Bioink 1. Finally, a third layer of Bioink 1 (600 μL) was added on top of the previous two layers and polymerized for the formation of a plastic sheet composed of two soft layers on its top and bottom and a stronger middle layer. The two layered samples were tested by DMA analysis with a preload of 0.01 N for a period of 20 min.

Figure 5:
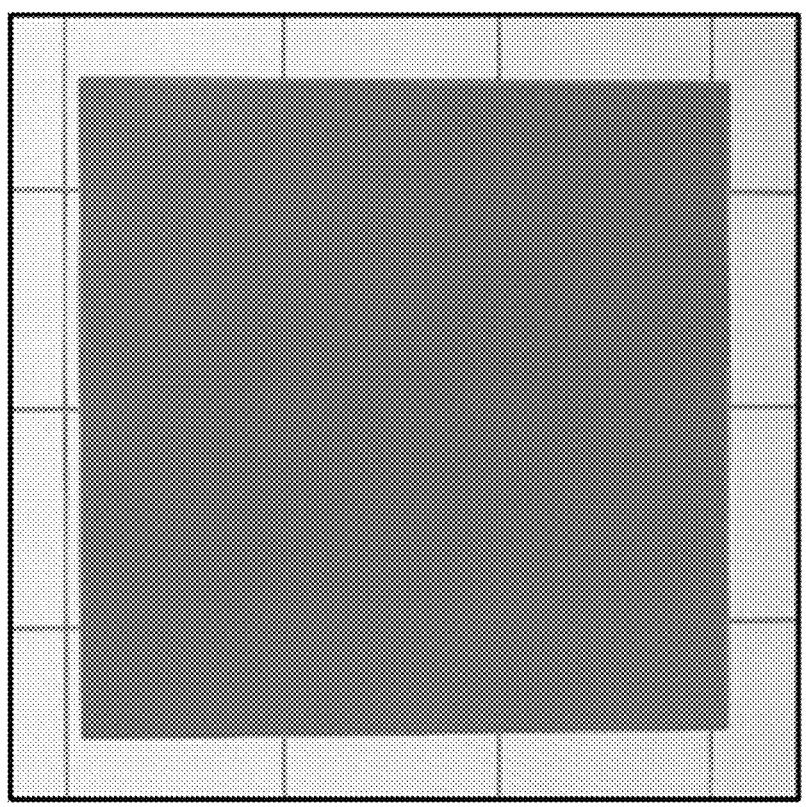
FIG. 5 depicts a square designed for top and bottom layers of plastic.

Utilizing Bioink 2 (stronger MDI-PEGMA resin) and TDI resin (Bioink 3) several parts were 3D printed and assembled together in order to form a plastic sheet composed of 3 layers. The top and bottom sheets were a square 3D printed using the softer of the two resins (Bioink 2) and stereolithography 3D printing machinery (FIG. 5). The middle layer was a sheet with a beehive structure made out of Bioink 3 via 3D printing. Two versions of this layer were fabricated, one with a beehive inner diameter of 3.0 mm (FIG. 6A) and another one with an inner diameter of 1.5 mm (FIG. 6B). Furthermore, the lines used were of 1.0 mm and 0.5 mm in thickness, respectively.

The printed parts were cleaned and excess of resin was removed. Each part was post-cured for 1 min under UV light to fully polymerize the resin to its higher strength capacity. FIGS. 7A-7D show the three printed parts and demonstrate how each one of them was placed between glass slides prior to the post-curing process to maintain their flat structure and avoid bending of the material.

Figure 8:
FIG. 8, comprising

Following the printing of parts, the 3 layers were merged together via light exposure and the addition of more Bioink 2, serving as adhesive between layers (FIGS. 8A-8C). First, a square sheet and a beehive were glued together by adding a thin layer of Bioink 2 on top of the square, placing the beehive structure on top, and shining light for 30 sec to merge the sheets. Additional Bioink 2 was added on top of the beehive to cover the empty spaces prior to placing the top square layer on top and the exposure of light for 1 min to finalize the process. This additional Bioink 2 guaranteed that the top and bottom layers merged together.

Figure 9:
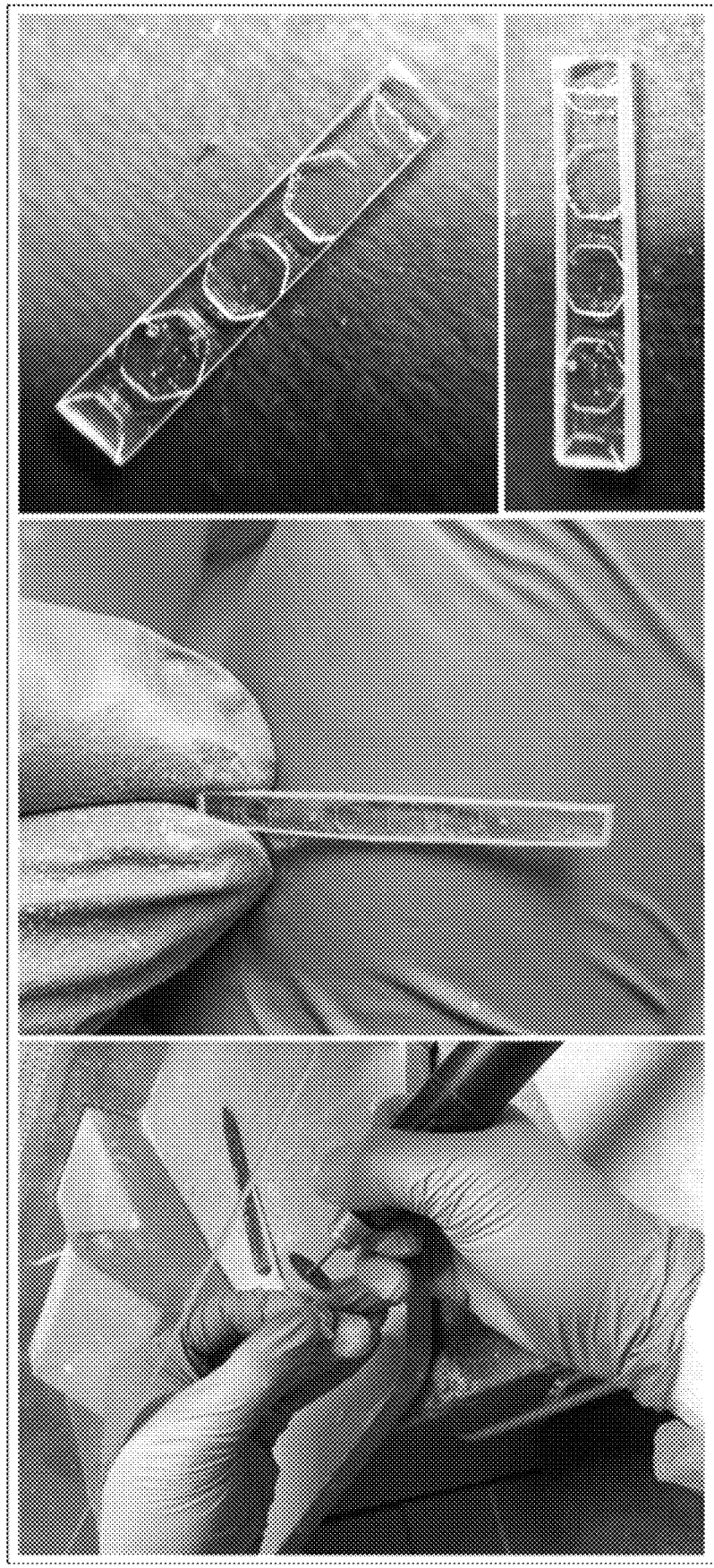
FIG. 9 depicts a sample preparation for dynamic mechanical analysis (DMA).

Following the assembly of the plastic sheet, samples were prepared for DMA testing. The pieces were crafted utilizing a straight handpiece and a cutting disc (FIG. 9).

Orthodontic Clear Aligner Stereolithography 3D Printing

An orthodontic clear aligner was built using Bioink 2 and a stereolithography 3D printer (Wanhao Duplicator 7 Plus Touch Screen UV DLP Resin 3D Printer). A light exposure time of 10 s at a wavelength of 405 nm was utilized for a layer thickness of 50 μm. Under these conditions, the process performed at a printing speed of 18 mm/hr. An STL file containing the 3D drawing of an aligner was loaded to the printer (FIGS. 10A-10D) and a support structure was added to the piece, required for printing due to the nature of stereolithography. Considering this additional printed material, an aligner printing time ranges between 2 hours and 3 hours. After printing, the aligner and the supporting scaffold utilized for the 3D printing process were attached to the surface of the printing platform (FIG. 11A). The inventive polymerized material resulted in a clear solid with good strength immediately after removal from the 3D printer and was ready for post-processing. The part was then removed from the platform and the excess resin was removed with an ethanol wash (FIG. 11B). The support material was removed by trimming the scaffold attached to the aligner and/or using a dental drill. The support pillars that attach the aligner to the support scaffold can be seen in FIG. 11C while FIG. 11D shows the aligner after some of the support pillars have been trimmed. The aligner can then be left overnight in an ethanol bath and dried the next day under compressed air. No post-curing was required.

Different views of an aligner after being trimmed of its supporting material show the quality of the finished product, including images of a full aligner after post-processing (FIGS. 12A and 12B), a sectioned view (FIG. 12C), a cross-sectional view (FIG. 12D), the bottom (FIG. 12E), and the finish of the area after trimming of the support material (FIG. 12F). These figures demonstrate that a polished product can be obtained through stereolithography 3D printing.

Results and Discussion

The present invention relates in part to novel photocurable materials formed using the methods described herein and the use of these photocurable materials as superior plastics for production of orthodontic aligners. The instant invention based in part on the fabrication of photocurable resins Bioink 1, Bioink 2, and Bioink 3 and the formation of plastics with controlled patterns using these resins. This novel material microarchitecture and plastic composition results in reduced stress relaxation.

Bioink Polymerization and Mechanical Properties

To prepare samples for mechanical testing, 1.50 mL of Bioink 1 were pipetted onto a metal mold and exposed to blue light for 1 min (FIGS. 13A and 13B). The polymerized part was removed from the mold resulting in a clear plastic that was analyzed via DMA test to assess its mechanical properties (FIGS. 13C and 13D). The same procedure was executed with Bioink 2.

Figure 14:
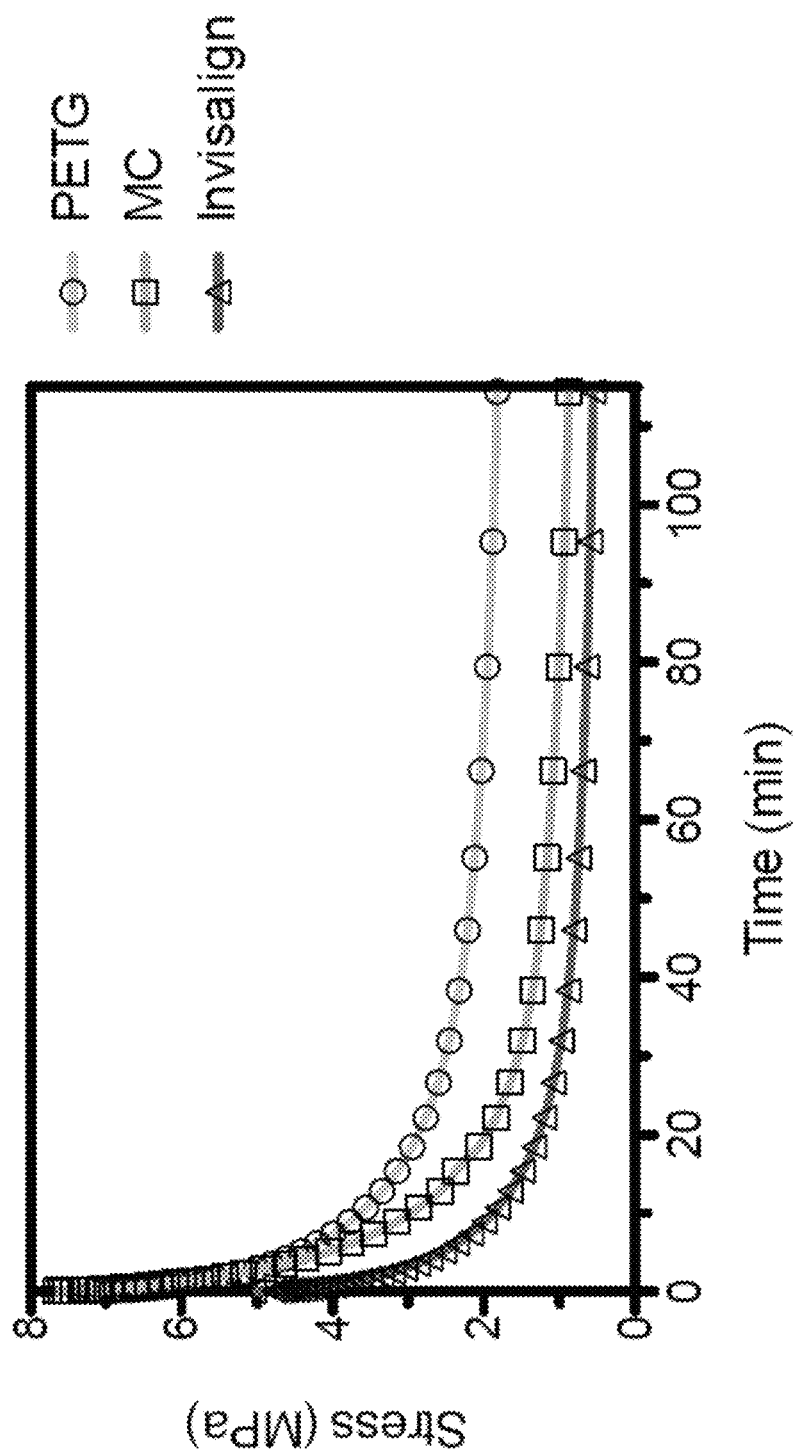
FIG. 14 depicts a stress relaxation of orthodontic aligner materials.

Thermoplastic materials that are commonly used by companies that produce commercially available orthodontic aligners (Invisalign and Align Technologies (MC)) and aligners made of poly(ethylene terephthalate) (PETG) were tested via DMA (FIG. 14) and compared to the bioinks of the present invention. The DMA results show a difference in initial stress and stress relaxation between Bioink 1 and Bioink 2, where Bioink 2 had a higher initial stress (3.62 MPa) and lower stress relaxation (91.18%), when compared with Bioink 1 (1.11 MPa, 98.36%) (Table 1). The Invisalign material, SmartTrack, was also tested through the same DMA analysis and conditions showing an initial stress of 5.05 MPa and a stress relaxation of 88.95%. These results indicate that SmartTrack has a slightly higher initial stress than Bioink 2 (1.43 MPa difference) and a similar stress relaxation in a period of 120 min, with a difference of only 2.23%. A small increment in initial stress maintaining the same stress relaxation would place Bioink 2 in the same category as the market leader in terms of mechanical properties. However, significant improvements on stress relaxation could allow for the use of softer and more comfortable materials, while maintaining relevant mechanical strengths towards orthodontic clinical treatments.

TABLE 1

Mechanical Properties of Invisalign and Synthesized Bioinks (120 min DMA Test).

|  | Initial Stress (MPa) | Stress Relaxed (%) | Remaining Stress (%) |
| --- | --- | --- | --- |
| Invisalign | 5.05 ± 0.40 | 88.95 | 11.05 |
| Bioink 1 | 1.11 ± 0.33 | 98.36 | 1.64 |
| Bioink 2 | 3.62 ± 0.40 | 91.18 | 8.82 |

Material Microarchitecture Design for Reduced Stress Relaxation

The present invention relates to the use of defined microarchitectures within polymeric sheets with the goal of reducing stress relaxation in materials for orthodontic clear aligner applications. Two approaches were tested to prove this methodology. Two metal molds with Pattern A and Pattern B were fabricated (FIGS. 15A-15F) and filled with Bioink 2 for the formation of polymerized architectures. The polymerized structures were then sandwiched between two layers of the softer Bioink 1 in order to complete a plastic sheet. This was performed by pipetting a layer of Bioink 1 and polymerizing it on each side of the structure. The resulting plastic sheets were tested by DMA at a preload of 0.01 N and for a period of time of 120 min.

Figure 16:
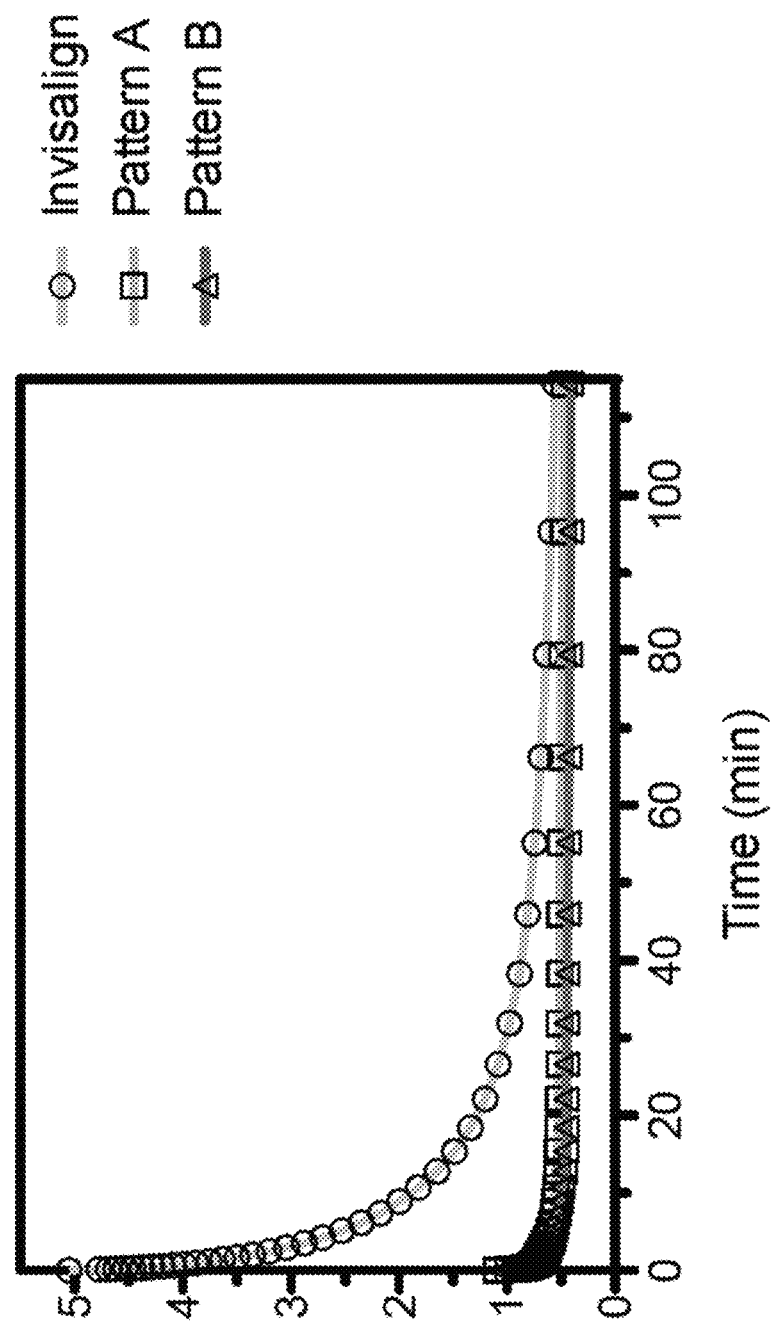
FIG. 16 depicts a stress relaxation of meshwork designs and SmartTrack.

The data indicate that a scaffold with a defined microarchitecture within the photopolymerized plastic reduces significantly the stress relaxation experienced in the material. A comparison of the stress relaxation curves of Pattern A, Pattern B, and SmartTrack samples show that, after 2 hours, the remaining stress is very similar between SmartTrack and the meshwork samples, even though SmartTrack has a significantly higher initial stress (FIG. 16). In particular, Patterns A and B have stress relaxations of 56.57% and 60.51%, respectively which are significantly lower values when compared to the current market standard SmartTrack (Align Technologies), which showed a stress relaxation of 88.95% after 2 hours (Table 2).

TABLE 2

Mechanical Properties of Invisalign and Meshwork Designs (120 min DMA Test).

|  | Initial Stress (MPa) | Stress Relaxed (%) | Remaining Stress (%) |
| --- | --- | --- | --- |
| Invisalign | 5.05 ± 0.40 | 88.95 | 11.05 |
| Pattern A | 1.10 ± 0.31 | 56.57 | 43.43 |
| Pattern B | 1.04 ± 0.42 | 60.51 | 39.49 |

Considering the initial stress (5.05 MPa) and large stress relaxation experienced by the SmartTrack material (88.95%), it can be concluded that after a 2 hour period the aligner remaining stress is 0.5580 MPa. Doing the same analysis with the Pattern A mesh, a remaining stress of 0.4777 MPa is obtained, a difference of only 0.0803 MPa when compared to SmartTrack. Two major conclusions can be drawn from these results: 1) controlling the microarchitecture and spatial material composition of the plastics designed for orthodontic clear aligner applications can reduce significantly the stress relaxation experienced by these devices; 2) it is possible to design softer and therefore more comfortable materials to be worn by patients that at the same time apply the necessary mechanical stress in order to achieve a successful clinical outcome. This microarchitecture concept could be applied in both 3D printing and the traditional thermoforming of plastic sheets currently used in the market. In the latter case, sheets of different plastic stacked together with different patterns would achieve the desired initial force and stress relaxation properties.

In addition to this meshwork approach, a layering setting was executed to test if the microarchitecture design is indeed critical for the stress relaxation effect seen, or if only creating layers of materials with the same or diverse mechanical strengths is enough to obtain the observed result. The first layering pattern (Pattern C) (FIG. 17A) was composed of three layers of Bioink 1, in order to test the pure effect of layering. The second pattern (Pattern D) (FIG. 17B) entailed one layer of Bioink 2 in between two layers of Bioink 1. This pattern was designed to test if only having a stronger material within the plastic sheet is enough to reduce the stress relaxation or if a microarchitecture is indeed required to obtain the desired effect.

Figure 18:
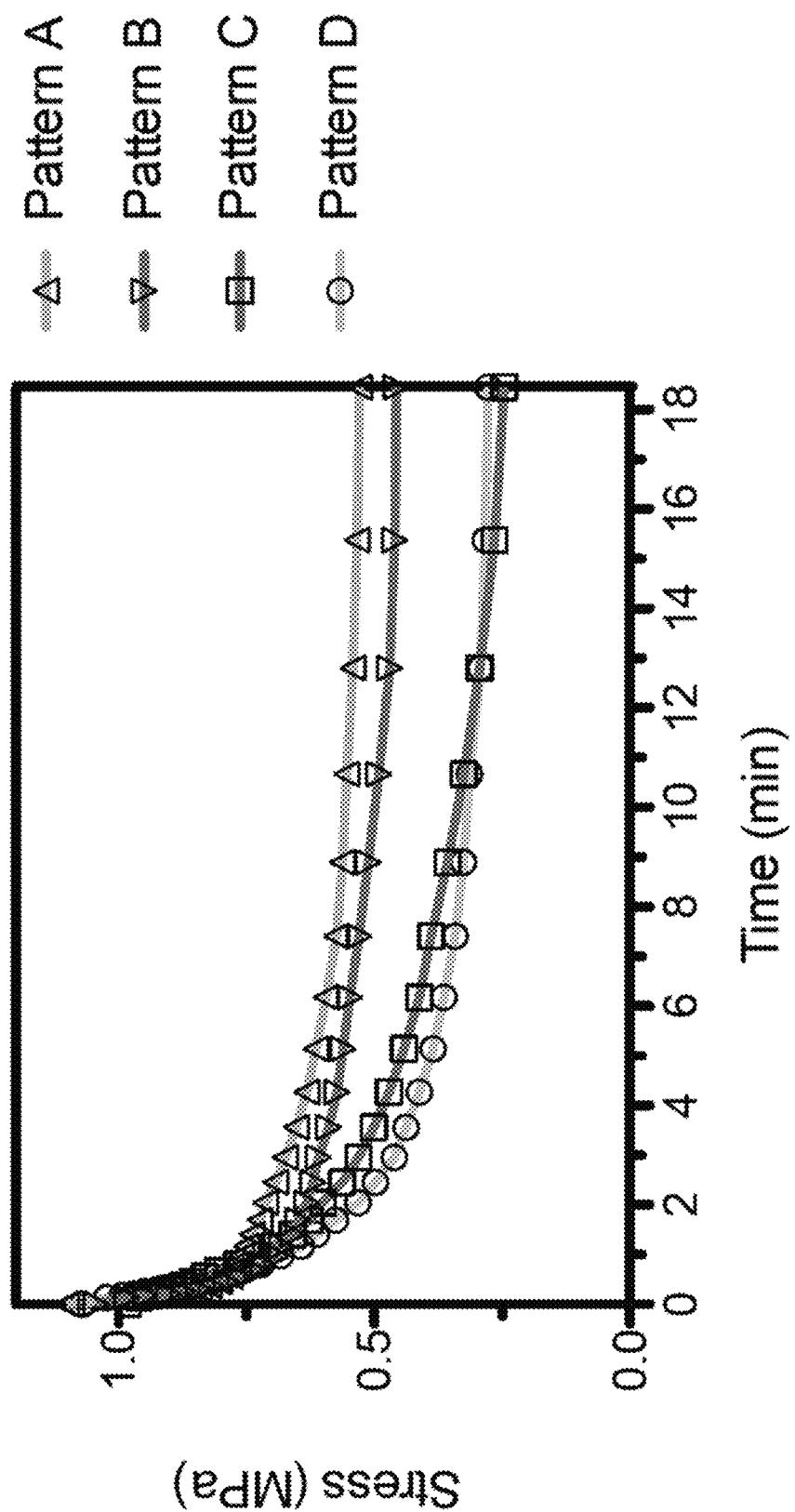
FIG. 18 depicts a stress relaxation of meshwork and layering designs.

The results of the DMA analysis (20 min) show a stress relaxation of 75.69% and 74.23% for Patterns C and D, respectively (FIG. 18 and Table 3). These data indicate that a microarchitecture is indeed required in order to achieve a reduced stress relaxation, since these values are significantly higher than the ones obtained with samples containing a meshwork (51.92% and 56.16%). This advancement in orthodontic clear aligner technology represents a major technical innovation within the field.

TABLE 3

Mechanical Properties of Meshwork and Layering Designs (20 min DMA Test).

| | Initial Stress (MPa) | Stress Relaxed (%) | Remaining Stress (%) |
|---|---|---|---|
| Pattern A | 1.10 ± 0.31 | 51.92 | 48.08 |
| Pattern B | 1.04 ± 0.42 | 56.16 | 43.84 |
| Pattern C | 1.01 ± 0.23 | 75.69 | 24.31 |
| Pattern D | 1.08 ± 0.31 | 74.23 | 25.77 |

DMA analysis was performed on various meshwork samples and compared to the material in Invisalign aligners, composed in part of urethane groups. The samples comprising the inventive material(s) with a 1.5 mm or 3.0 mm beehive microarchitecture reach the same stress of Invisalign after 2 hours (FIGS. 19A-C) and the gain of stress after an initial loss was observed in all samples. The inventive material and plastic architecture design increases the stress exerted over time, after an initial deformation. Invisalign ended with 14% of its initial stress, whereas the inventive product comprising a 3.0 mm beehive microarchitecture remained with 36% of its initial stress (FIGS. 19D and 19F). Similar behavior was observed with the smaller 1.5 mm beehive microarchitecture, resulting in a remaining stress of 32% (FIGS. 19E and 19F). The combination of the inventive material(s) and the microarchitecture design results in regained stress after an initial stress relaxation period. This yields a product that applies the same stress as Invisalign over time at a lower initial stress value, allowing for the potential design of more comfortable aligners for patients (FIGS. 19C and 19F).

Stereolithography 3D Printing of Orthodontic Clear Aligners

Figure 20:
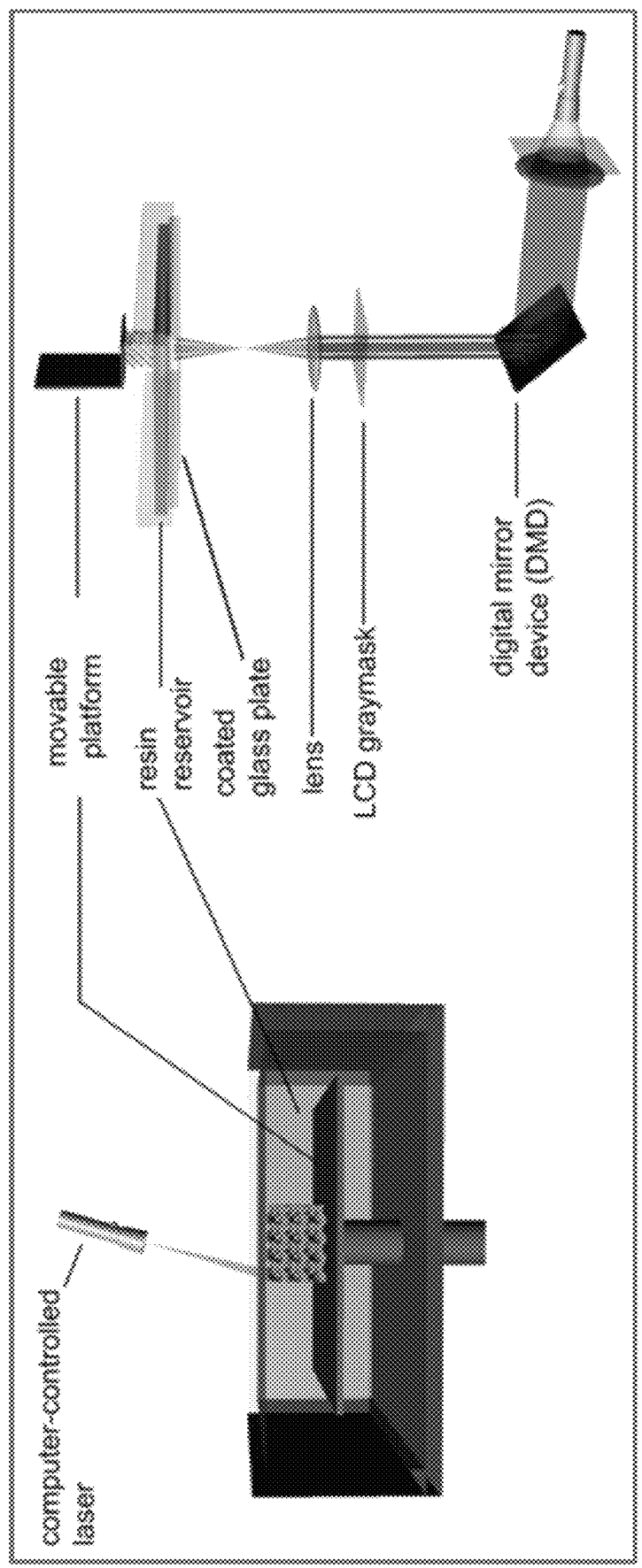
FIG. 20 depicts a stereolithography polymerization of photocurable resins by a bottom-up system with scanning laser (left) or top-down setup with digital light projection (right) (Chia et al., 2015, J. Biomed. Mater. Res.-Part B Appl. Biomater., 103: 1415-1423).

Current dental aligners are manufactured through a thermoforming procedure utilizing thermoplastics composed mainly of polyurethane groups. In this invention, aligners were fabricated through 3D printing utilizing Bioinks curable upon blue light exposure. Stereolithography, an energy deposition technique where light is exposed in a layer by layer manner onto a photocurable resin for the formation of a 3D object (Wang et al., 2016, Int. J. Pharm., 503: 207-212) (FIG. 20), was the 3D printing technique utilized for the production of the dental aligners. The inventive Bioinks contain urethane compounds modified with acrylated groups. The urethane groups provide the elastic properties of the material, while the acrylate groups provide the polymerization capacity and fine tune the strength of the solid material formed. In general, isocyanates have been used successfully within the orthodontic clear aligner field, satisfying rigorous biocompatibility standards.

Although stereolithography is the printing technique currently being used, other one-step printing methods are also of interest. The modification of the inventive Bioinks towards a material jetting technique (PolyJet 3D Printing) or a continuous liquid interface production (CLIP) would allow for faster polymerization due to constant light exposure and reduced aligner printing times. Moreover, the support material removal process would be easier when compared to the support extraction under stereolithography, where the excess material has to be trimmed. Under a material jetting technique, the support material can be dissolved in a solution with basic pH. Under CLIP, printing of the support material is not required. Lastly, material jetting would allow for the incorporation of multiple materials in an aligner, letting us create a product with advanced mechanical properties and potential additional applications within the clear aligners field.

This one-step fabrication process where the whole aligner is printed at once using 3D printing contrasts with other techniques, where a hollow lattice is 3D printed and subsequently filled by other conventional methods in a multi-step fabrication process. This fabrication difference allows the placement of multiple inks with varied mechanical properties to be controlled, which yields both unique results in terms of mechanical properties and aligners that can be customized to each patient. Moreover, this process allows for the creation structures with features below 1 mm, which could result in further efficiency improvements.

The present invention relates to the improvement of the current orthodontic aligners and their method of making. One improvement is the reduced costs per set of aligners: the direct 3D printing of aligners results in a cost reduction of the fabrication process due to the elimination of dental mold 3D printing prior to the thermoforming of aligners. Another improvement is the wider case application and enhanced treatment outcomes: 3D printing aligners allows the incorporation of more complex features and attachments for precise and advanced force delivery. In addition, different sections of aligners can now be printed with different thicknesses or materials, exerting the desired mechanical properties tailored to a single tooth, thus greatly enhancing the treatment efficacy by eliminating treatment discrepancies. Furthermore, this allows the treatment of more complex cases that current aligner products in the market are unable to treat.

A third improvement is the introduction of microarchitectures for reduced stress relaxation: this technique would allow for the fabrication of aligners with softer and more comfortable materials that still exert the required mechanical strength towards the treatment of dental malocclusion. A fourth improvement is that the process is environmentally friendly: 3D printing has become an integral procedure used in producing the resin made models, onto which thermoplastic materials are impressed to form aligner trays. In a typical treatment, 25-50 aligners are delivered to patients. Thus, 25-50 sets of corresponding resin models are produced, each with graded minor changes geared towards the ultimate teeth moving outcome. Once the aligners are delivered, these models become disposable waste. Different countries impose various rates of environmental taxes or fees related to resin model disposal wastes, which further increase the costs of production. In addition to savings in manufacturing costs, the inventive technology would also reduce the cost of waste disposal regarding these 3D printed molds while being a more environmentally friendly manufacturing process.

Example 2: Synthesis of Photocurable Bioinks

The bioinks presented had a lower performance in mechanical properties by themselves, when compared against typical thermoplastic materials utilized in the field. As part of the data presented above, the rapid stress relaxation by the inks synthesized was shown, when not combined with the novel micro-architecture technology (Table 1). Bioinks 1 and 2 showed a lower performance than Invisalign with 1.64% and 8.82% remaining stress, respectively. Additionally, these inks performed worse than Invisalign regarding the stress that they produced when exposed to tension forces, where Invisalign had a 5.05 MPa initial stress and Bioinks 1 and 2 had initial stresses of 1.11 MPa and 3.62 MPa, respectively. These were examples of how resins synthesized under the conditions taught in the previous studies resulted in underperforming materials for the clear aligners application, when not combined with the present micro-architecture technology. Moreover, these materials were prone to cracking, which is one of the biggest hurdles to overcome when producing 3D printable materials toward this application.

The present studies focused on the development of two bioinks whose combination resulted in a material with efficient mechanical properties towards orthodontic treatment. Moreover, these resins exceled in yield stress or yield strain individually (without their combination as part of the micro-architecture technology), showing superiority to the inks previously synthesized and found to be previously disclosed. One of the resins had a higher elasticity, while the second resin showcased stronger mechanical properties providing a scaffold for the sheet been manufactured and enhancing the overall strength of the product. Polyurethane chemistry was employed in order to accomplish the synthesis of these bioinks and their chemistry pathways are described below.

Synthesis of $PEG_{2000}$-$TDI_{20}$-acrylate

Figure 21:
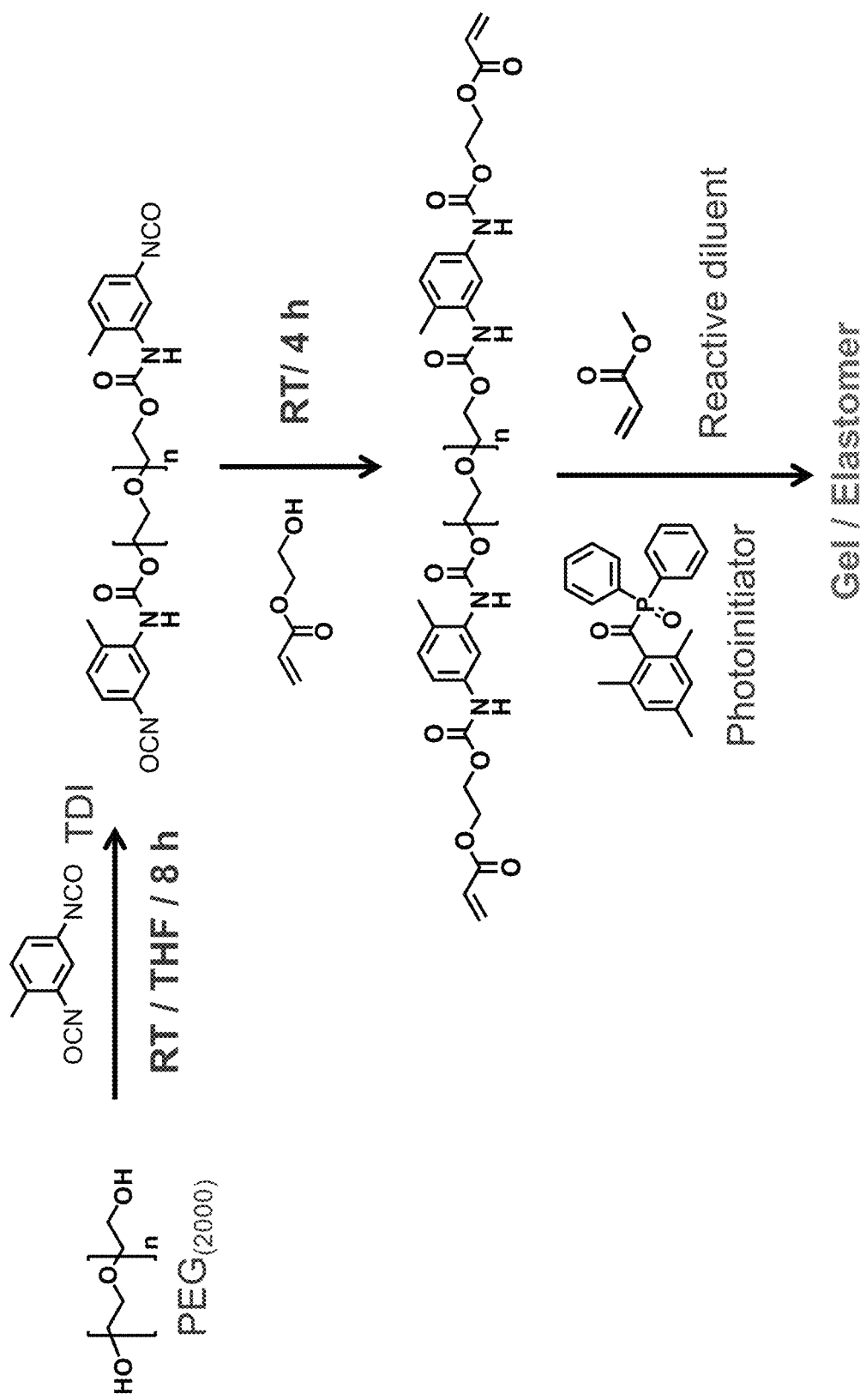
FIG. 21 depicts the $PEG_{2000}$-$TDI_{20}$-acrylate bioink synthesis pathway.

TDI (5.22 g, 30.00 mmol) and catalyst DBTDL (0.010 g, 0.2 wt % of TDI) in THF (100 mL) were added into a three-necked round bottom flask equipped with a mechanical stirrer. Then, PEG-2000 (3.00 g, 1.50 mmol) was added dropwise over 1 h, at RT, into the flask with nitrogen protection and the mixture was stirred for another 8 h, at RT after the dropping completed. The reaction was monitored through FTIR measurement and when the absorption of isocyanate groups did not decrease anymore, the mixture of HEA (0.34 g, 3.00 mmol) and HQ (0.005 g) was added to the system. The reaction was continued until the absorption of isocyanate groups disappeared on the FTIR spectrum. Finally, the polyurethane acrylate as a colorless high-viscosity liquid was obtained with the solvent removed through rotary evaporation (Yield 85%) (FIG. 21).

Synthesis of $PCL_{530}$-$TDI_{10}$-$TEG_5$-acrylate

Figure 22:
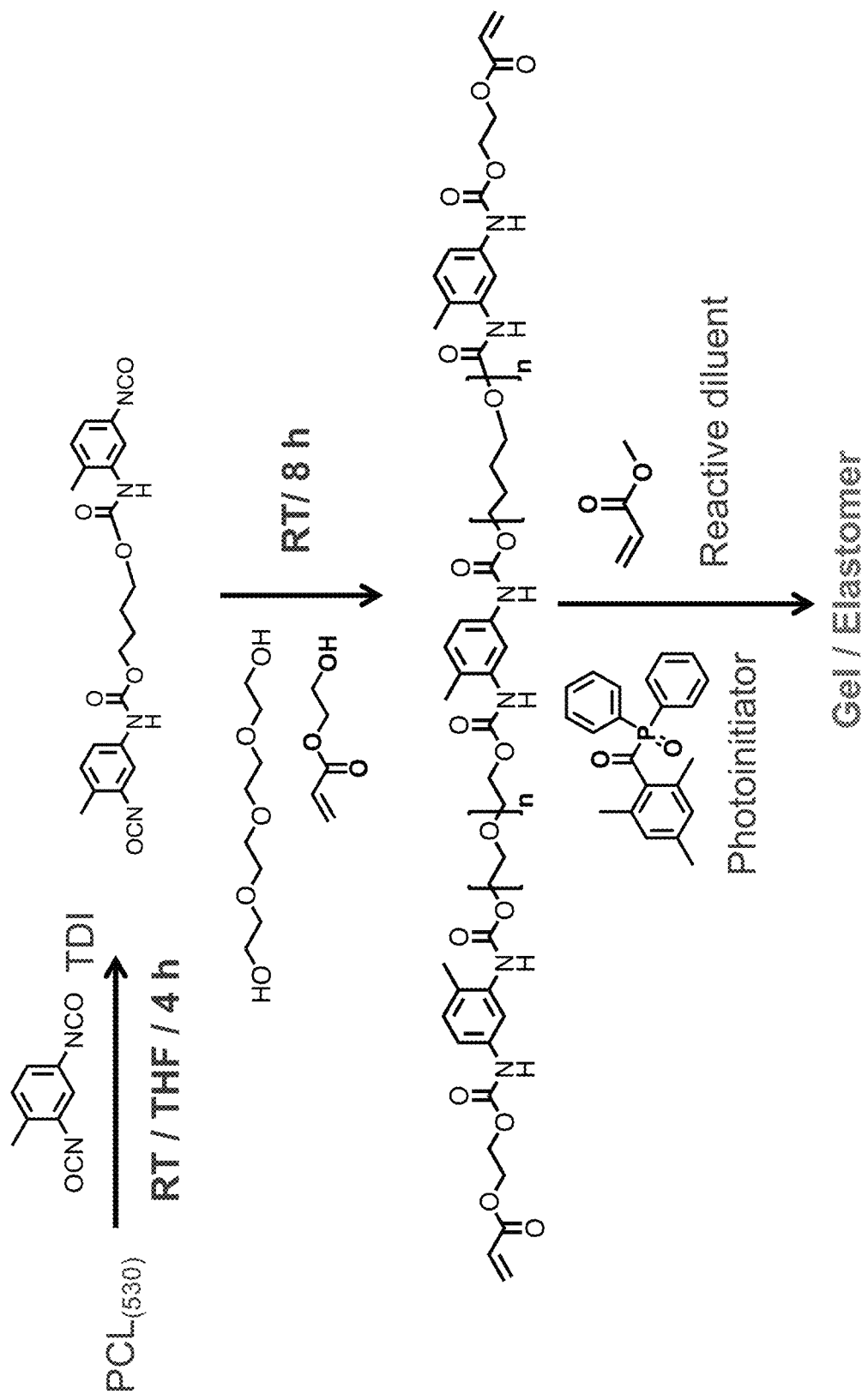
FIG. 22 depicts the $PCL_{530}$-$TDI_{10}$-$TEG_5$-acrylate bioink synthesis pathway.

TDI (6.58 g, 37.00 mmol) and catalyst DBTDL (0.013 g, 0.2 wt % of TDI) in THF (100 mL) were added into a three-necked round bottom flask equipped with a mechanical stirrer. Then, PCL-530 (2.00 g, 3.77 mmol) was added dropwise over 1 h, at RT, into the flask with nitrogen protection and the mixture was stirred for another 4 h, at RT after the dropping completed. Then the TEG (3.66 g, 18.86 mmol) was added dropwise into the mixture and the mixture was stirred for another 8 h. The reaction was monitored through FTIR measurement and when the absorption of isocyanate groups did not decrease anymore, the mixture of HEA (0.87 g, 7.54 mmol) and HQ (0.005 g) was added to the system. The reaction was continued until the absorption of isocyanate groups disappeared on the FTIR spectrum. Finally, the polyurethane acrylate as a colorless high-viscosity liquid was obtained with the solvent removed through rotary evaporation (Yield 90%) (FIG. 22).

Figure 23:
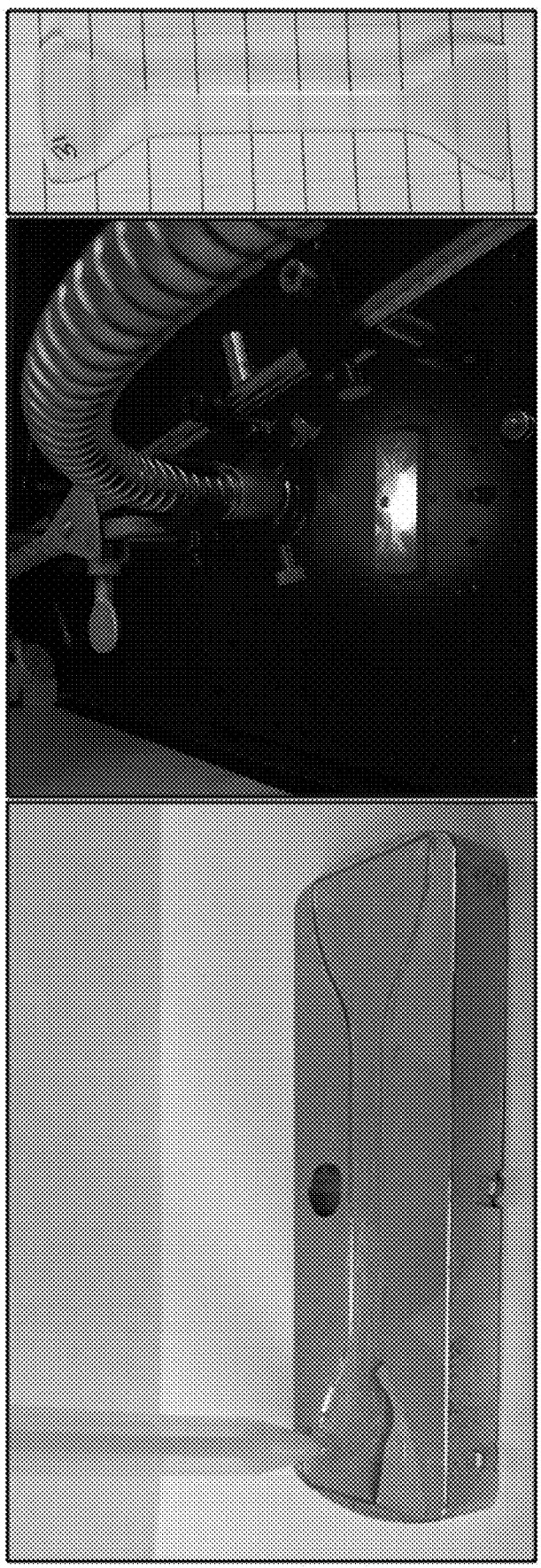
FIG. 23 depicts the bioink curing process. The bioinkis added to a dog bone shaped mold, followed by UV light exposure in order to obtain samples suitable for mechanical analysis.

The formulations of the respective photocurable bioinks were prepared by taking the bioink 70 wt %, TPO 1 wt % and Methyl Methacrylate diluent 29 wt % in 3 mL THF and mixing to ensure complete uniformity of the mixture. Then the formulations were dried by rotary evaporation to remove the THF completely. The quick polymerization of the bioinks was tested by pipetting fine layers of the bioinks onto molds (dog bone shape, ATSM-D638 Type IV) and exposing them to 5 seconds of UV light. After the light exposure the fine layer was fully polymerized, resembling the layer-by-layer polymerization that occurs in inkjet 3D printing. Subsequently, the molds were fully filled with bioink in order to cast samples that would later be utilized to test the mechanical properties of the resins. FIG. 23 shows the process of adding resin onto the mold and the UV light curing step.

Following polymerization, the mechanical properties of the resins were assessed. The results indicated that the elastic bioink introduced the flexibility and ability to sustain the initial forces of the sheet, enhancing stress retention. It showed a lower yield stress (6.71 MPa) while experiencing a high yield strain and high remaining stress after 60 minutes of tension (25% and 72%, respectively). As a comparison, Zendura FLX (a market leader material from Bay Materials) showed a yield strain of 4.38% and a remaining stress after 60 minutes of 67.58%, using thermoplastic materials. The resin showcased a higher yield train and higher remaining stress, while been a photocurable resin.

Figure 24:
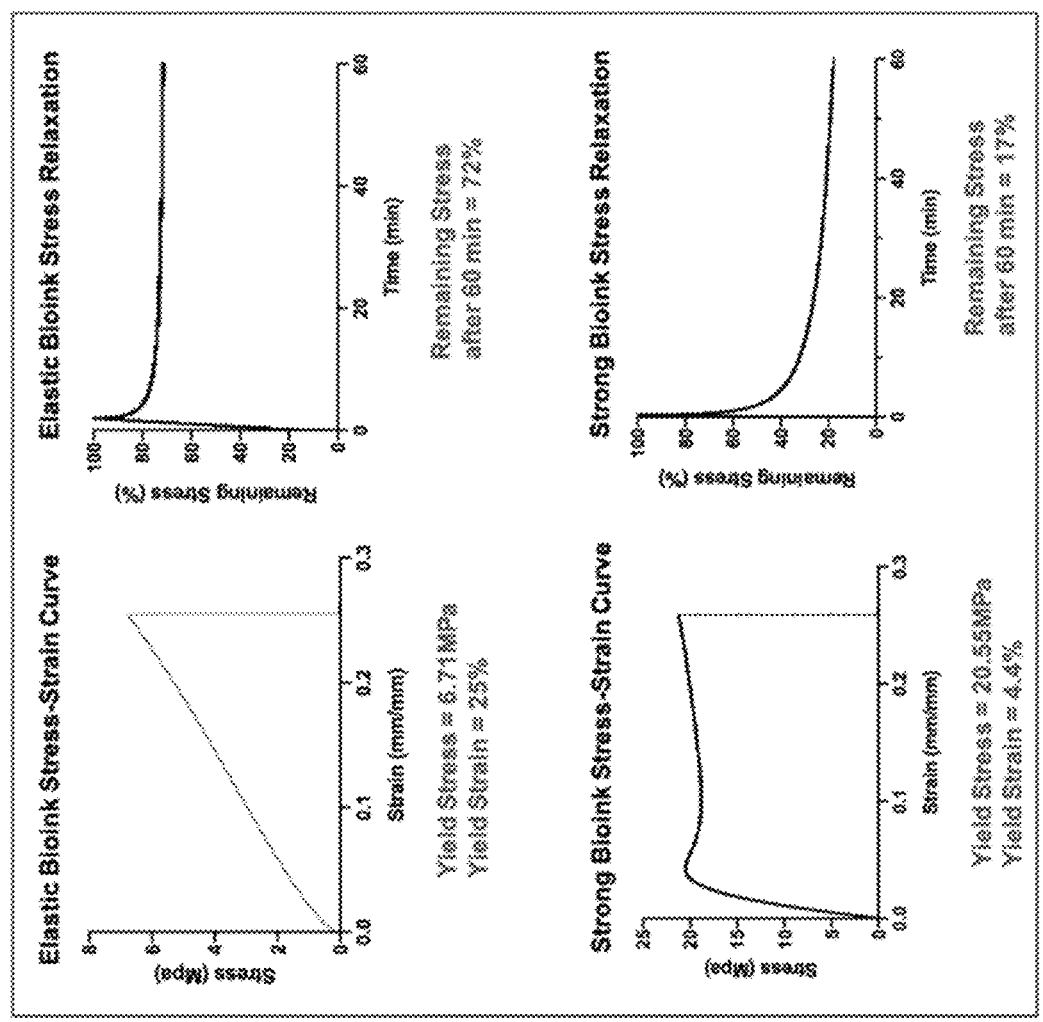
FIG. 24 is a series of charts showing the analysis of the bioink mechanical properties.

The stronger bioink provided the force for teeth movement. It exhibited a higher yield stress (20.55 MPa) and lower yield strain and remaining stress (4.4% and 17%, respectively) (FIG. 24). As a comparison, Zendura FLX showed a yield stress of 23.93 MPa, while been a thermoplastic material. This result showed that the photocurable resin was capable of producing a stress in the range required for teeth movement.

Figure 25:
FIG. 25 depicts an exemplary process for the removal of side products from an exemplary bioink. At left, the synthesis solvent is removed via rotary evaporation. The solvent free resin is then precipitated in solvent (PEG resin was precipitated in methanol, center) and centrifuged to fully separate the resin from the unreacted material in solution (right). The supernatant is decanted, and the resin is dried to remove any remaining solvent. The reaction yield is calculated utilizing the resin mass after the initial synthesis removal and the resin mass obtained after purification.

The bioinks were purified in order to remove side products and calculate a yield of reaction. In order to do this, the polymer was removed from the reaction solvent via rotary evaporation and the polymer was then precipitated in methanol (PEG resin) and hexanes (PCL resin) in order to separate unwanted products from the synthesized polymer (FIG. 25). The supernatants were decanted after centrifuging the samples for 5 minutes at 1500 rpm. The weights of the resins before and after purification were measured in order to calculate a reaction yield, based on the starting and final mass of resin obtained before and after the removal of unwanted products. The results showed reaction yields of 85% and 90% for the PEG and PCL resins, respectively, confirming that these chemistry pathways were ideal for scaling up into a mass production setup.

Figure 26:
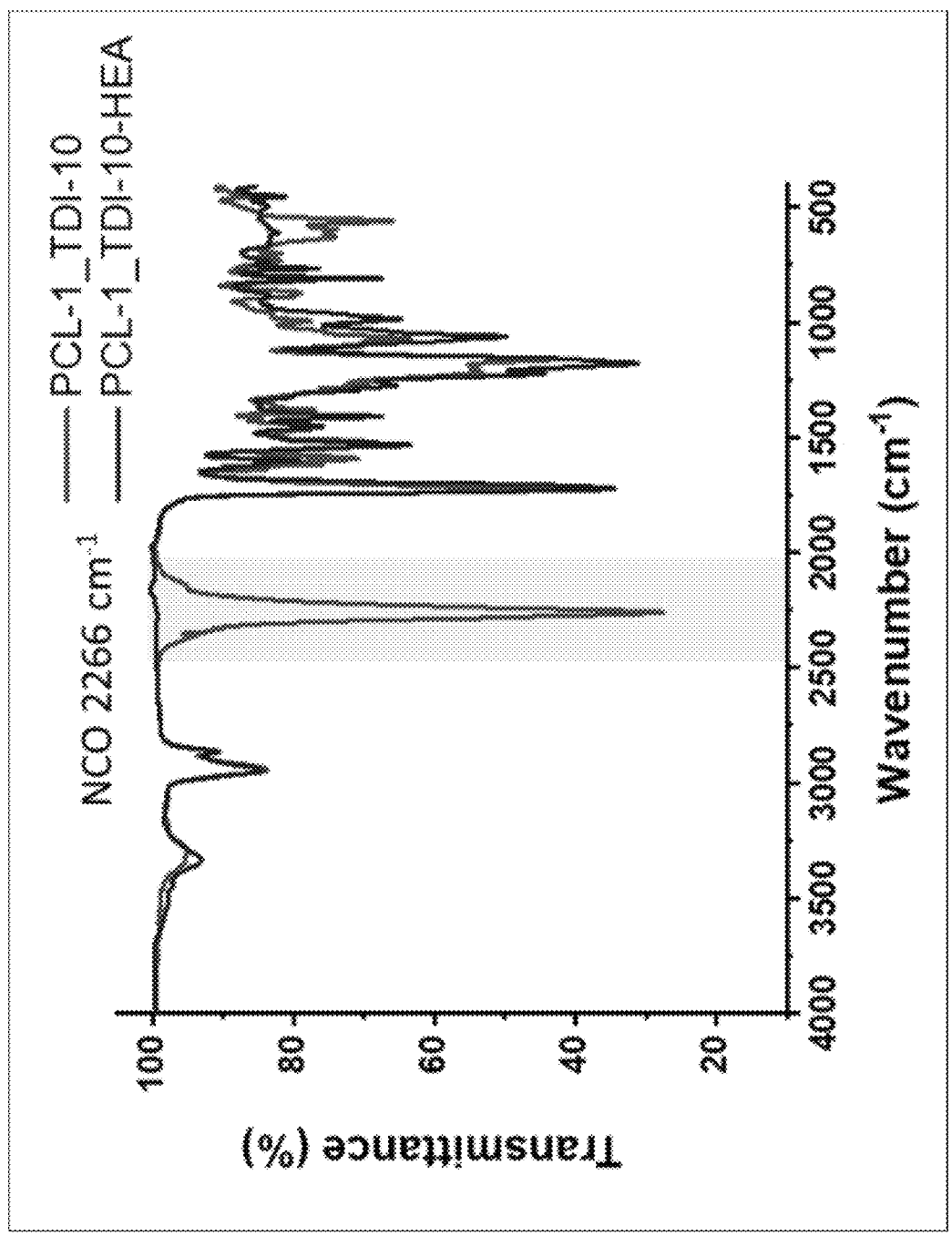
FIG. 26 depicts an FTIR Analysis of isocyanate consumption during the synthesis of an exemplary bioink.

The completion of the reactions was measured via FTIR in order to follow the consumption of the isocyanate groups through the synthesis process. FIG. 26 shows the complete disappearance of the isocyanate peak in the PCL resin after adding HEA into the reaction mixture. This indicated the elimination of isocyanates, which is a critical aspect during the synthesis process in order to guarantee biocompatibility.

Figure 27:
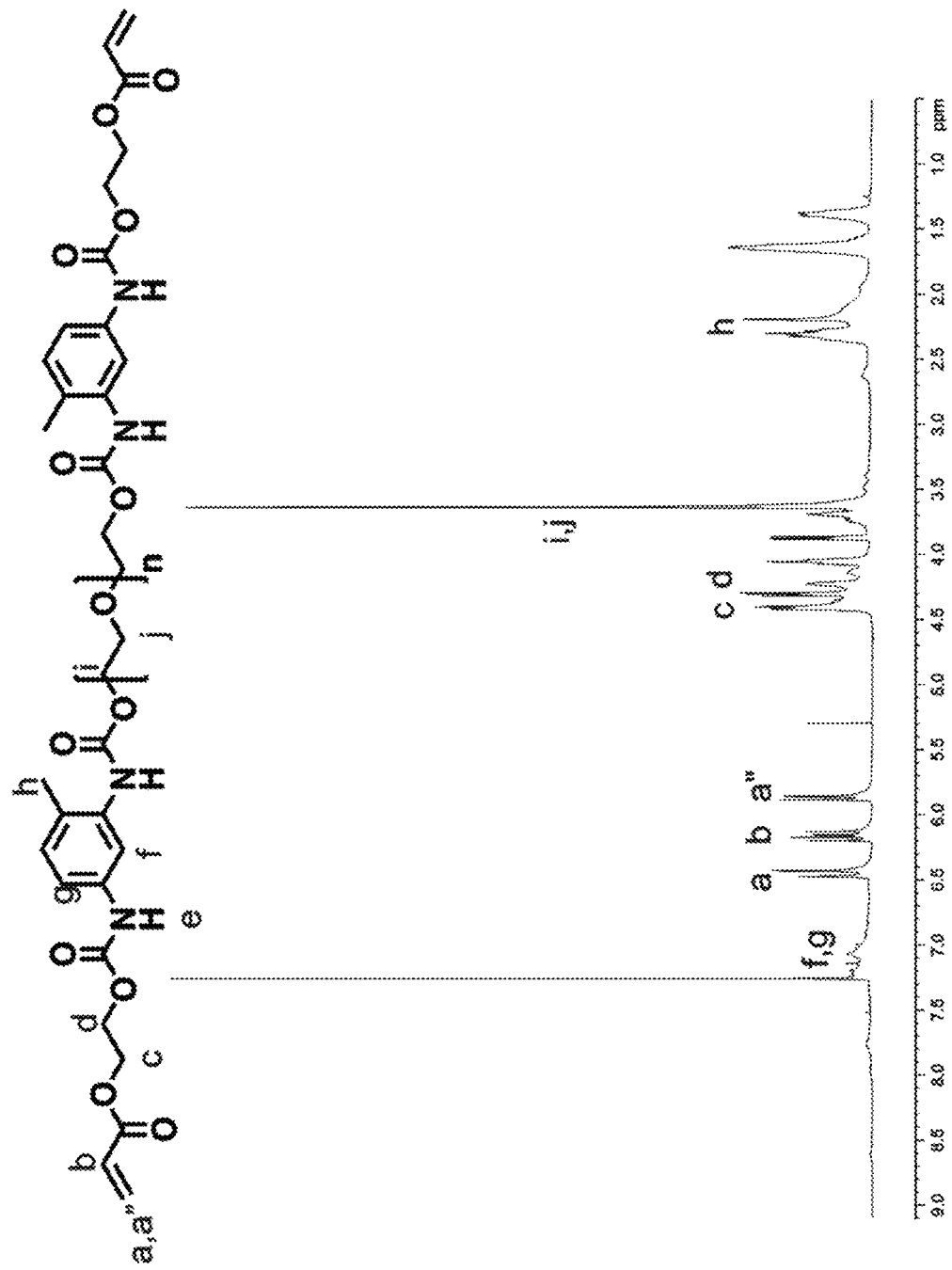
FIG. 27 depicts the $^1$H-NMR Spectrum of $PEG_{2000}$-$TDI_{20}$-Acrylate in $CDCL_3$.
Figure 28:
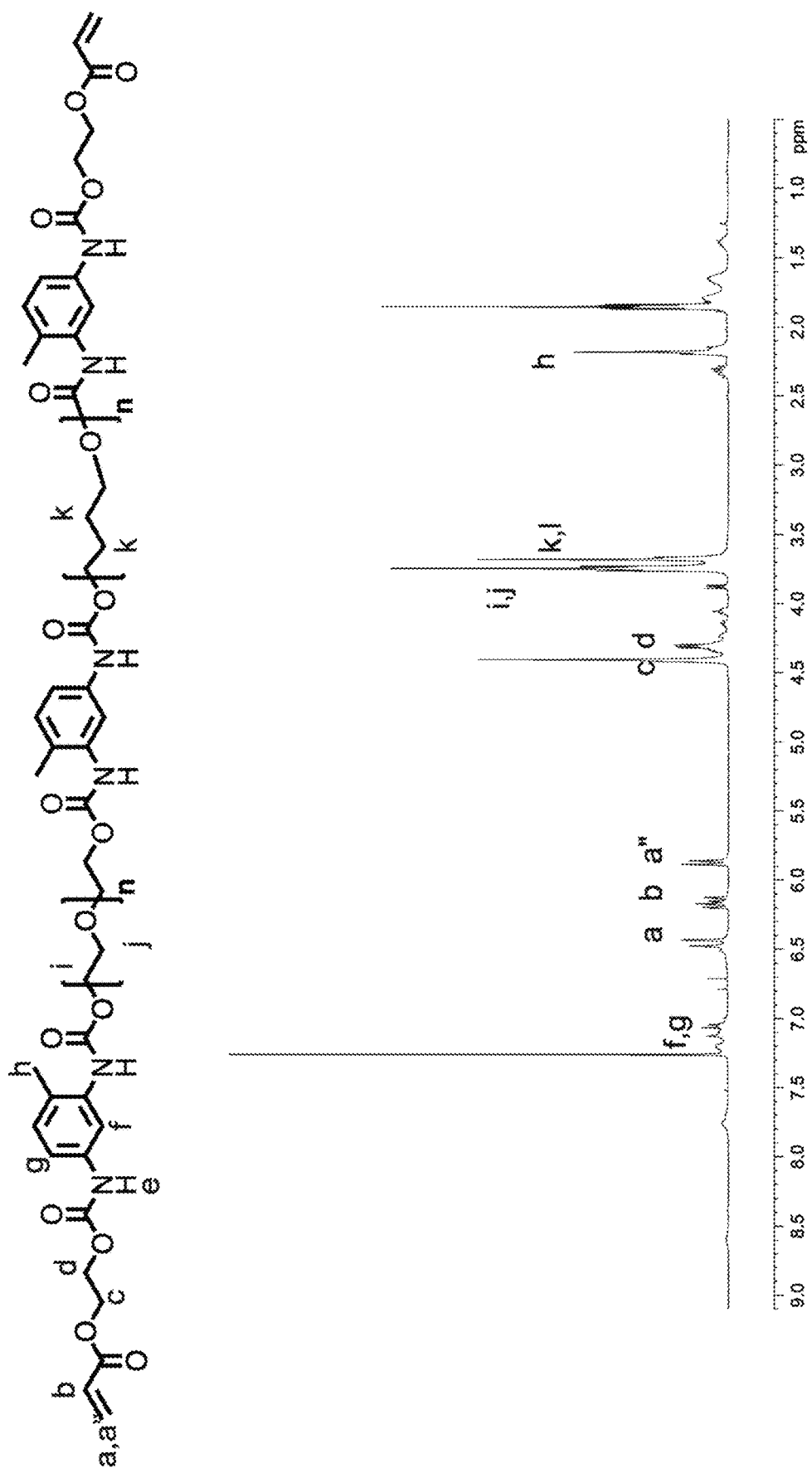
FIG. 28 depicts the H-NMR Spectrum of $PCL_{530}$-$TDI_{10}$-$TEG_5$-Acrylate in $CDCL_3$.

Finally, the purified bioinks were characterized via NMR in order to obtain the full chemical spectrum of the product and confirm the effective synthesis of the proposed resins. FIG. 27 and FIG. 28 show the molecular structures and NMRs of the PEG and PCL bioinks, respectively.

This work showed the development of materials with enhanced mechanical properties optimized towards orthodontic clear aligners, significantly improving upon the work previously presented.

Example 3: Thermoplastics

The present study showcased the design and inclusion of controlled microarchitectures within thermoplastics as a way to significantly reduce the stress relaxation of materials and introduced a game changing technique to design highly efficient clear orthodontic aligners. Specifically, the present studies incorporated a patterned microstructure of Thermoplastic Polyurethane (TPU) onto a sheet of PETG, via fused deposition modelling (FDM) 3D printing. The high tensile modulus and yield strength of TPU provided support to the PETG sheet and enhanced its stress retention upon mechanical testing. This technique allowed for the fabrication of clear aligners, among other medical devices, with higher stress retention capabilities, resulting in a treatment with higher efficiency and the potential to treat cases with higher clinical complexities.

Additionally, the present studies display the latest data where a polycarbonate (PC) pattern were 3D printed onto a TPU sheet as supporting structure. The PC pattern gave significant strength to the final sheet, while the TPU provided elasticity to the final product.

Materials and Methods
PETG TPU Sheet Fabrication

Sheets of PETG with a dimension of 10"×20" and a thickness of 0.0381 mm were purchased from McMaster-Carr. Thicker PETG sheets were purchased from United States Plastics Corp. measuring 24"×48" and a thickness of 0.50 mm. Thermoplastic Polyurethane filament was purchased from MatterHackers with a filament thickness of 1.75 mm.

PETG sheets were cut to a 10"×10" size and loaded into an FDM 3D printer (Intamsys Funmat HT 3D Printer). The 3D printer was loaded with TPU filament and a pattern of this material was printed on top of the PETG sheet at an extrusion temperature of 220° C. The patterned structure deposited was composed of continued parallel lines with a thickness of 0.40 mm, a height of 0.10 mm, and a space between lines of 0.05 mm. This pattern was defined as Dense Lines Pattern (DLP). Once the printing process was completed, the patterned sheets were cut into circles with a 5" diameter. These TPU pattern deposition process was done with PETG sheets of both thicknesses, 0.381 mm and 0.50 mm, resulting in different ratios of PETG to TPU within the final sheet fabricated.

Additionally, a pattern involving less TPU deposition was done utilizing 0.38 mm PETG sheets, in order to test the effect of the support structure pattern on stress relaxation. This pattern was composed of continued parallel lines with a thickness of 0.40 mm, a height of 0.10 mm, and a space between lines of 0.5 mm, resulting in less lines deposited. This pattern was defined as Lines Pattern (LP).

Thermoforming of PETG/TPU Sheets and Stress Relaxation

The circular sheets were then thermoformed (Forestadent Track® V) over rectangles with dimensions of 60 mm×15 mm×15 mm. The sides of the rectangles obtained were cut and its stress relaxation capacity was tested on an Instron Universal Testing Machine 5564. The stress relaxation was measured while applying a constant strain equal to 70% of PETG's yield strain, in order to prevent plastic deformation. The stress relaxation profiles of raw PETG (0.381 mm and 0.50 mm), $PETG_{0.381}$+DLP, $PETG_{0.50}$+DLP, and $PETG_{0.381}$+LP were tested.

Clear Aligner Fabrication

To demonstrate the effectiveness of the approach at fabricating clear aligners, a $PETG_{0.5}$+DLP sheet was thermoformed onto a full arch model. The aligner was then trimmed and polished following standard protocols.

Results and Discussion
Multi-Material Thermoplastic Sheet Fabrication

Orthodontic aligners have been providing a more comfortable treatment option for orthodontic patients worldwide, and several thermoplastic materials have been developed as a result. However, thermoplastic materials have a major disadvantage when compared to traditional dental braces. Specifically, the plastics experience a reduction in the applied stress meant to move teeth, known as stress relaxation. This diminishes treatment efficacy and, in some cases, requires adjustment to the patient's treatment plan. This translates to higher costs for patient and more chair time for both patients and clinicians.

Figure 29:
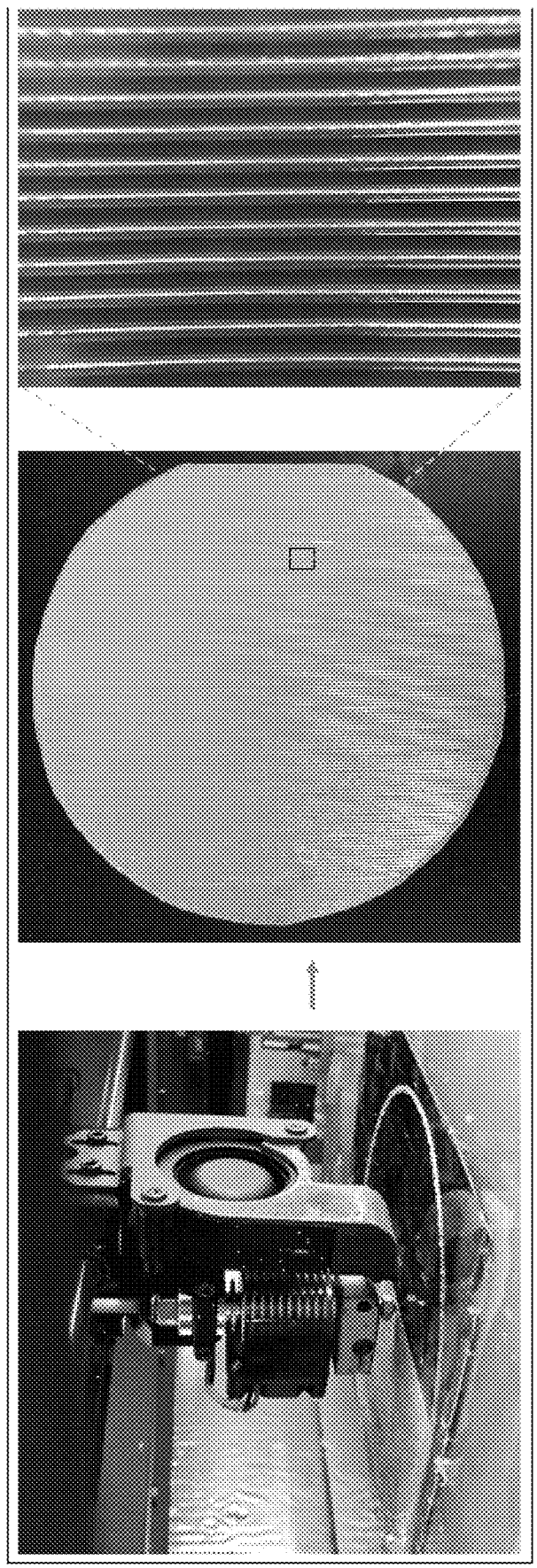
FIG. 29 depicts the addition of an exemplary TPU lines pattern onto a PETG sheet.

To mitigate this weakness, the present studies have developed a multi-material thermoplastic sheet that incorporated a microstructure into the plastic. This microstructure provided strength and prevented excessive stress relaxation of the thermoplastic sheet, effectively enhancing the mechanical properties. In this study, Fused Deposition Modelling (FDM) 3D printing was utilized to add a microstructure composed of TPU onto a PETG sheet, both materials are commonly used in the clear orthodontic aligners field. FIG. 29 shows the deposition of TPU onto PETG and the pattern created.

Figure 30:
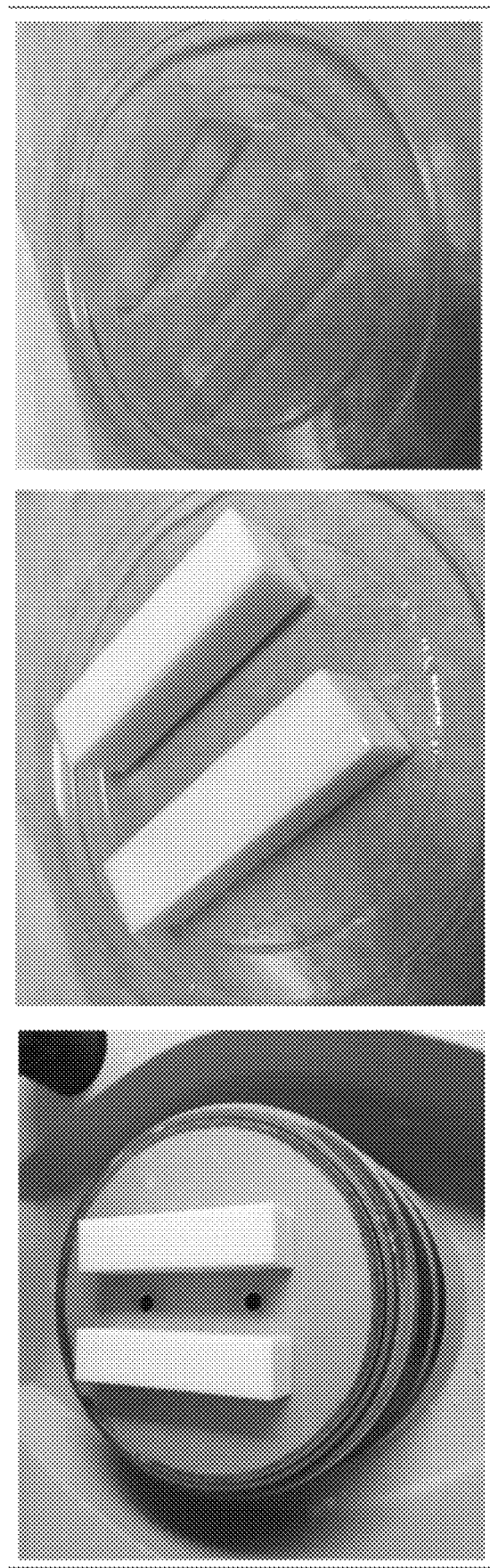
FIG. 30 depicts an exemplary process of thermoforming of plastic PETG sheet onto plastic blocks for Instron sample preparation.

Once the multi-material sheet was formed, it was thermoformed onto blocks with dimensions of 60 mm×15 mm×15 mm. The sides of the resulting thermoformed sheet were then cut into a dog bone shape (ATSM-D638 Type IV) and the stress relaxation on the plastics was analyzed utilizing an Instron Universal Testing Machine, applying a constant strain equal to 70% of PETG's yield strain. FIG. 30 shows the thermoforming process of a plastic sheet onto the discussed blocks.

Mechanical Analysis of Multi-Material Sheets

Figure 31:
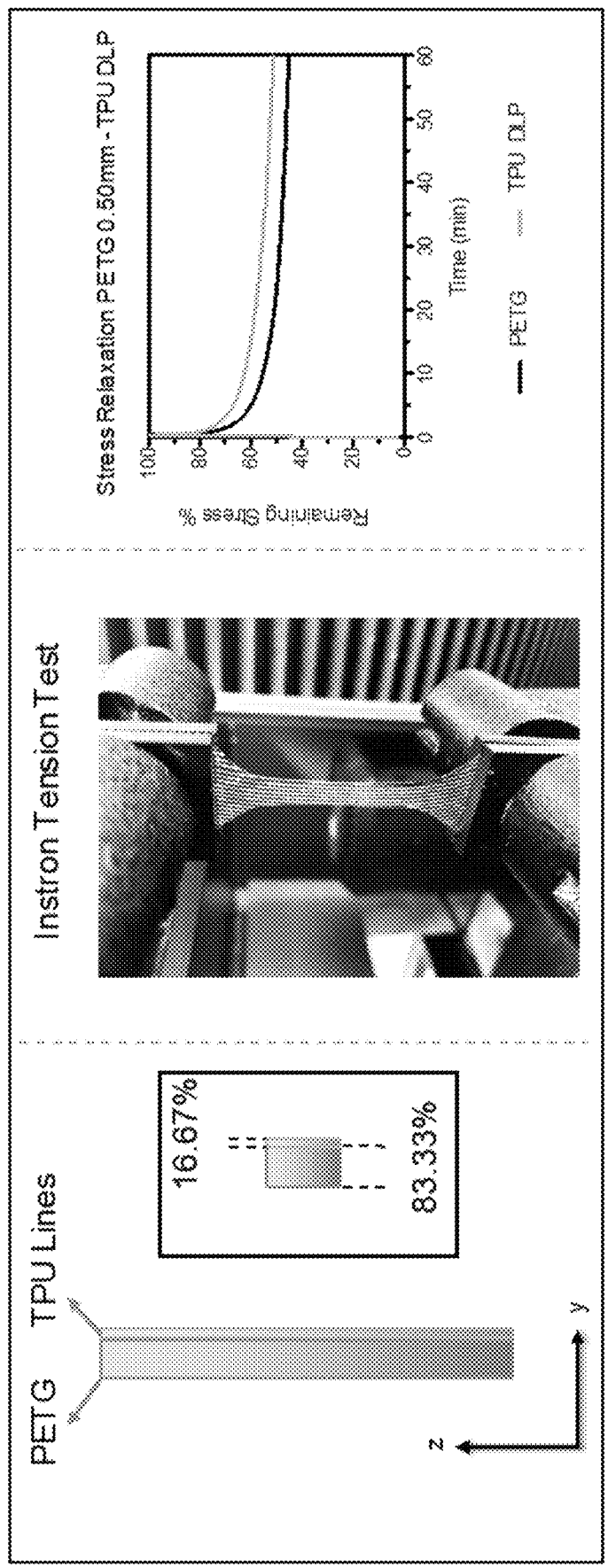
FIG. 31 depicts the measurement of stress relaxation of 0.50 mm PETG sheet with TPU DLP microstructure. At left is a schematic representing the side view of the thermoplastic sheet and the percentages of PETG and TPU in it. At center is an image of the Instron tension test to measure stress relaxation. At right is a plot showing the stress relaxation of PETG 0.50 mm and PETG 0.50 mm+TPU DLP.

One of the parameters studied was the effect multi-material sheet thickness and material composition percentage on the stress relaxation. PETG sheets with thicknesses of 0.381 mm and 0.50 mm were utilized in this study. FIG. 31 shows the percent of TPU and PETG when utilizing a 0.50 mm PETG sheet. The TPU pattern deposited has a thickness of 0.10 mm, representing a 16.67% of the multi-material sheet thickness. When submitting this sample to a strain equal to 70% of its yield strain, it retained a 51.20% of its initial force. This was a 14.21% increase in stress retention when compared to the bare PETG sheet.

Figure 32:
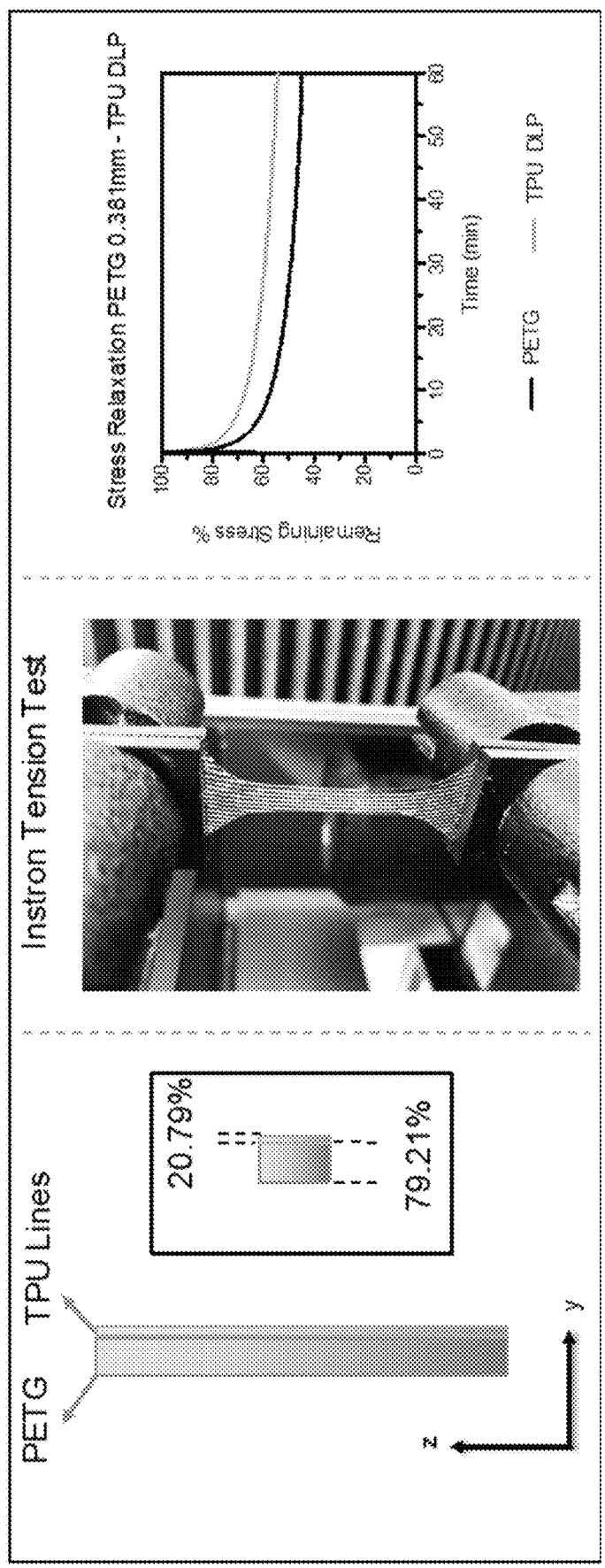
FIG. 32 depicts the measurement of stress relaxation of 0.36 mm PETG sheet with TPU DLP microstructure. At left is a schematic representing the side view of the thermoplastic sheet and the percentages of PETG and TPU in it. At center is an image of the Instron tension test to measure stress relaxation. At right is a plot showing the stress relaxation of PETG 0.50 mm and PETG 0.50 mm+TPU DLP.

FIG. 32 shows the percent of TPU and PETG when utilizing a 0.381 mm PETG sheet. The TPU pattern deposited had a thickness of 0.10 mm, representing a 20.79% of the multi-material sheet thickness. When submitting this sample to a strain equal to 70% of its yield strain, it retained a 54.56% of its initial force. This was a 21.70% increase in stress retention when compared to the bare PETG sheet.

These results showed that the ratio of TPU to PETG had a direct impact on the stress retention of the multi-material sheet. Specifically, a small increase in the amount of TPU (4.12%) resulted in a 7.49% increase in stress retention when compared to the bare PETG sheet. Table 4 provides a summary of the stress relaxation values obtained under each condition.

TABLE 4

Stress Relaxation Values for 0.381 mm and 0.50 mm PETG sheets Modified with TPU Microstructures.

| PETG Stretched | PETG 0.50 mm-TPU DLP | PETG 0.381 mm-TPU DLP |
|---|---|---|
| 44.83% | 51.20% | 54.56% |

Effect of Pattern Density on Stress Relaxation

Figure 33:
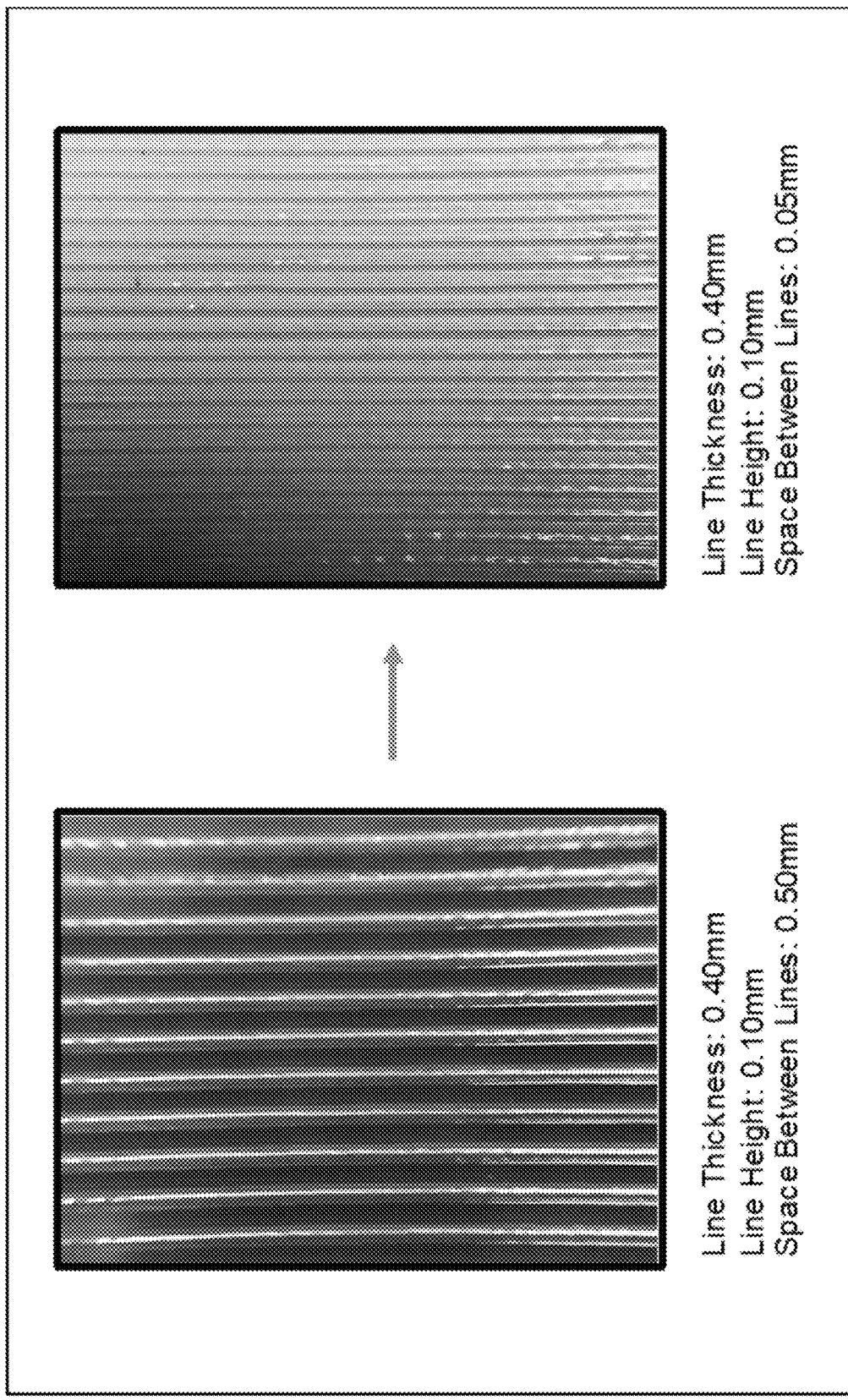
FIG. 33 depicts line patterns with different line densities. At left is an exemplary line pattern (LP), consisting of lines with a space between them of 0.50 mm. At right is an exemplary dense line pattern (DLP), consisting of lines with a space between them of 0.05 mm.

In order to test the effect of pattern geometry on stress relaxation, two patterns were designed. Both patterns included lines with a thickness of 0.40 mm and a height of 0.10 mm. The difference in these patterns consisted of the space between each line within the pattern. The pattern named Lines Pattern (LP) had a space between lines of 0.50 mm. The pattern named Dense Lines Pattern (DLP) had a space between lines of 0.05 mm. Although not bound by any particular theory, it was hypothesized that a denser pattern provide more support to the structure, enhancing the stress retention of the multi-material sheet. FIG. 33 shows pictures of both microstructure designs, LP and DLP.

Figure 34:
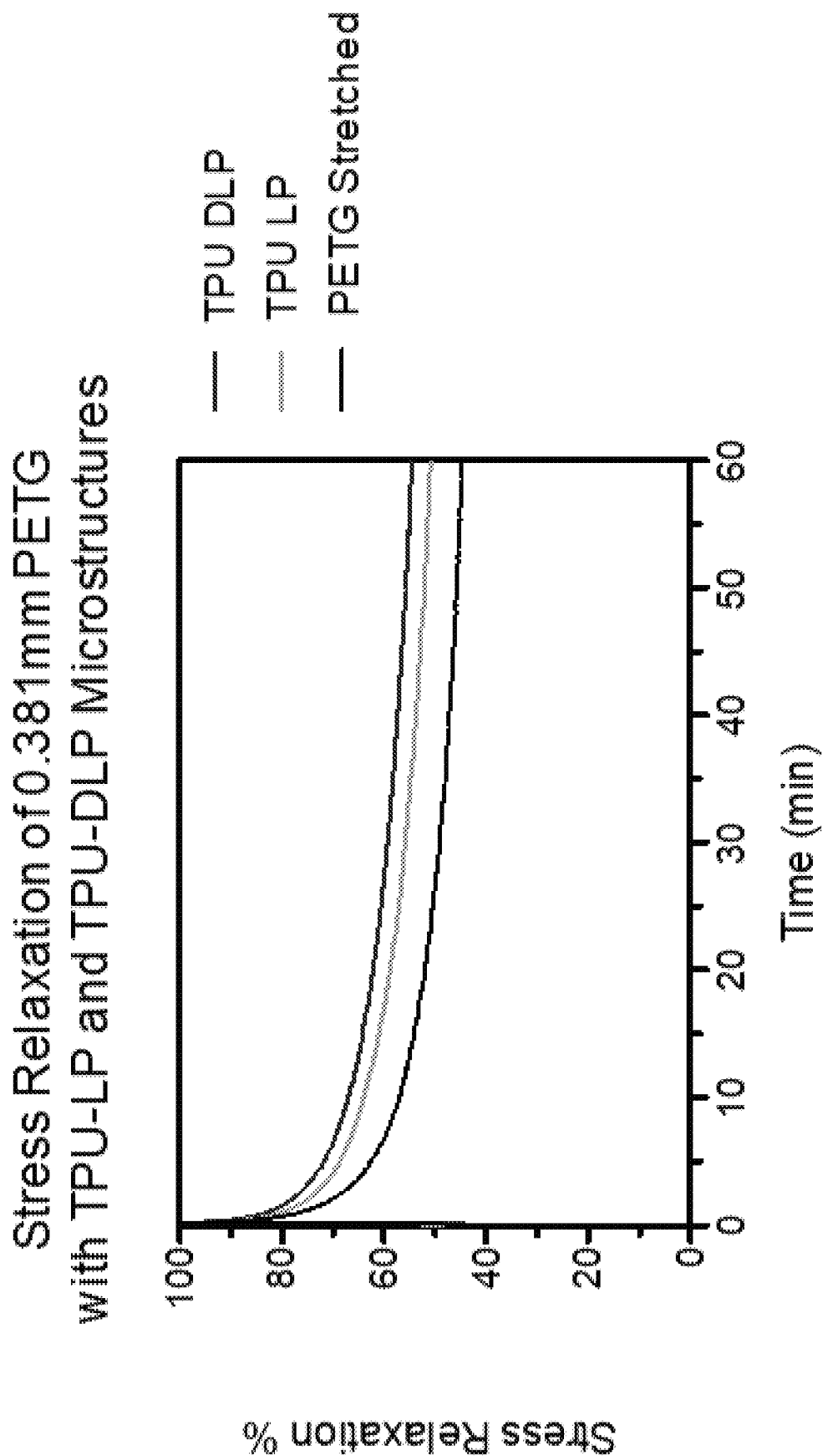
FIG. 34 is a plot of stress relaxation of for an exemplary 0.381 mm PETG with TPU-LP and TPU-DLP microstructures.

Samples of multi-material sheets including the LP and the DLP were fabricated using PETG sheets with a thickness of 0.381 mm. Instron mechanical analysis was performed on these samples and their stress relaxation was assessed. FIG. 34 shows the stress relaxation profile of 0.381 mm PETG with TPU-LP and TPU-DLP Microstructures. The results showed that the LP pattern had a stress relaxation of 50.87%, representing a 13.47% increase in stress retention when compared to a bare PETG. The DLP pattern had a stress relaxation of 54.56%, representing a 21.70% increase in stress retention when compared to bare PETG.

These results showed that the density of the pattern has a significant impact on the stress retention of the multi-material sheet. Therefore, it was demonstrated that the geometry chosen as reinforcement was very important during the design process of the device to be built. Furthermore, although not bound by any particular theory, it was hypothesized that structures with stronger profiles, such as squares, triangles, and beehive patterns, provide a greater stress retention to multi-material sheets. Lastly, the dimensions of these structures need to be carefully analyzed to maximize the reinforcement effect of these materials. Table 5 shows a summary of the stress relaxation values obtained in this set of experiments.

TABLE 5

Stress Relaxation Values for 0.381 mm PETG sheets Modified with TPU-LP and TPU-DLP Microstructures.

| PETG Stretched | PETG 0.381 mm-TPU LP | PETG 0.381 mm-TPU DLP |
|---|---|---|
| 44.83% | 50.87% | 54.56% |

Figure 35:
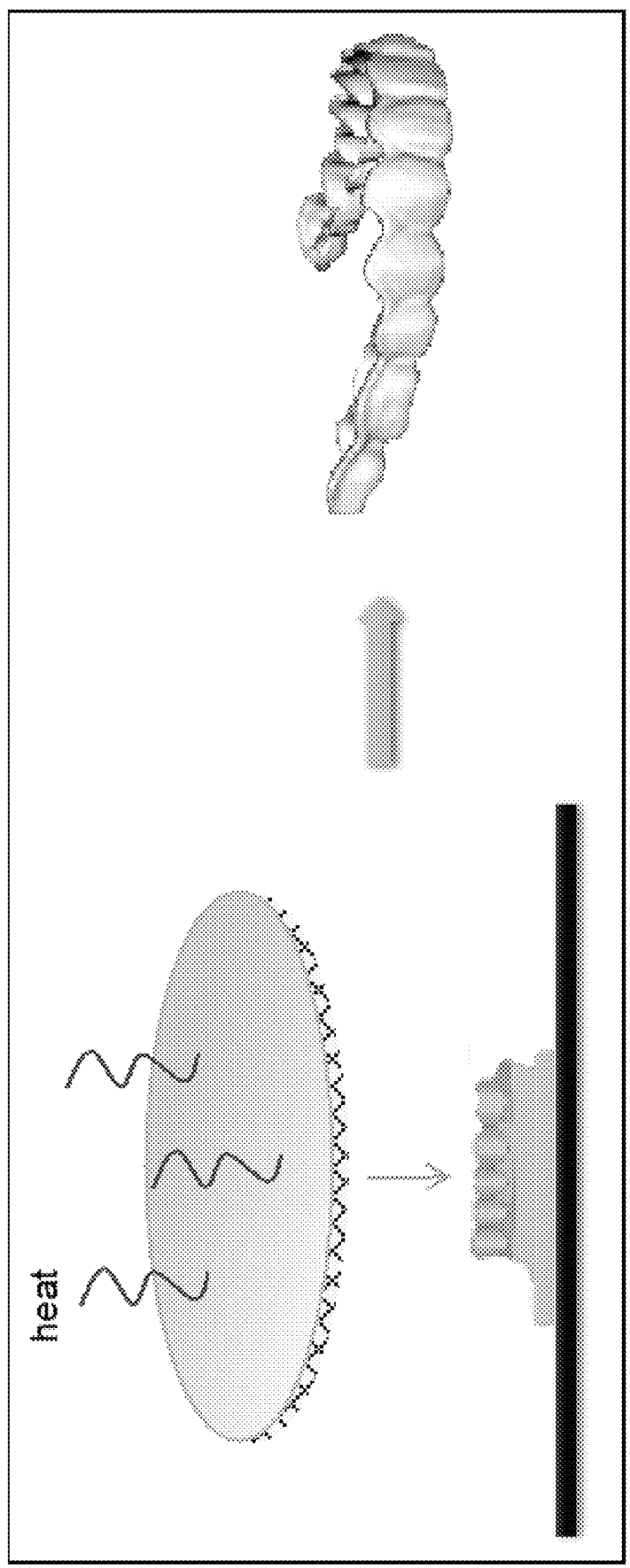
FIG. 35 is a depiction of the fabrication of an exemplary clear aligner via thermal vacuum forming.

Microstructures Technology Applications Towards Clear Aligners and Other Medical Devices In the present studies, the use of defined microstructures on polymeric sheets to reduce stress relaxation in materials used for clear orthodontic aligners is also disclosed. The present studies demonstrated that the inclusion of support structures in these materials enhanced the stress retention, which improve the efficacy of these medical devices. To test the ability of these multi-material sheets to generate clear aligners, the product was thermoformed onto a typical 3D printed full arch model. FIG. 35 shows the aligner formation process, where the multi-material sheet was heated to soften the plastic and applied onto the model via vacuum suctioning. Following this step, the aligner was trimmed and polished to obtain the final product.

Figure 36:
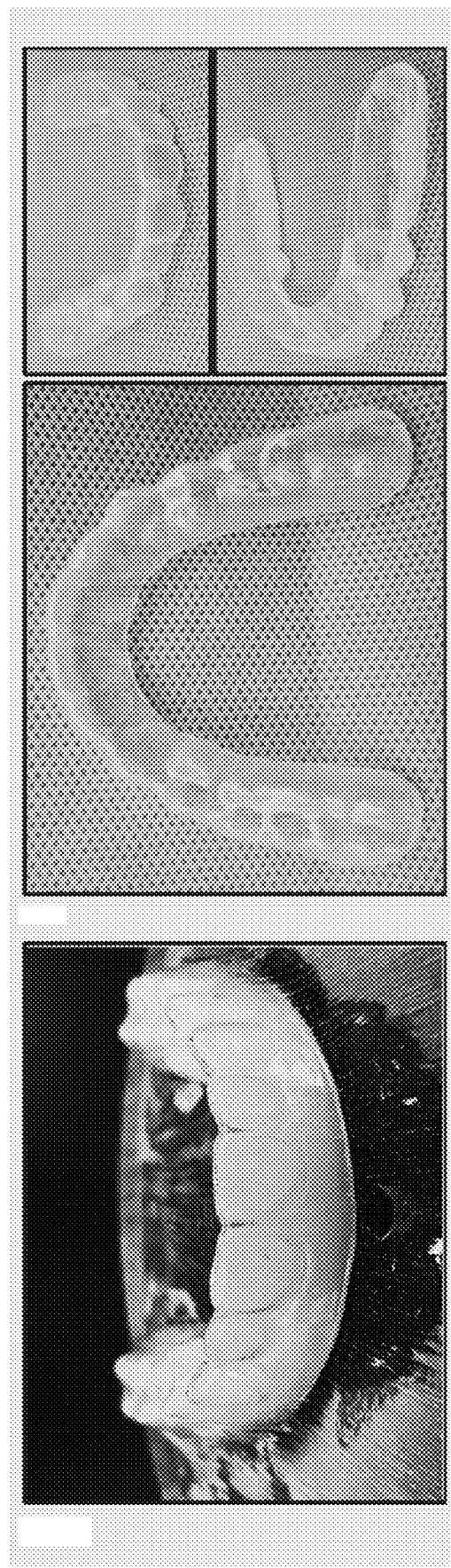
FIG. 36 depicts an exemplary multi-material clear aligner. At left is a sheet immediately after being thermoformed onto a 3D teeth model. At right are images an exemplary clear aligner after processing.
Figure 37:
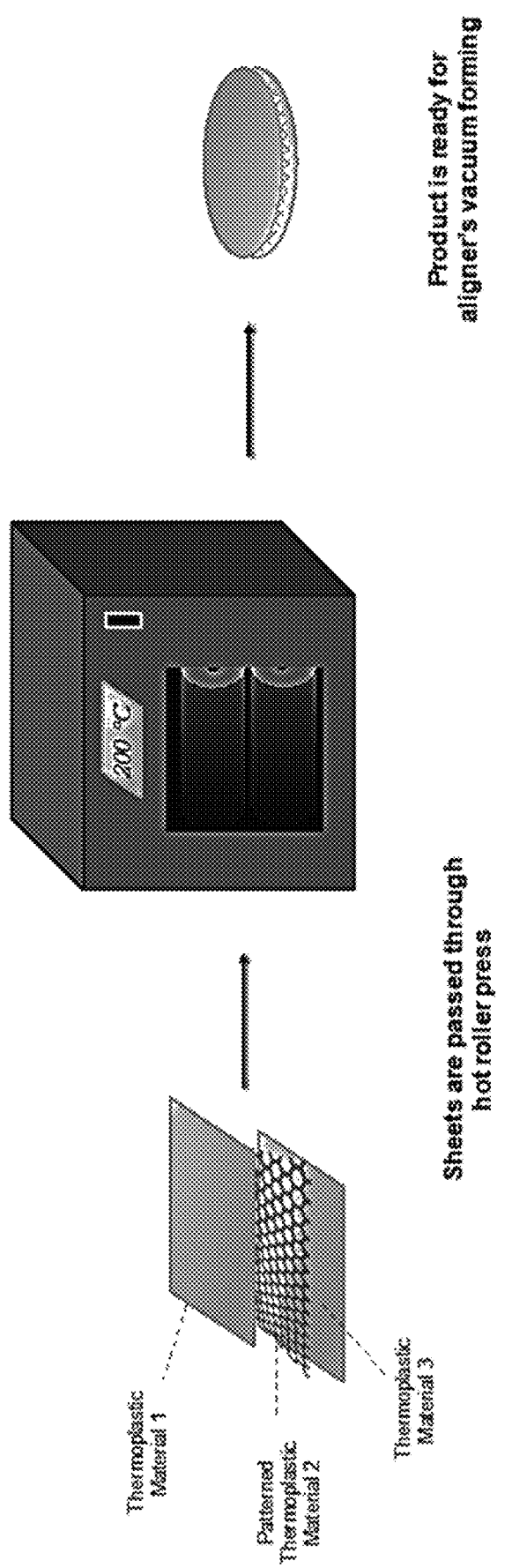
FIG. 37 depicts an exemplary hot roller press fabrication method.

In FIG. 36A, the microstructure included into this multi-material sheet is visible. FIG. 36B shows the clear aligner product after processing. The lines observed in the final product are completely merged into the material using other fabrication approaches for the multi-material sheet, such as a hot roller press. Under other embodiments, these microstructures are applied to a one side of a plastic sheet and a second sheet is placed over top, making the multi-material sheet a 3-layer system with the microstructures sandwiched between the outer layers. FIG. 37 illustrates the 3-layer multi-material sheet formation process using a hot roller press. Materials passed through a hot roller press are then ready for vacuum forming. This method allows for the fabrication of sheets with multiple materials and results in the complete merging of the plastics, resulting in a clear product with no visible microstructures.

Incorporation of Additives for Hydrolysis Prevention and Plastic Force Retention Hydrolysis is defined as the chemical decomposition of a compound by water. Previous reports have studied hydrolysis in urethane groups and ureas under moderately acidic and neutral conditions. In general, ureas hydrolyze faster than urethanes and polyurethanes. More precisely within urethane groups, molecules involving N-alkyl groups are more resistant to hydrolysis than molecules containing N-phenyl groups. Nonetheless, all urethanes experience a degree of hydrolysis that is directly correlated with their ability for force retention, affecting their stress relaxation.

Figure 38:
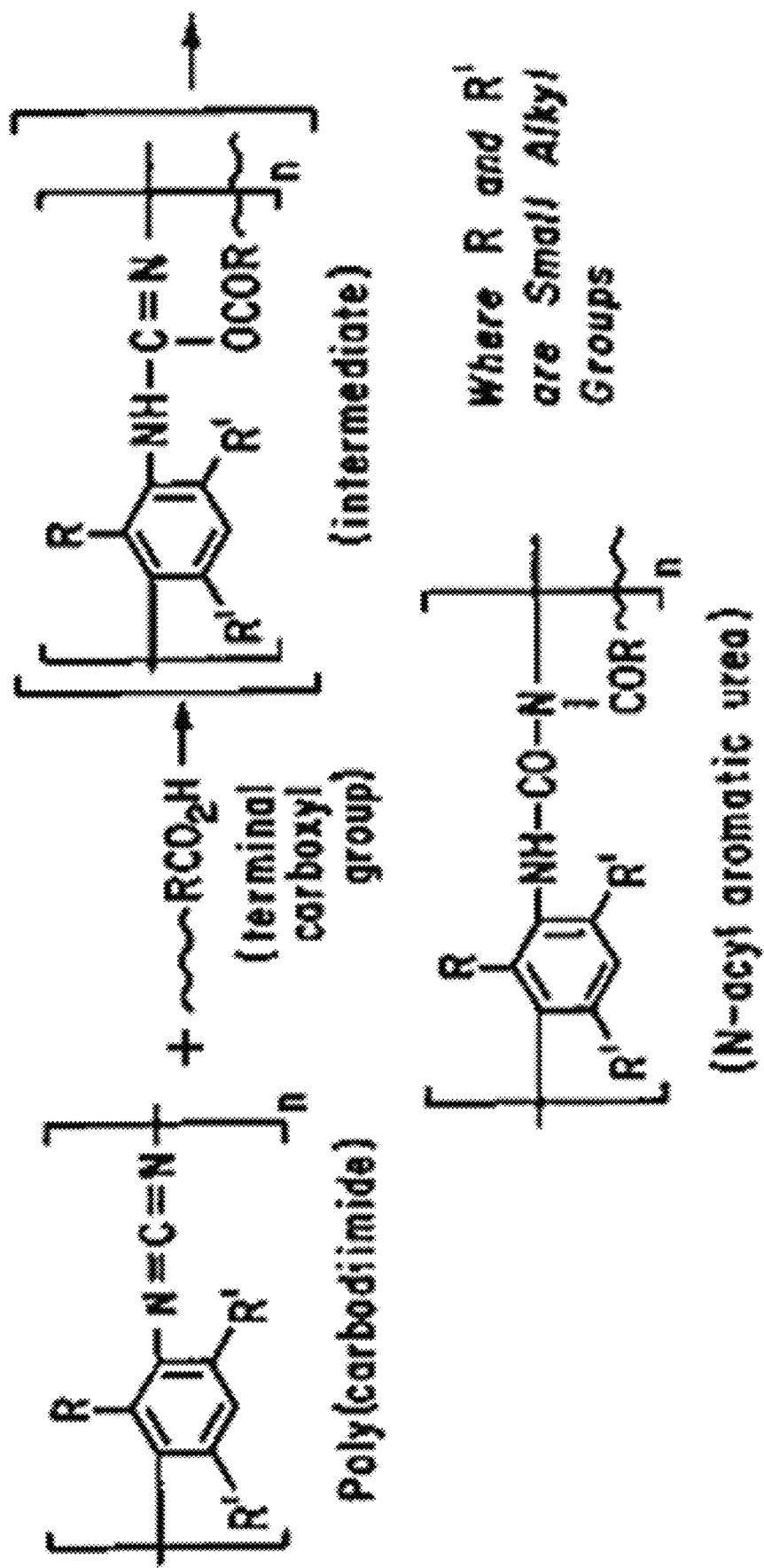
FIG. 38 depicts the reaction of a poly(carbodiimide) with carbonyl groups.

The carboxylic ester link in polyester urethanes breaks via hydrolysis, resulting in an end with a hydroxyl group (—OH) and an end with a carboxyl group (COOH). This carboxylic acid enhances the hydrolysis of the polyester segments converting the degradation of the polymer chain in an autocatalytic one. The effective neutralization of this carboxyl group should therefore retard the hydrolysis of the polymer by preventing its autocatalysis. Carbodiimides have been identified as a good candidate for this purpose. FIG. 38 shows the molecular mechanism for the stabilization of carboxylic acids by carbodiimides. The carboxyl group reacted with a carbodiimide to form a neutral N-acyl urea. If a poly(carbodiimide) is utilized, it serves as a crosslinker by rejoining hydrolyzed polymer chains, preserving the stress retention capacity of the material.

1-ethyl-3-(3-dimethyl aminopropyl) carbodiimide (EDC) is a carbodiimide commonly used in biomaterials, such as hydrogels, due to its biocompatibility. Although not bound by any particular theory, it was hypothesized that the use of carbodiimides as an additive within the plastics utilized in the fabrication of clear orthodontic aligners results in a reduction in stress relaxation, by preventing the hydrolysis of the materials utilized. This additive is incorporated into any of the layers of the multi-material plastic designed, including the microstructure reported in this document.

Latest Data and Material Combinations

Figure 39:
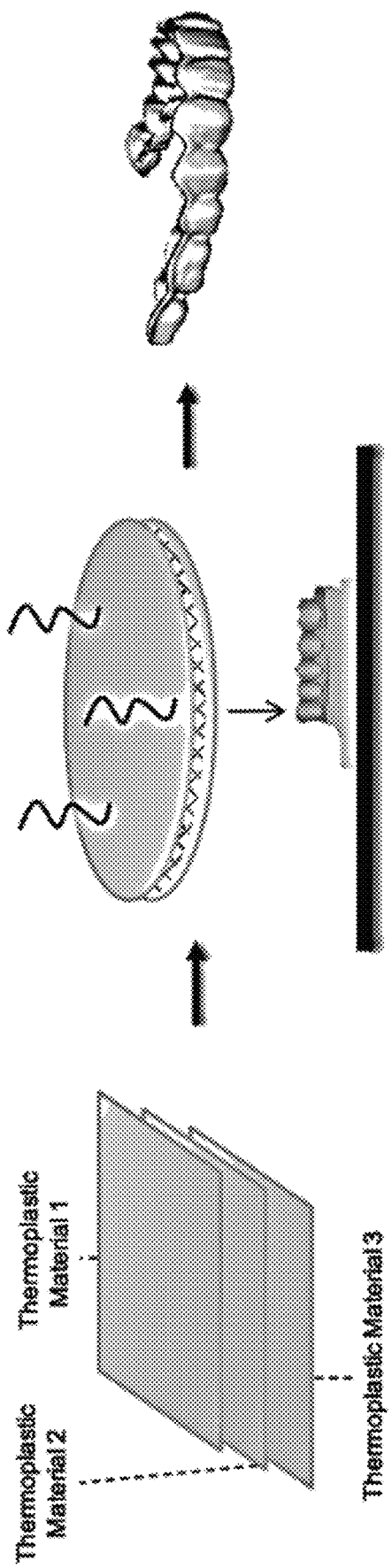
FIG. 39 depicts the preparation of an exemplary advanced thermoplastic sheet clear aligner. Multiple thermoplastic materials are combined into a composite sheet, which is then vacuumed formed onto a model in order to obtain the desired clear aligner.

In the search for the right combination of materials, the present studies have tested multiple thermoplastics, including diverse polyesters and polyurethanes. The present approach utilized 3D printing to combine multiple thermoplastic materials into a single composite sheet with unique mechanical properties. 3D printing allowed to deposit a thermoplastic material onto a secondary one in order to add strength or elasticity to the final product. FIG. 39 depicts the materials combination scheme and its processing into a clear aligner.

In the latest process, thermoplastic material was deposited onto the top and bottom sides of a central sheet in order to add strength or flexibility to the middle section, depending on the chosen order of materials. Following this step, the plastics were fused together via hot pressing resulting in a clear material, later trimmed in a circular shape to fit traditional clear aligner vacuum forming machinery. Once the product was finished, the aligners were fabricated via vacuum forming, trimmed, and delivered to the patient. FIG. 40 depicts the 3D printing that occurred through the fabrication process (FIG. 40A) and the hot pressing of these materials into a single composite sheet (FIG. 40B). FIG. 40C shows how the materials looked before and after going through the hot press, where the clarity of the final product is observed.

In the multiple experiments, the present studies tested many materials for the central layer, as well as multiple 3D printable filaments for the deposited outer layers. Thermoplastic Polyurethane (TPU) were chosen for the central layer of the product, since this was the material that contributed the most elasticity to the composite sheet, a critical parameter in order to limit stress relaxation. For the 3D printable material surrounding this central layer, Polycarbonate (PC) was chosen. This material offered great strength and was also transparent, preserving the clarity of the TPU central layer. The present studies, by testing the mechanical properties of this combination, and confirmed the synergy of these materials in order to provide strength while experiencing low stress relaxation.

Identify the Inner Microarchitecture Design within the Thermoplastic Sheet, Resulting in Enhanced Stress Retention (60% Stress Retention Minimum).

Figure 41:
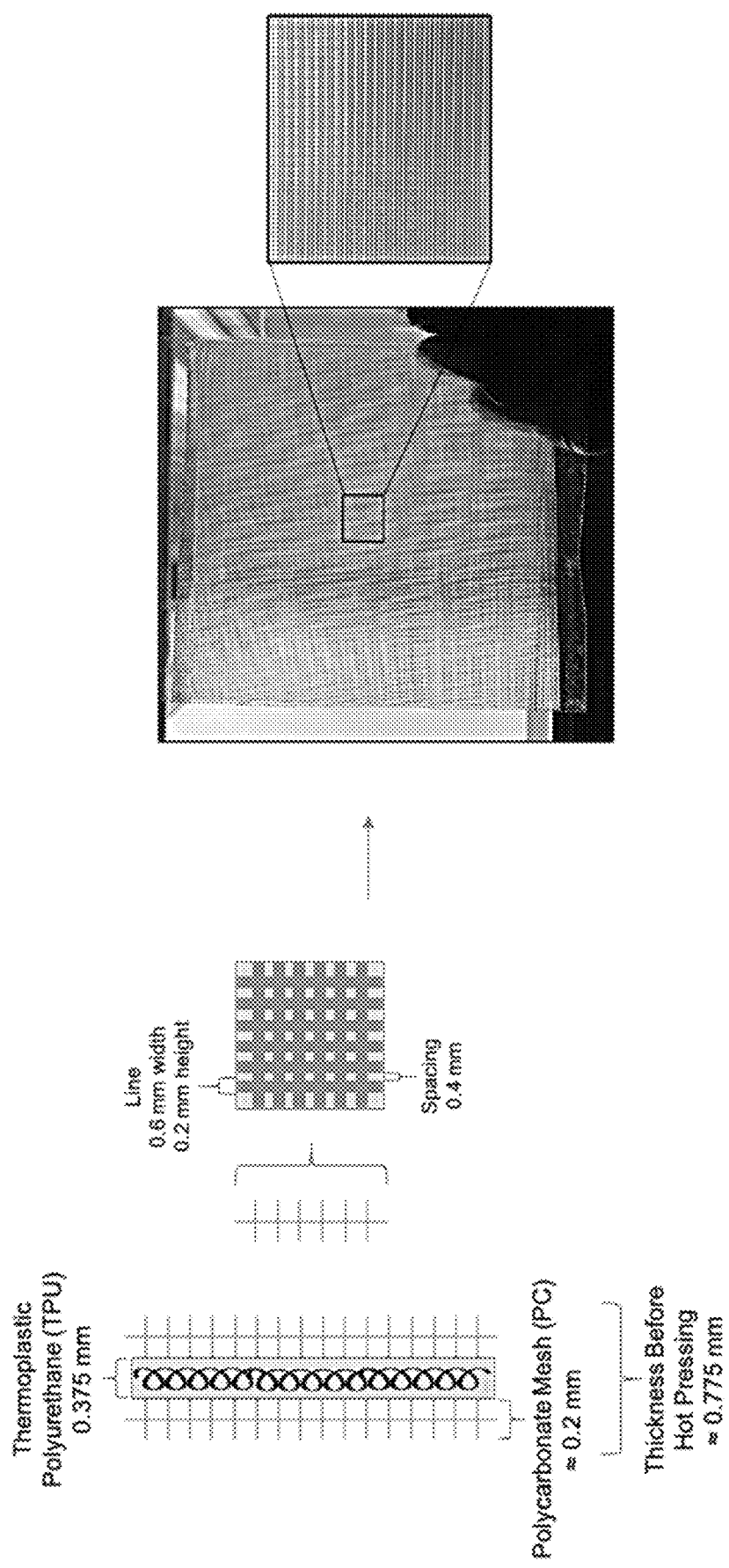
FIG. 41 depicts an exemplary advanced thermoplastic sheet inner microarchitecture design.

While 3D printing and depositing Polycarbonate onto the central TPU layer, the present studies formed a microarchitecture of PC onto and below the central sheet. The careful arrangement of the PC resulted in a scaffold on the central sheet that, after the hot-pressing process, became the skeleton of the central TPU layer providing the strength that TPU lacks. After testing several dimensions for this deposited PC mesh and the resulting mechanical properties from these diverse arrangements, it was concluded that a mesh pattern was the most effective towards stress relaxation reduction. FIG. 41 shows the dimensions of the working architecture. The schematic shows an elastic TPU material that served as a coil within the polymeric system providing flexibility, while a PC mesh was on the sides providing a scaffold to the structure. The lines in the mesh had a line width of 0.6 mm and the spacing between the lines was 0.4 mm. The total thickness of each individual mesh was 0.2 mm. Adding the central TPU layer (0.375 mm) and the 2 side meshes, a total thickness before hot pressing of 0.775 mm was obtained. The right side of FIG. 41 depicts the composite sheet before hot pressing and a zoomed image of the scaffold created.

Figure 42:
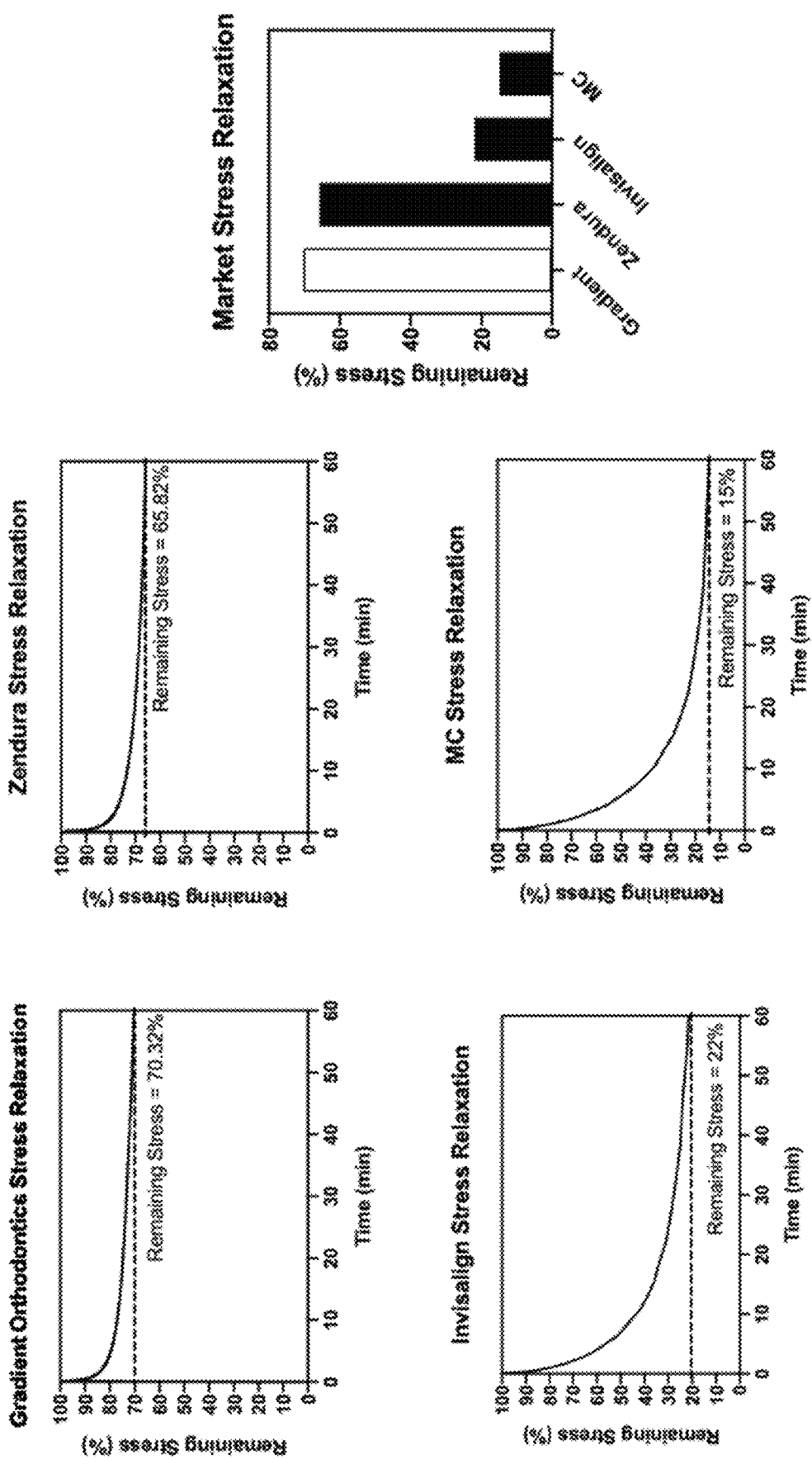
FIG. 42 is a series of plots comparing the advanced thermoplastic sheet stress relaxation to various market competitors.

The stress relaxation of this material was tested by applying 70% of its yield strain for a period of 1 h. The results were compared against Zendura (Bay Materials), which was tested under the same conditions. The stress relaxation of Master Control (Angel Align) and Invisalign (Align Technologies) were also analyzed. The results showed that the present material has a higher remaining stress after 60 minutes of tension exposure, retaining 70.32% of its initial stress and representing a lower stress relaxation. Zendura had a remaining stress of 65.82%, while Invisalign and Master Control had lower remaining stress values of 22% and 15%, respectively (FIG. 42).

This study demonstrated that the presently chosen materials, and their careful combination, resulted in a remaining stress above 70%.

Identify the Number of Layers of Each Material and their Respective Thicknesses in Order to Achieve the Necessary Strength for Teeth Movement (23 MPa of Initial Stress Minimum).

Figure 43:
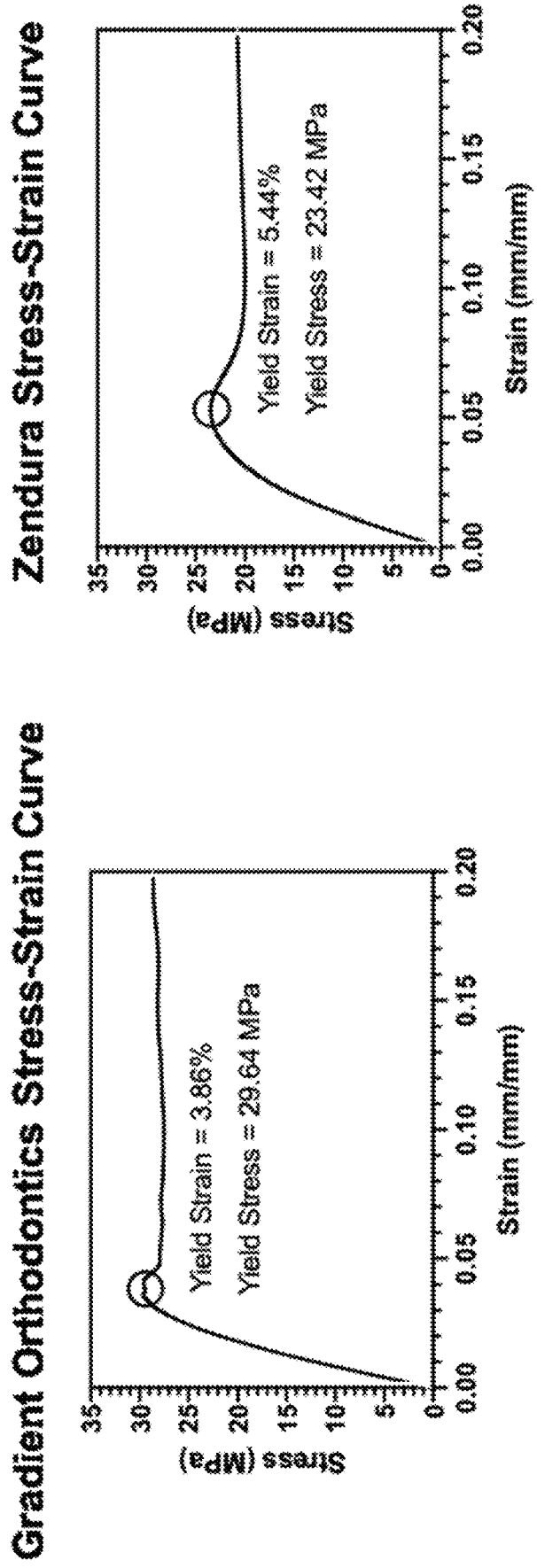
FIG. 43 shows a plot of the stress-strain curve for an exemplary advanced thermoplastic sheet (Gradient Orthodontics) and for Zendura.

Following the stress relaxation results obtained, the present studies focused on obtaining a force optimal for teeth movement. The ability to have a low stress relaxation allows for a product with a lower initial stress and an overall more comfortable material for the patient, since it retains its initial force more efficiently. After various experiments with multiple layers, the present studies concluded that 1 central layer of TPU (thickness of 0.375 mm) and surrounded on each side by a 3D printed PC layer (thickness of 0.20 mm each) was the ideal thickness for the final product. The stress-strain curve of this material was measured and compared to that of Zendura (FIG. 43). The present material shows a higher yield stress than Zendura (29.64 MPa), resulting in a stronger plastic that simultaneously can preserve its initial strength, providing an efficient and consistent load of force for orthodontic treatment.

These results beat the expected 23 MPa stress expectation, which allowed for further optimization of the product in the future.

Figure 44:
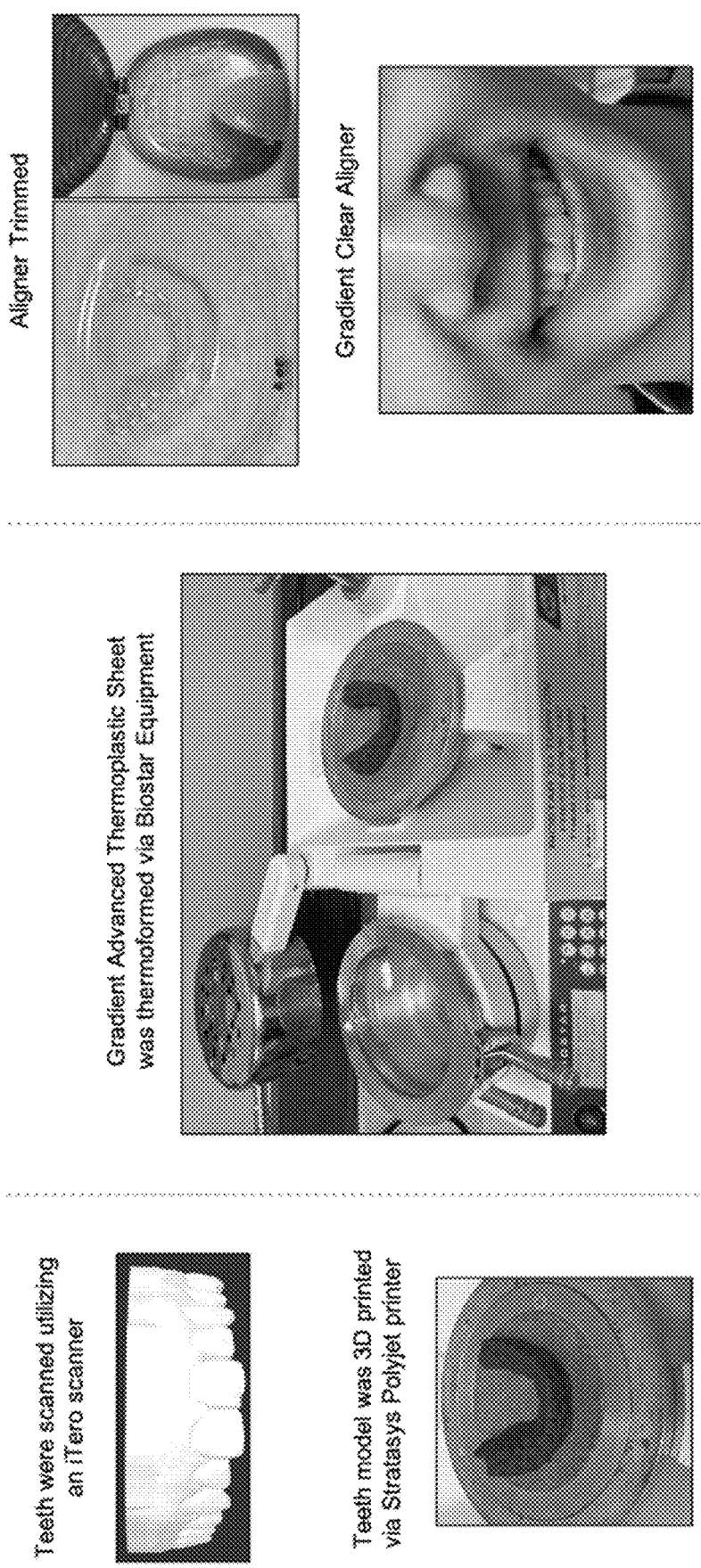
FIG. 44 is a series of graphics showing an exemplary clear aligner fabricated with an advanced thermoplastic sheet.
Figure 45:
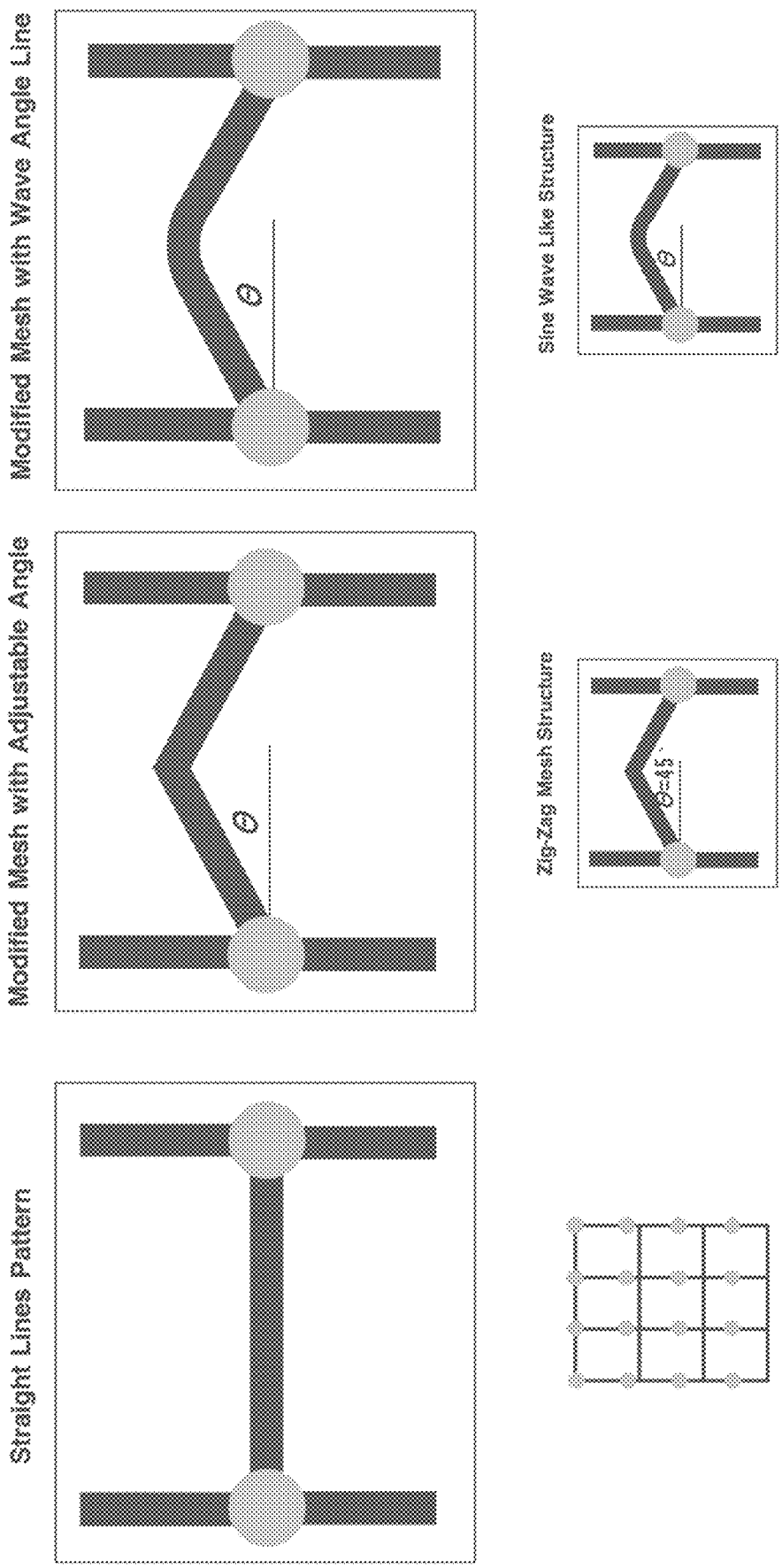
FIG. 45 is a series of exemplary segmented shapes to enhance flexibility, such as angled and wave-like lines.

With the designed plastic, the present studies demonstrated the fabrication of the first clear aligner made with the present in-house material. FIG. 44 depicts the process of the aligner fabrication. The process began by scanning the teeth of the patient and creating a 3D computer model. This 3D object was then 3D printed, and the Advanced Thermoplastic Sheet was vacuumed formed onto it, in order to acquire its shape. Subsequently, the aligner was trimmed and ready to be used by the patient.

In these studies, the addition of micro-structures via fused deposition modelling is reported. However, these patterns are also fabricated via press stamping of plastic sheets with a mold including the desired pattern. The patterned sheet is then passed through the hot roller press for the formation of multi-material sheets with embedded microstructures. In an alternative method, the plastics is fused together via hot pressing after the 3D printing process.

In some embodiments the materials utilized for the top and bottom layers are the same, whereas in other cases the materials are different and vary in mechanical properties. The materials utilized could be, but are not limited to, thermoplastic polyurethane, polyethylene terephthalate, polycarbonate, polyamide, polyester, co-polyester, polypropylene, polyethylene, polypropylene, polyethylene copolymer, acrylics, cyclic block copolymers, polybutylene terephthalate, polyetherimide, polytrimethylene terephthalate, silicone rubbers, thermoplastic elastomer (TPE), styrenic block copolymer (SBC), thermoplastic vulcanizate (TPV) elastomers, a polyurethane elastomers, polycarbonate (PC), or a combination the materials listed.

In other embodiments, a single sheet of plastic is modified with micro-structures on its top and bottom sides. In another embodiment, the top and bottom layers are composed of multiple layers with diverse materials. Furthermore, the microstructure layer is optionally composed of multiple materials to obtain improved mechanical properties. An example of this scenario is a squared mesh where the vertical lines are composed of one material and the horizontal lines are composed of a second material.

In another embodiment, additives, such as carbodiimides, are added to the materials utilized to enhance their stress retention capacities by preventing their degradation by hydrolysis.

This technology results in the manufacture of thermoplastic sheets towards the fabrication of clear aligners and other medical devices with improved mechanical properties, specially enhancing its stress retention capacity and improving treatment outcomes.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. An article comprising an inner microarchitecture resin and a first solid coating resin, wherein the first solid coating resin covers at least a portion of a surface of the inner microarchitecture resin;
   wherein the inner microarchitecture resin comprises at least one resin selected from the group consisting of a photocured resin, a thermally cured resin, a thermoformed resin, a printed resin, a meshwork resin, and a laser-edged resin;
   wherein the first solid coating resin comprises at least one resin selected from the group consisting of a photocured resin, a thermally cured resin, a thermoformed resin, a printed resin, and a laser-edged resin;
   wherein the composition of the inner architecture resin is different from the composition of the first solid coating resin,
   wherein the inner architecture resin, the first solid coating resin, or both resins comprise:
   70-90 weight percent of a urethane (meth)acrylate; and
   5-40 weight percent of a di(meth)acrylate.

2. The article of claim 1, wherein the inner microarchitecture resin comprises pores having an inner diameter of about 0.1 mm to about 5 mm.

3. The article of claim 1, wherein the inner microarchitecture resin has a thickness of between 0.1 mm and 3 mm.

4. The article of claim 2, wherein the pores are uniformly spaced.

5. The article of claim 4, wherein the pores are arranged in a honeycomb geometry.

6. The article of claim 1, wherein the article, when tested with a preload of at least 0.01 N, has an initial stress of between 0.45 MPa and 50 MPa.

7. The article of claim 1, wherein the article, when tested with a preload of at least 0.01 N, has a stress relaxation after 2 hours of between 10% and 95%.

8. The article of claim 1, wherein when one or both of the inner microarchitecture resin and the first solid coating resin comprises a thermoformed resin, then said thermoformed resin comprises at least one selected from the group consisting of polyethylene terephthalate and polyurethane.

9. The article of claim 1, wherein when one or both of the inner microarchitecture resin and the first solid coating resin comprises a photocured resin, then said photocured resin comprises at least one selected from the group consisting of a diacrylate compound, a triacrylate compound, a (meth)acrylate compound, a dimethacrylate compound, an isocyanate reactive compound comprising an acrylate or methacrylate, a diisocyanate compound, a urethane (meth)acrylate, and a photoinitiator.

10. The article of claim 1, wherein when one or both of the inner microarchitecture resin and the first solid coating resin comprises a photocured resin, then said photocured resin comprises at least one selected from the group consisting of:
   a) a diisocyanate compound selected from the group consisting of: 2,4-toluene diisocyanate, 2,5-toluene diisocyanate, 2,6-toluene diisocyanate, 4,4'-methylenebis (phenyl isocyanate), hexamethylene-1,6-diisocyanate, 1,1'-methylenebis (4-isocyanato) cyclohexane; and any combination thereof;
   b) a (meth)acrylate compound selected from the group consisting of: poly(ethylene glycol) methacrylate, poly (ethylene glycol) acrylate, poly(propylene glycol) methacrylate, poly(propylene glycol) acrylate, 2-hydroxyethyl acrylate, 2-hydroxyethyl methacrylate, 2-hydroxypropyl acrylate, 2-hydroxypropyl methacrylate, and any combination thereof;
   c) a di(meth)acrylate selected from the group consisting of: triethylene glycol dimethacrylate, di (ethylene glycol) dimethacrylate, propylene glycol dimethacrylate, di(propylene glycol) dimethacrylate, and any combination thereof;
   d) a tri(meth)acrylate selected from the group consisting of 1,1-trimethylolpropane triacrylate, pentaerythritol tri(meth)acrylate, trimethylol propane tri(meth)acrylate, and any combination thereof; and
   e) a photoinitiator selected from the group consisting of: diphenyl (2,4,6-trimethylbenzoyl) phosphine oxide, 2,4,6-trimethylbenzoylethoxyphenylphosphine oxide, bis(2,4,6-trimethylbenzoyl)-phenyl-phosphine oxide, 1-hydroxycyclohexyl-phenyl-ketone, 2-hydroxy-2-methyl-1-phenyl-1-propanone, and any combination thereof.

11. The article of claim 1, wherein when one or both of the inner microarchitecture resin and the first solid coating resin comprises a photocured resin, then said photocured resin comprises at least one selected from the group consisting of:
   a) a diol compound selected from the group consisting of: polycarbonate diol, polycaprolactone diol, poly(ethylene glycol), polypropylene glycol diol, poly(dimethylsiloxane), hydroxy terminated, and any combination thereof;
   b) a (meth)acrylate compound selected from the group consisting of: methyl methacrylate, isobornyl acrylate, 3,3,4,4,5,5,6,6,7,7,8,8,9,9,10,10,10-heptadecafluorodecyl methacrylate, poly(propylene glycol) methyl ether acrylate, vinyltrimethoxysilane, pentaerythritol triacrylate and any combination thereof; and
   c) a tri(meth)acrylate, tetra(meth)acrylate, penta(meth)acrylate, or hexa(meth)acrylate compound.

12. The article of claim 1, wherein when one or both of the inner microarchitecture resin and the first solid coating resin comprises a photocured resin, then said photocured resin further comprises a stabilizer selected from the group consisting of: bis (2,2,6,6-tetramethyl-1-octyloxy-4-piperidyl) sebacate, bis (1,2,2,6,6-pentamethyl-4-piperidyl) sebacate, methyl 1,2,2,6,6-pentamethyl-4-piperidyl sebacate, dimethyl sebacate, bis (2,2,6,6-tetramethyl-4-piperidyl) sebacate, and any combination thereof.

13. The article of claim 1, wherein the first solid coating resin encapsules the inner microarchitecture resin.

14. The article of claim 1, wherein the article further comprises a second solid coating resin;
   wherein the second solid coating resin covers at least a portion of a surface of the inner microarchitecture resin that is not covered by the first solid coating resin; and
   wherein the second solid coating resin comprises at least one selected from the group consisting of a photocured resin, a thermoformed resin, a printed resin, a meshwork resin, and a laser-edged resin;
   wherein the composition of the second solid coating resin is different than the composition of the first solid coating resin.

15. The articles of claim 14, wherein the first solid coating resin and the second solid coating resin encapsule the inner microarchitecture resin.

16. The article of claim 1, wherein the microarchitecture comprises at least one selected a segmented structure, foam structure, a square lattice, triangular lattice, rectangular lattice, diamond lattice, circular lattice, oval lattice, and hexagonal lattice.

17. An article comprising an inner microarchitecture resin and a first solid coating resin, wherein the first solid coating resin covers at least a portion of a surface of the inner microarchitecture resin;

wherein the inner microarchitecture resin comprises at least one resin selected from the group consisting of a photocured resin, a thermally cured resin, a thermoformed resin, a printed resin, a meshwork resin, and a laser-edged resin;

wherein the first solid coating resin comprises at least one resin selected from the group consisting of a photocured resin, a thermally cured resin, a thermoformed resin, a printed resin, and a laser-edged resin;

wherein the composition of the inner architecture resin is different from the composition of the first solid coating resin, wherein the article is a tooth aligner.

18. A method of fabricating a device, the method comprising the steps of:

a) generating an inner microarchitecture comprising at least one selected from the group consisting of a photocured resin, thermally cured resin, and thermoplastic;

b) placing a coating resin on at least a portion of a surface of the inner microarchitecture; and c) curing the coating resin to generate a first solid coating comprising at least one selected from the group consisting of a photocured resin, thermally cured resin, and thermoplastic, wherein the first solid coating covers at least a portion of a surface of the inner microarchitecture, wherein the composition of the inner architecture resin is different from the composition of the first solid coating resin, and wherein the inner architecture resin, the first solid coating resin, or both resins comprise:

70-90 weight percent of a urethane (meth)acrylate; and 5-40 weight percent of a di(meth)acrylate.

19. The method of claim 18, wherein the generation of the inner microarchitecture comprises at least one selected from the group consisting of 3D printing, photocuring, thermoforming, and laser-edging.

20. The method of claim 18, wherein the generation of the first solid coating comprises at least one selected from the group consisting of 3D printing, photocuring, and thermoforming.

21. The method of claim 18, wherein the method further comprises:

d) placing a second coating resin on at least a portion of a surface of the inner microarchitecture that is not covered by the first solid coating; and e) curing the second coating resin to generate a second solid coating comprising at least one selected from the group consisting of a photocured resin, thermally cured resin, and thermoplastic, wherein the second solid coating covers at least a portion of a surface of the inner microarchitecture that is not covered by the first solid coating.

22. A 3D printed article produced by the method of claim 18.

* * * * *